United States Patent
Kirita et al.

(10) Patent No.: US 8,020,598 B2
(45) Date of Patent: Sep. 20, 2011

(54) LABEL PASTING DEVICE

(75) Inventors: Kouji Kirita, Tokyo (JP); Toshiaki Abe, Tokyo (JP); Hayato Ito, Tokyo (JP); Kenji Murakami, Tokyo (JP); Hiroyuki Suzuki, Tokyo (JP)

(73) Assignee: Kabushiki Kaisha Sato (JP)

( * ) Notice: Subject to any disclaimer, the term of this patent is extended or adjusted under 35 U.S.C. 154(b) by 429 days.

(21) Appl. No.: 12/066,932

(22) PCT Filed: Sep. 12, 2006

(86) PCT No.: PCT/JP2006/318085
§ 371 (c)(1),
(2), (4) Date: Apr. 8, 2009

(87) PCT Pub. No.: WO2007/032360
PCT Pub. Date: Mar. 22, 2007

(65) Prior Publication Data
US 2010/0139866 A1    Jun. 10, 2010

(30) Foreign Application Priority Data

| Sep. 14, 2005 | (JP) | 2005-266341 |
| Sep. 14, 2005 | (JP) | 2005-266342 |
| Sep. 27, 2005 | (JP) | 2005-280666 |
| Oct. 25, 2005 | (JP) | 2005-310116 |
| Oct. 31, 2005 | (JP) | 2005-315823 |
| Nov. 22, 2005 | (JP) | 2005-336608 |
| Nov. 30, 2005 | (JP) | 2005-346632 |

(51) Int. Cl.
*B32B 41/00* (2006.01)
(52) U.S. Cl. ..... 156/360; 156/361; 156/378; 156/442.1; 156/443

(58) Field of Classification Search .......... 156/360, 156/361, 378, 204, 227, 442.1, 443
See application file for complete search history.

(56) References Cited

U.S. PATENT DOCUMENTS
5,228,945 A    7/1993  Labbé .......... 156/571
(Continued)

FOREIGN PATENT DOCUMENTS
EP    1632926 A1 *  3/2006
(Continued)

OTHER PUBLICATIONS

International Search Report in Japanese, along with English-language translation, dated Dec. 19, 2006 issued in corresponding PCT Application No. PCT/JP2006/318085.

*Primary Examiner* — George R Koch, III
(74) *Attorney, Agent, or Firm* — Ostrolenk Faber LLP

(57) ABSTRACT

A label affixing apparatus enables an RFID tag to be affixed to a product at a distance from the product. The apparatus comprises: a folding/affixing device which conveys a label, a label holder holds a front surface side of the label, a folding device causes a part of the label including a tag attachment site to project by folding the part from a rear surface side to the front surface side into an angular shape. Either traction is suppressed when the label is affixed to the product. A reader/writer has an antenna in a position facing the part of the label when the part of the label is folded, for reading and writing information from and to the RFID tag. A fold detector detects if the label is folded. The label holding device moves between a label suction position and a label affixing position. Folding is assisted from a rear surface side of the part of the label.

28 Claims, 107 Drawing Sheets

U.S. PATENT DOCUMENTS

| | | | | |
|---|---|---|---|---|
| 5,988,251 | A * | 11/1999 | Hunt et al. | 156/539 |
| 7,462,252 | B2 * | 12/2008 | Schaller et al. | 156/64 |
| 2003/0063001 | A1 * | 4/2003 | Hohberger et al. | 340/572.1 |
| 2005/0279440 | A1 * | 12/2005 | Schaller et al. | 156/64 |

FOREIGN PATENT DOCUMENTS

| | | |
|---|---|---|
| JP | 52-4800 | 1/1977 |
| JP | 10-129639 | 5/1998 |
| JP | 2006-277524 | 10/2006 |

* cited by examiner (a)

(b)

(C)

(d)

(a)

(b)

(a)

(b)

(C)

(d)

(a)

(b)

(c)

(d)

(a)

(a)

(b)

(C)

(d)

(a)

(b)

(C)

(d)

(a)

(a)

(b)

(C)

(d)

(a)

(b)

(a)

(b)

(C)

(a)

(b)

(a)

(b)

(C)

(a)

(b)

(c)

(d)

(e)

(a)

(b)

(a)

(b)

(C)

(a)

(b)

(C)

(d)

(a)

(b)

(c)

(a)

(b)

(a)

(b)

(d)

(a)

(b)

(a)

(c)

(a)

(b)

(c)

(a)

(b)

(c)

(a)

(b)

(c)

(a)

(b)

(c)

LABEL PASTING DEVICE

TECHNICAL FIELD

This application is a national stage entry of PCT/JP2006/318085, filed Sep. 12, 2006.

The present invention relates to a label affixing apparatus for affixing a label with an attached, so-called RFID tag, and which comprises an IC chip storing a variety of information, to a product.

BACKGROUND

In recent years, techniques of attaching an RFID (Radio Frequency IDentification) tag, which is comprised of an IC chip for storing a variety of information and a communication antenna connected to the IC chip, to a label that is affixed to various products, and using the RFID tag to perform various types of automatic identification through wireless, non-contact communication with a reader/writer, have become widespread.

FIG. 68 shows a label L to which an RFID tag T is attached. The label L is comprised of a display layer U and an adhesive layer B. The RFID tag T is attached to a rear surface of the display layer U, and the labels L are temporarily adhered to a strip-form backing sheet D in sequence.

The RFID tag T is comprised of an IC chip Ta and a communication antenna Tb, and is protected by a film layer P that covers the entire RFID tag T.

An apparatus proposed previously by the applicant of the present application is known as a conventional example of a label affixing apparatus for affixing the label L with the attached RFID tag T to a product (see Patent Document 1 below).

In this apparatus, the label L is conveyed while it is temporarily adhered to the backing sheet D. After being peeled away from the backing sheet D, the label L is aspirated or suctioned by a suction plate in a predetermined suction position, and after being aspirated by the suction plate, the label L is affixed to the product in a predetermined affixation position.

Patent Document 1: Japanese Unexamined Patent Application Publication No. 2005-104521

With the label L affixed by a conventional label affixing apparatus such as that described above, when the material or content of the product to which the label L is to be affixed is such that electromagnetic waves are blocked by the product, for example when the material or content of the product includes metal or a liquid such as water, electromagnetic waves are absorbed into the product due to the effect of the metal or liquid such as water contained in the product or the waves are distorted by irregular reflection. As a result, it may be impossible to read and write the information on the IC chip Ta using a reader/writer. This phenomenon depends on the frequency of the RFID tag T, but is particular likely to occur with a UHF band RFID tag T.

DISCLOSURE OF THE INVENTION

The present invention has been designed in consideration of this problem, and it is an object thereof to provide a label affixation apparatus that affixes a part of a label attached with an RFID tag to a product in a manner wherein the tag projects angularly such that the RFID tag is removed from that is off the product, thereby reducing the effects of the product to which the RFID tag is affixed and ensuring that data can be read and written with stability and reliability.

Accordingly, a label affixing apparatus of the present invention is a label affixing apparatus for affixing a label, to which an RFID tag comprised of an IC chip and a communication antenna is attached, to a product. The apparatus comprises a folding/affixing device having a label conveying device for conveying the label, a label holding device for holding a front surface side of the label, and a folding device for causing a part of the label, including a tag attachment site to which the RFID tag of the label is attached, to project off the product by folding the label part from a rear surface side to the front surface side and into an angular shape. The folding/affixing device further comprise at least one of: traction suppressing means for suppressing traction acting on the label when the label is affixed to the product; a reader/writer, and at least an antenna of the reader/writer is disposed in a position facing the part of the label when the part of the label is folded, for writing or reading information to and from the IC chip of the RFID tag via the antenna; a fold detecting device for detecting whether or not the part of the label has been folded into an angular shape; a moving device for moving the folding/affixing device between two positions, namely a suction position in which the label holding device aspirates or suctions the label and an affixing position in which the aspirated label is affixed to the product; and a folding assisting device for assisting folding of the part of the label from the rear surface side to the front surface side into an angular shape.

According to the invention described above, the part of the label to which the RFID tag is attached can be affixed to the product to project angularly by the folding/affixing device. Therefore, the RFID tag can be kept at a distance from the product. Hence, when the material or content of the product to which the RFID tag is affixed is a metal or a liquid such as water, the effects thereof can be reduced. As a result, information transmission and reception can be performed reliably.

According to a further aspect of the invention described, the label holding device comprises a pair of divided bodies for aspirating the label. The folding device makes one of the divided bodies capable of moving between two positions, namely a removed position and a joining position. The folding device forms a folded portion by folding the part of the label between opposing end surfaces of the divided bodies and then causing the opposing end surfaces of the divided bodies to come into contact with respective front or then outward facing surfaces of a first side face and a second side face, which are formed about and joined by an apex portion and respectively comprise a bend portion, such that the respective front surfaces are pressed thereby.

According to a further aspect, a pressing member for folding the part of the label and pressing a bend portion side of a second side face formed about an apex portion is provided. The folding device makes the pressing member capable of moving between two positions, namely a removed position. The pressing member and the label holding device fold the part of the label to form a folded portion by pressing a bend portion of a first side face of the label and a bend portion of the second side face of the label in a direction for causing respective rear opposing surfaces of the first side face and the second side face to approach each other.

According to the aspects described above, the folding device is provided with a simple constitution, and therefore the operation to fold the label L can be performed almost instantaneously. Moreover, the folding device is capable of causing the part of the label including the tag attachment site to which the RFID tag of the label is attached to project by folding the part from the rear surface side to the front surface side into an angular shape.

According to a further aspect, the traction suppressing device controls the folding device by moving the divided body from the joining position to the removed position side such that the divided body does not contact the folded portion of the label.

According to a further aspect, the traction suppressing device control the folding device by moving the pressing member from the joining position to the removed position side such that the pressing member does not contact the folded portion of the label.

According to a further aspect, the traction suppressing device has a function for blowing air onto the label from the label holding device.

According to the foregoing aspects, when the label is affixed, the gap between the label holding device and the affixed label enters a vacuum state, thereby preventing the label holding device from dragging the affixed label and the product. Moreover, air is blown onto the label from the label holding device, and therefore the label can be affixed reliably.

According to a further aspect, at least the antenna of the reader/writer is disposed between the divided bodies when the divided body is in the removed position.

According to a further aspect, at least the antenna of the reader/writer is disposed between the pressing member and the label holding device when the pressing member is in the removed position.

According to a further aspect, the label holding device is a suction plate, and at least the antenna of the reader/writer is provided on a support member side of the suction plate.

According to the aspects described above, information can be written to or read from the IC chip of the RFID tag reliably at the final stage before the label is affixed to the product with no effect from the label holding device and the folding device, which are comprised of metallic members.

Moreover, when the antenna is provided on the suction plate, it becomes necessary to manufacture the suction plate from resin or to take similar measures to ensure that communication with the RFID tag is not impaired. As a result, problems such as a corresponding reduction in the strength of the suction plate, a reduction in design freedom, and an increase in cost may occur. Furthermore, since the suction plate is a moving member and the antenna of the reader/writer moves repeatedly together with the suction plate, a cable that connects a read/write module and the antenna of the reader/writer must be bent repeatedly, leading to an increase in the likelihood of damage thereto. In the present invention, however, at least the antenna of the reader/writer is provided on the support member side of the suction plate, and is therefore not affected by the material, thickness etc. of the suction plate. Hence, communication with the RFID tag can be performed reliably, design freedom can be improved, and manufacture can be achieved at a reasonable cost. Moreover, since the antenna of the reader/writer is fixed to the support member side, damage due to bends in the cable and so on is less likely to occur, enabling improvement in durability.

Furthermore, defects in the RFID tag can be detected, and when the RFID tag is not defective, information can be written to the IC chip reliably. Moreover, the RFID tag is not damaged subsequently. When a defect is detected in the RFID tag, measures such as halting the apparatus and removing the defective label may be taken on the basis of the detection, for example. As a result, the precision of the defect detection can be improved reliably.

According to a further aspect, the fold detecting device is comprised of a light-projecting and light-receiving optical sensor that detects the presence or absence of the folded portion of the label facing a gap between the end surfaces of the pair of divided bodies.

According to a further aspect, the fold detecting device is comprised of a light-projecting and light-receiving optical sensor that detects the presence or absence of the folded portion of the label facing a gap between the pressing member and the label holding device.

According to a further aspect, the fold detecting device comprise abnormality signal transmitting device for transmitting an abnormality signal when the fold detecting device detects that the part of the label is not folded into an angular shape.

According to the aspects described above, when a defect occurs during folding of the label such that the RFID tag overlaps the perforations between labels or the label is fed incorrectly, for example, the label cannot be folded correctly, leading to defective folding. However, the fold detecting device detects whether or not the part of the label has been folded into an angular shape, and as a result of the detection by the fold detecting device, control such as halting the apparatus can be performed in relation to a defectively folded label to ensure that the defectively folded label is not affixed. Thus, affixation defects can be prevented reliably.

According to a further aspect, the folding assisting device comprises an air blowing nozzle for blowing air onto the part of the label from the rear surface side such that the part of the label is folded toward the front surface side by a blowing force of the air.

According to a further aspect, the folding assisting device comprises a suction nozzle for aspirating the part of the label from the front surface side such that the part of the label is folded toward the front surface side.

According to the aspects described above, the folding assisting device can be comprised of an inexpensive member, leading to reductions in the size and cost of the machine. Moreover, the operation to fold the part of the label having the attached RFID tag in the same direction can be assisted, ensuring that folding is performed reliably.

According to a further aspect, the label holding device is a suction plate for aspirating the label. The suction plate comprises: a first side body for aspirating a first side portion of the label adjacent to the part of the label; a second side body that is to be capable of approaching the first side body and aspirates a second side portion of the label adjacent to the part of the label; and an intermediate body that is provided between the first side body and the second side body and aspirates the part of the label, and the folding devices folds the part of the label by moving the intermediate body between two positions, namely a planar position in which a suction surface of the first side body, a suction surface of the intermediate body, and a suction surface of the second side body are connected in planar form and the label is aspirated; and a withdrawal position in which a center of the intermediate body is folded back as the second side body approaches the first side body such that the part of the label is folded inward while being aspirated; thereby forming a folded portion having a first side face and a second side face, which are formed about an apex portion and respectively have a bend portion.

According to a further aspect, the intermediate body comprises: a first intermediate body that aspirates the first side face of the part of the label and is rotatably connected to the first side body via a hinge; a second intermediate body that aspirates the second side face of the part of the label and is rotatably connected to the second side body via a hinge; and a hinge mechanism that connects the first intermediate body and second intermediate body rotatably.

According to a further aspect, the intermediate body comprises: a first intermediate body that aspirates the first side face of the part of the label and is rotatably connected to the first side body via a hinge; a second intermediate body that aspirates the second side face of the part of the label and is rotatably connected to the second side body via a hinge; a hinge mechanism that connects the first intermediate body and second intermediate body rotatably; and a biasing device for biasing the first intermediate body and the second intermediate body in a withdrawal direction during movement thereof from the planar position to the withdrawal position.

According to the aspects described above, when the suction plate aspirates the label, a driving unit causes the intermediate portion to withdraw. As a result, the second side body approaches the first side body and the center of the intermediate body withdraws from the planar position so as to fold inward, thereby reaching the withdrawal position. As a result, the part of the label is folded inward while being aspirated. In this case, the intermediate body is connected to the first side body and second side body, and therefore the second side body and intermediate body can be moved by a single driving unit, enabling corresponding structural simplification and an improvement in operating efficiency.

When the intermediate body moves from the planar position to the withdrawal position, the respective front surfaces of the first side face and second side face forming the part of the label are pressed, and as a result, the folded portion is formed. In this case, the folded portion is formed simply by causing the intermediate body to withdraw, and therefore, the formation time of the folded portion can be reduced greatly, enabling a reduction in the label affixation time and an improvement in affixation efficiency.

According to another aspect, the label holding device is comprised of a pair of divided bodies for aspirating the label, the folding device makes one of the divided bodies capable of moving relative to the other divided body between two positions, namely a joining position in which respective suction surfaces of the divided bodies meet in planar form and a removed position in which the divided bodies are removed from each other such that an angle formed between the respective suction surfaces of the divided bodies is less than 180 degrees, and the folding device forms a folded portion during movement from the removed position to the joining position by folding the part of the label between opposing end surfaces of the divided bodies and then causing the opposing end surfaces of the divided bodies to come into contact with respective front surfaces of a first side face and a second side face, which are formed about an apex portion and respectively comprise a bend portion, such that the respective front surfaces are pressed thereby.

According to the aspects described above, first, the pair of divided bodies aspirate the label in the joining position of the second divided body, and next, the second divided body is positioned in the removed position.

As a result, a space into which the part of the label that projects from the rear surface side to the front surface side can enter is formed between the first divided body and second divided body. Next, the second divided body is moved from the removed position to the joining position. As a result, the bend portion of the first side face and the bend portion of the second side face are pressed in a direction for causing the respective rear surfaces of the first side face and second side face to approach each other while the first divided body and second divided body respectively aspirate and hold the two conveyance direction end portion sides of the label, thereby forming the folded portion. In this case, the angle formed by the respective suction surfaces of the divided bodies is less than 180 degrees while the second divided body moves from the removed position to the joining position, or in other words the suction surface of the second divided body is inclined relative to the suction surface of the first divided body, and therefore the bend portions of the first side face and second side face are pressed such that the apex portion of the part of the label projects toward the space side. Thus, the folded portion is formed reliably.

In this case, when the suction surface of the second divided body, having reached the joining position from the removed position, and the suction surface of the first divided body form a planar surface, it is impossible to determine whether the apex portion will project to the space side or to the outside of the suction surface. In other words, the apex portion serves as a so-called change point, and may project to the outside of the suction surface. Therefore, an assisting device comprising an air blowing nozzle or the like for pushing the part of the label toward the space side, for example, must be provided. In the present invention, however, such assisting device is not required, and therefore corresponding structural simplification can be achieved, and the part of the label can be caused to project by being folded from the rear surface side to the front surface side into an angular shape reliably.

According to an another aspect, the label conveyed by the label conveying device has an intermediate portion provided with the part of the label including the tag attachment site to which the RFID tag is attached, a first side portion adjacent to the part of the label, and a second side portion adjacent to the part of the label, and a relationship between a length Fa of the first side portion and a length Fb of the second side portion being Fa≦Fb. Further, a label having a second side portion of a varying length is used, and the label is conveyed with the second side portion in a leading conveyance direction position. The folding device forms a folded portion constituted by a first side face and a second side face, which are formed about an apex portion and respectively comprise a bend portion, by causing the part of the label conveyed by the label conveying device to project by folding the part from the rear surface side to the front surface side into an angular shape, the label holding device is a suction plate comprised of a first side body for aspirating a first side portion of the label adjacent to the part of the label and a second side body for aspirating a second side portion of the label adjacent to the part of the label, the folding device makes a base, to which the first side body and the second side body of the suction plate are fixed, and the second side body capable of moving relative to the first side body between two positions, namely a removed position and a joining position, and the folded portion is formed by opposing end surfaces of the first side body and the second side body during movement from the removed position to the joining position.

According to the aspect described above, when the suction plate aspirates the label, the folding device moves the second side body to the removed position. As a result, a space is formed between the second side body and first side body. Next, the folding device moves the second side body to the joining position. As a result, the bend portion of the first side face and the bend portion of the second side face are pressed in a direction for causing the respective rear surfaces of the first side face and second side face to approach each other while the first side body and second side body respectively aspirate and hold the two conveyance direction end portion sides of the label, thereby forming the folded portion. The label formed with the folded portion is then pressed against and affixed to the product by the folding/affixing device. Thus, the part of the label to which the RFID tag is attached can be affixed to the product after being caused to project in an angular shape, and therefore the RFID tag can be separated from the product. Hence, when the material or content of the product to which the RFID tag is affixed is a metal or a liquid such as water, the effects thereof can be reduced, and as a result, information transmission and reception can be performed reliably.

Furthermore, according to the invention described above, when a different type of label, in which the length Fb of the second side portion varies, is affixed, the second side body may be used as is, without being replaced, if the label has a slightly shorter length than a preceding label. In this case, the conveyance direction rear end of the label is positioned at the conveyance direction rear end portion of the first side body, and therefore the positional relationship between the folding part of the label and the suction plate remains unchanged. As a result, the label can be aspirated, folded, and affixed in a similar manner to that described above. Hence, a plurality of types of labels having different lengths can be affixed easily using a single machine. In other words, label size can be responded to easily, and therefore design modifications and apparatus setting can be performed easily, enabling a great improvement in the universality of the apparatus.

According to another aspect, the folding device forms a folded portion having a first side face and a second side face, which are formed about an apex portion and respectively comprise a bend portion, by causing the part of the label including the tag attachment site to which the RFID tag of the label is attached to project by folding the part from the rear surface side to the front surface side into an angular shape, the label holding device is a suction plate for holding the front surface side of the label using a first side body for aspirating a first side portion of the label adjacent to the part of the label, a second side body for aspirating a second side portion of the label adjacent to the part of the label, and an intermediate body that is provided between the first side body and the second side body and aspirates the part of the label, the folding device comprises: an intermediate body driving unit for making the intermediate body capable of moving between two positions, namely a planar position in which a suction surface of the first side body, a suction surface of the intermediate body, and a suction surface of the second side body are connected in planar form and the label is aspirated, and a withdrawal position in which the intermediate body is withdrawn from the planar position; and a second side body driving unit for moving the second side body between two positions, namely a removed position in which the intermediate body is in the planar position and the second side body is removed from the first side body, and a joining position in which the intermediate body is in the withdrawal position and the second side body approaches the first side body, and the folded portion is formed by opposing end surfaces of the first side body and the second side body when the second side body driving unit moves the second side body from the removed position to the joining position.

According to another aspect, the folding device comprises a drive control unit for causing the intermediate body driving unit to move the intermediate body from the planar position to the withdrawal position and causing the side body driving unit to move the second side body from the removed position to the joining position synchronously.

According to another aspect, the folding device comprises a drive control unit for causing the intermediate body driving unit to move the intermediate body from the planar position to the withdrawal position and causing the second side body driving unit to move the second side body from the removed position to the joining position synchronously, and adjacent end surfaces of the intermediate body in the planar position and the second side body in the removed position are formed at an incline relative to suction surfaces of the intermediate body and the second side body so that the intermediate body and the second side body can move synchronously.

According to another aspect, the label conveyed by the label conveying device has a first side portion adjacent to the part of the label and a second side portion adjacent to the part of the label, a relationship between a length Fa of the first side portion and a length Fb of the second side portion being Fa≦Fb, a label having a second side portion of a varying length and serves as a main display portion on which a main display can be performed is used, the label is conveyed with the second side portion in a leading conveyance direction position, the first side body is set at a length corresponding to the length Fa of the first side portion, and fixed to a base, and the second side body is set at a length that can correspond to differences among a plurality of lengths Fb of the second side portion, and provided on the base.

According to the aspects described above, the folded portion is formed by causing the second side body to approach and the intermediate body to withdraw synchronously. Therefore, the folding portion formation time can be made extremely short, enabling a reduction in the label affixation time and an improvement in affixation efficiency. More specifically, when the suction plate aspirates the label in a case where the intermediate body is not provided, the second side body is separated from the first side body to form the space into which the part of the label that projects from the rear surface side to the front surface side can enter between the first side body and second side body, whereupon the second side body is moved to the first side body side so that the bend portion of the first side face and the bend portion of the second side face are pressed to form the folded portion. When the intermediate body is not provided, the second side body must be separated from the first side body after the label is aspirated, leading to a corresponding increase in the required movement time, and as a result, the folding/affixing time per cycle increases. In the present invention, by comparison, the second side body does not have to be separated from the first side body after the label is aspirated, and therefore the folding time can be reduced correspondingly, enabling an improvement in affixation efficiency.

According to another aspect, a plurality of types of second side bodies having different lengths are prepared as the second side body, and the plurality of types of second side bodies can be replaced on the base.

According to the aspect described above, when a label having a much shorter length than the preceding label or a label having a greater length than the preceding label is affixed, a second side body prepared in advance is introduced in accordance with the short or long label. At this time, only the second side body need be replaced, and therefore the operation can be performed extremely easily in comparison with a case in which all of the settings of the suction plate must be altered. The label can then be aspirated, folded and affixed in a similar manner to that described above. As a result, a plurality of types of labels having different lengths can be affixed easily using a single machine. In other words, label size can be responded to easily, and therefore design modifications and apparatus setting can be performed easily, enabling a great improvement in the universality of the apparatus.

According to another aspect, the label affixing apparatus comprises: folding control device for driving the folding device or the folding assisting means to control whether or not the part of the label is folded from the rear surface side to the front surface side into an angular shape; a setting device for setting whether or not the part of the label is folded from the rear surface side to the front surface side into an angular shape; a storing device for storing a set value set by the setting device; and determining means for determining the set value stored in the storing device, and when the determining device determines the set value such that the part of the label is to be folded from the rear surface side to the front surface side into an angular shape, the folding control device drives the folding device or the folding assisting device such that the part of the label is folded from the rear surface side to the front surface side into an angular shape.

According to another aspect, the label affixing apparatus comprises an operation unit for setting information relating to an operation of the label affixing apparatus, and the setting device is set from the operation unit.

According to another aspect, the label affixing apparatus comprises an external interface for performing wired or wireless communication with an external machine, and the setting device is set in accordance with reception data received by the external interface from the external machine.

According to another aspect, the reader/writer performs communication with the IC chip, and the setting device of the label affixing apparatus is set in accordance with the presence or absence of a response.

According to the aspects described above, the folding control device is capable of altering the shape of the label to be affixed such that the label can be affixed to the product in planar form or with the part of the label to which the RFID tag is attached projecting from the product at an angle. Therefore the label affixation system can be constructed according to whether or not the label is attached with an RFID tag, and in accordance with the operation or the usage application.

According to the label affixing apparatus of the present invention, the label can be affixed to the product by the folding/affixing device with the part of the label to which the RFID tag is attached projecting at an angle, whereby the RFID tag can be supported separated from the product. Therefore, when the material or content of the product to which the RFID tag is affixed is of metal or a liquid such as water, the effects thereof can be reduced, and as a result, information transmission and reception can be performed reliably.

LIST OF ELEMENTS

Figure 1:
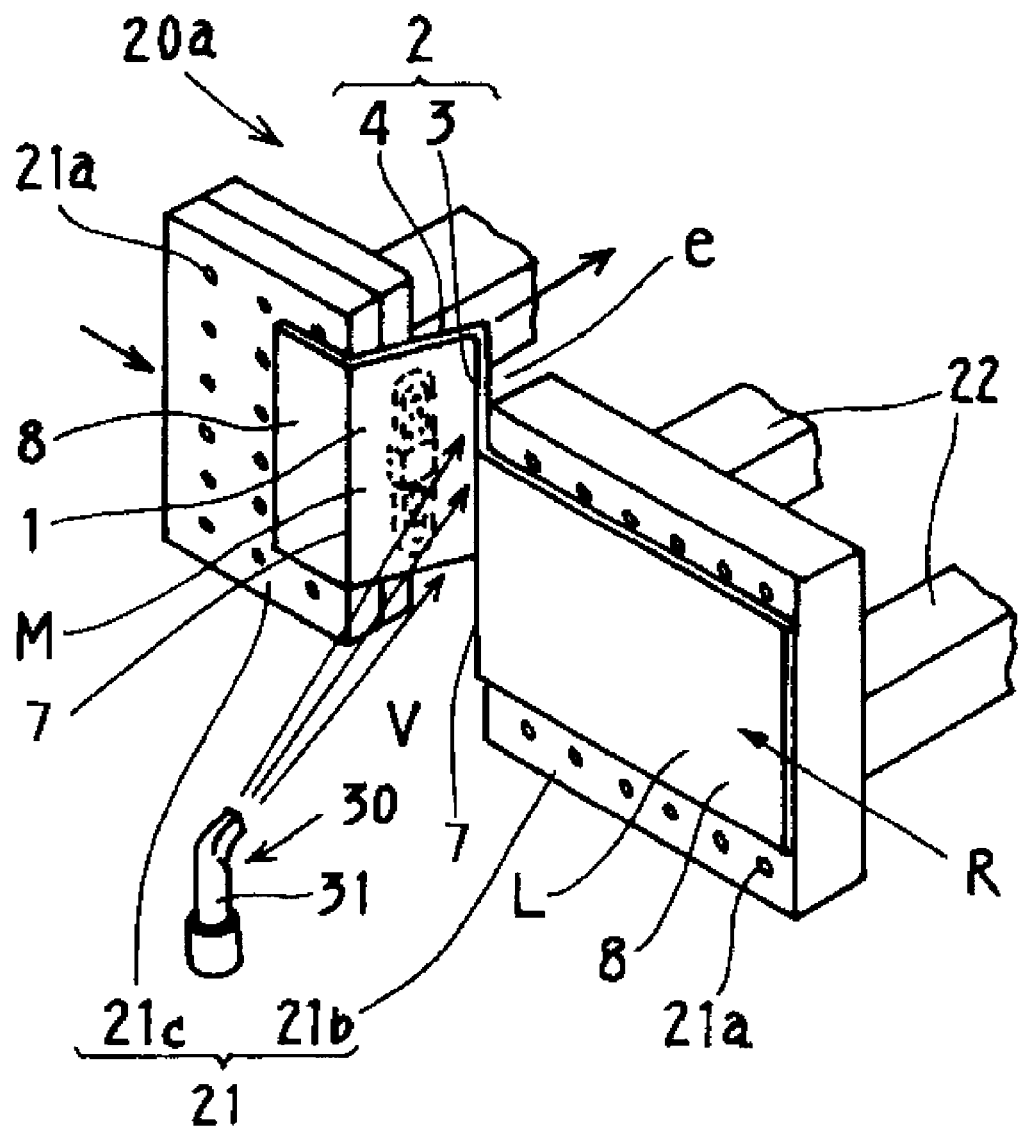
FIG. 1 is a perspective view showing the main parts of a label affixing apparatus according to a first embodiment of the present invention.
Figure 2:
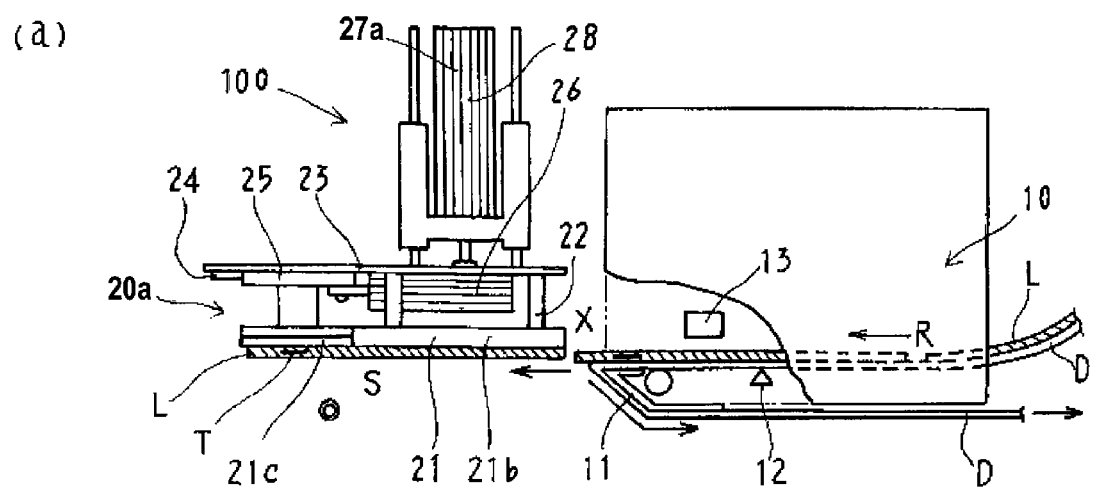
FIGS. 2A through 2D are plan views showing the label affixing apparatus according to the first embodiment of the present invention, and stages during its action.
Figure 2:
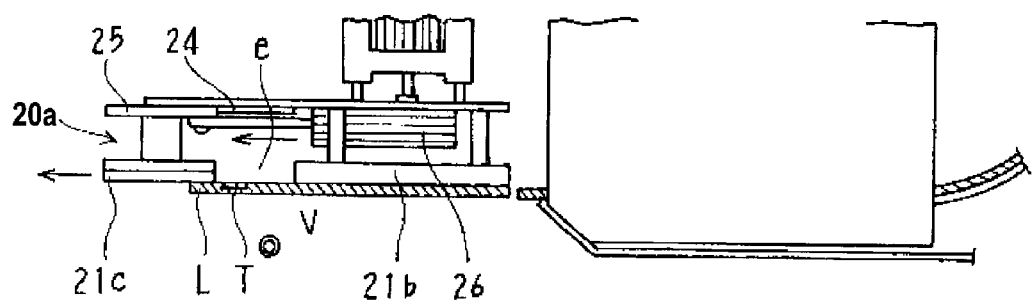
Figure 2:
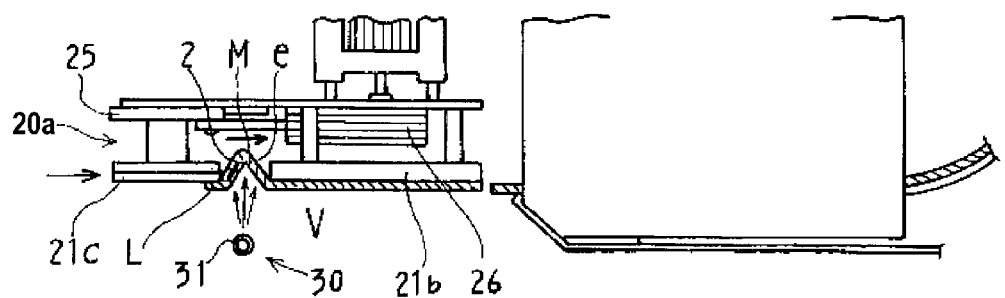
Figure 2:
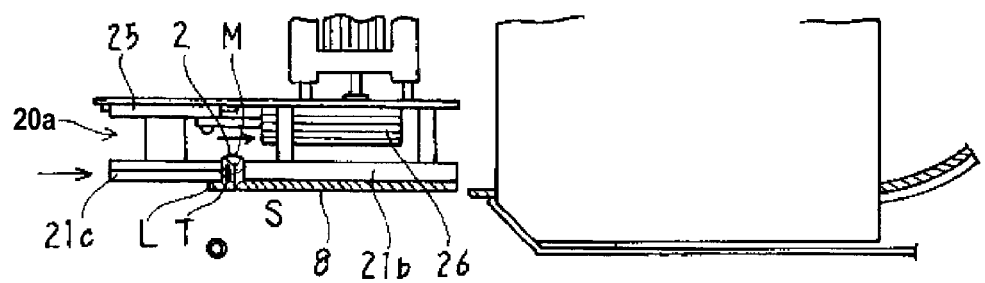

L label
T RFID tag
U display layer
B adhesive layer
P film layer
D backing sheet
Ta IC chip
Tb communication antenna
Ha width Hb height
W product
R conveyance direction
1 tag attachment site
2 part of the label
3 first side face
4 second side face
5 perforation
6 apex portion
7 bend portion
8 affixing surface
M folded portion
C conveyor
10 label conveying means
11 peeling plate
12 sensor
13 reader/writer
13*a* attachment member
20 folding/affixing means
21 suction plate (label holding means)
21*a* small hole
21*b* first divided body
21*c* second divided body
22 support member
23 base
24 rail
25 slider
26 air cylinder device (folding means)
27 moving means
28 air cylinder device
29 guide
29*a* guide shaft
29*b* guide pipe
S joining position
V removed position
e space
X suction position
Y affixing position
30 folding assisting means
31 air blowing nozzle
32 suction nozzle
33 air cylinder device
34 air blowing nozzle
35 hinge mechanism
35*a*, 35*b* hinges
40 folding/affixing means
41 suction plate (label holding means)
41*a* small hole
42 support member
43 base
44 rail
45 slider
46 pressing member
47 air cylinder device (folding means)
48 support body
49 bearing portion
50 sensor
60 fold detecting means
61 optical sensor
62 light projection portion
63 light reception portion
64 hole
80 CPU
81 non-volatile memory
82 EEPROM
83 RAM
84 host
85 external interface
86 conveyance motor
87 conveyance motor control unit
88 operation unit
89 operation control unit
90 sensor control unit
91 reader/writer control unit
92 label affixation control unit (folding control means)
93 system bus
94 scanner
100 label affixing apparatus (first embodiment)
200 label affixing apparatus (second embodiment)
300 label affixing apparatus (third embodiment)
400 label affixing apparatus (fourth embodiment)
500 label affixing apparatus (fifth embodiment)
600 label affixing apparatus (sixth embodiment)
700 label affixing apparatus (seventh embodiment)
800 label affixing apparatus (eighth embodiment)
900 label affixing apparatus (ninth embodiment)
1000 label affixing apparatus (tenth embodiment)
1100 label affixing apparatus (eleventh embodiment)
1200 label affixing apparatus (twelfth embodiment)
1300 label affixing apparatus (thirteenth embodiment)

DESCRIPTION OF PREFERRED EMBODIMENTS OF THE INVENTION

A label affixing apparatus according to an embodiment of the present invention will be described in detail below on the basis of the attached drawings.

First, subject labels of the label affixing apparatus according to an embodiment of the present invention will be described. FIGS. 61 through 67 show examples of a subject label L of the label affixing apparatus.

A tag attachment site 1, to which an RFID tag T of the label L shown in FIGS. 63 through 67 is attached, is a rectangular area having a predetermined width Ha in a conveyance direction R of a backing sheet D, and a predetermined height Hb that extends between a pair of opposing sides of the label L in an orthogonal direction to the conveyance direction R of the backing sheet D.

When it is affixed to a product W, the label L is caused to project in an angular fashion by folding a part 2 of the label L, including the tag attachment site 1 to which the RFID tag T of the label L is attached, from a rear surface side (an adhesive layer B side) to a front surface side (a display layer U side), thereby forming a folded portion M comprising a first side face 3 and a second side face 4 that are formed about an apex portion 6 and respectively include a bend portion 7.

Figure 63:
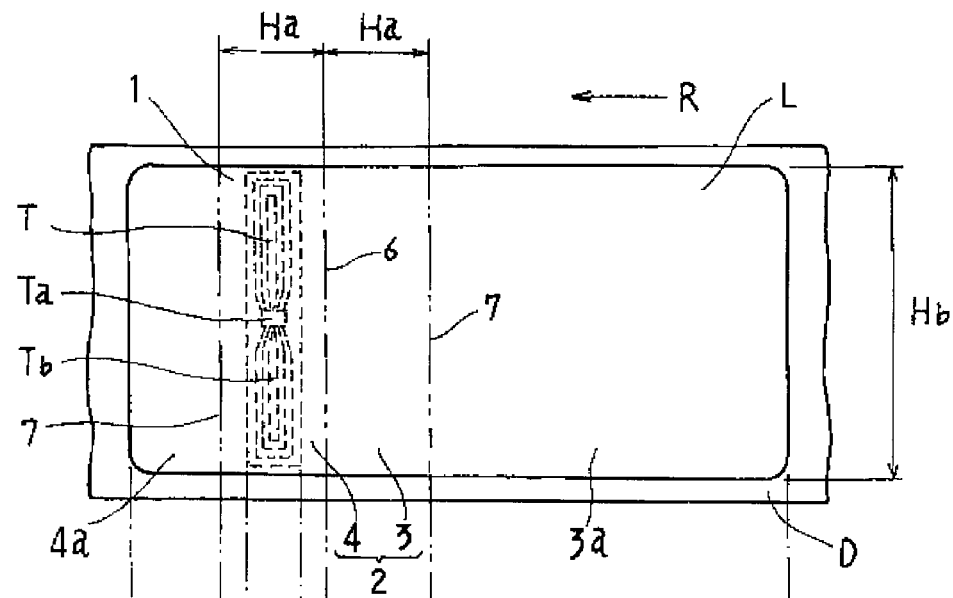
FIGS. 63A through 63C are views showing examples of a subject label of the label affixing apparatus according to the present invention.
Figure 63:
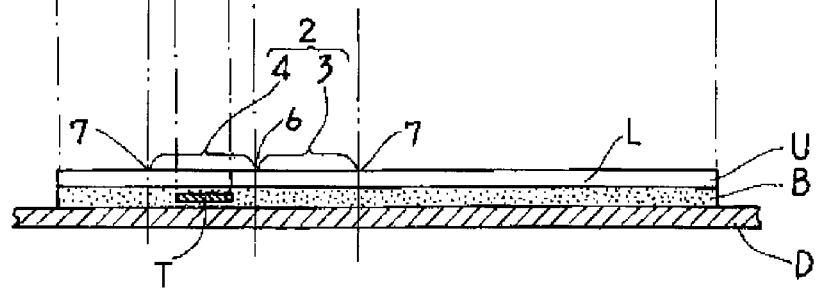
Figure 63:
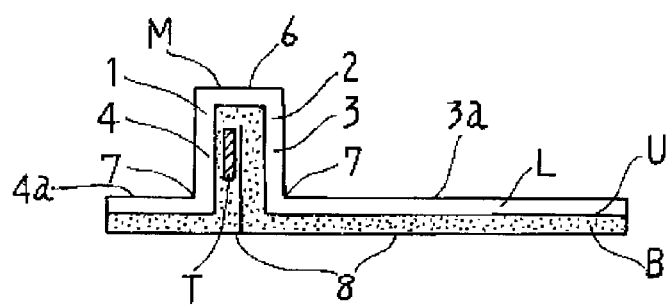
Figure 64:
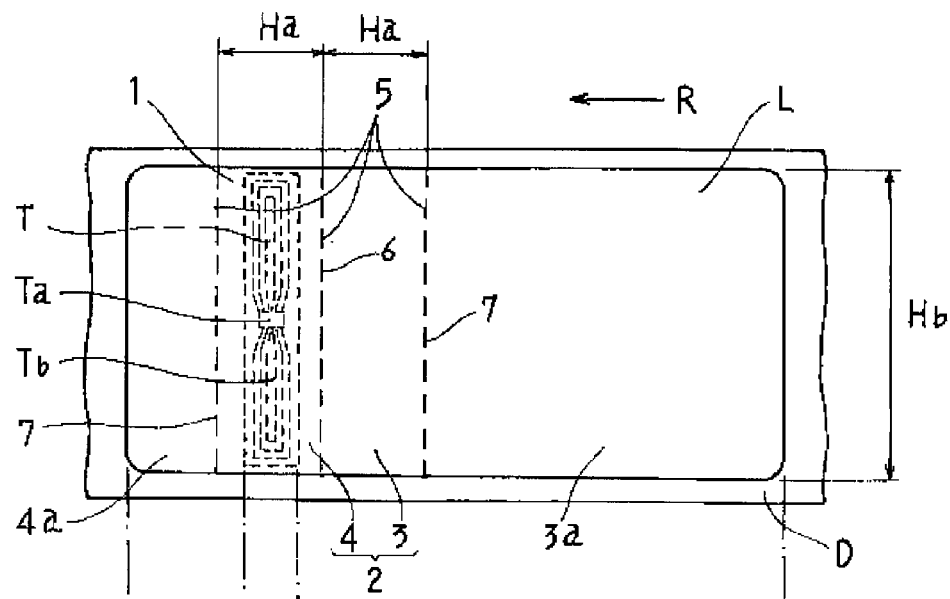
FIGS. 64A through 64C are views showing examples of another subject label of the label affixing apparatus according to the present invention.
Figure 64:
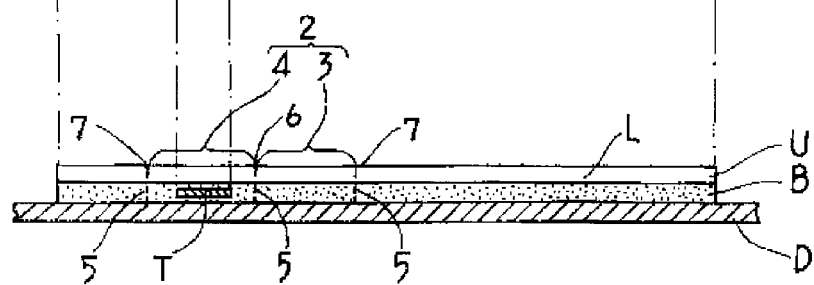
Figure 64:
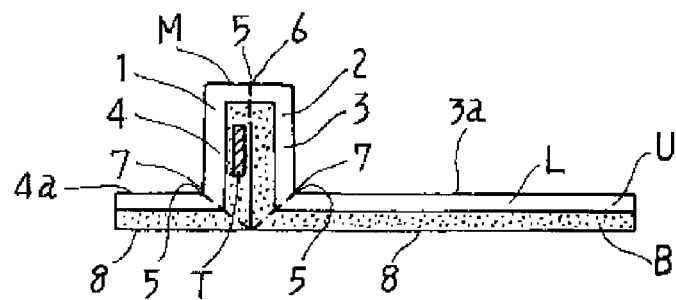
Figure 65:
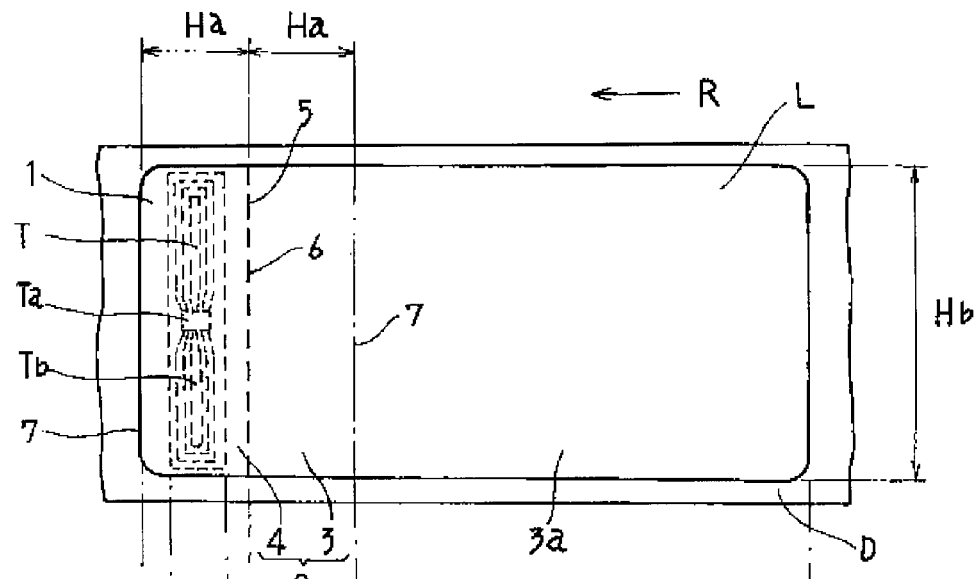
FIGS. 65A through 65C are views showing examples of a further subject label of the label affixing apparatus according to the present invention.
Figure 65:
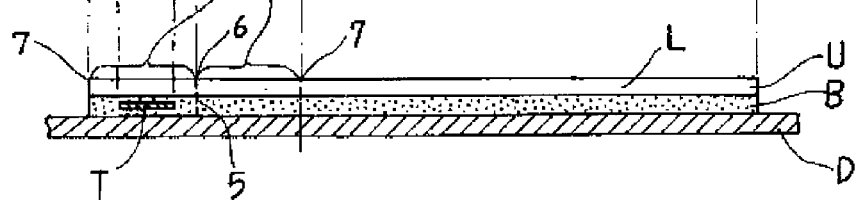
Figure 65:
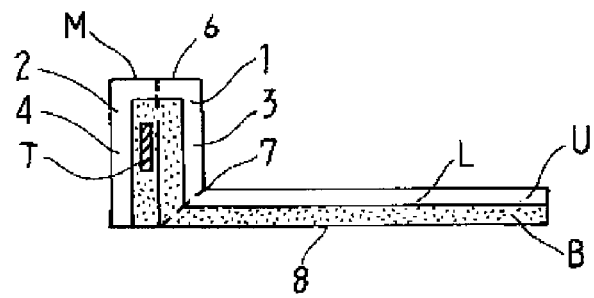
Figure 66:
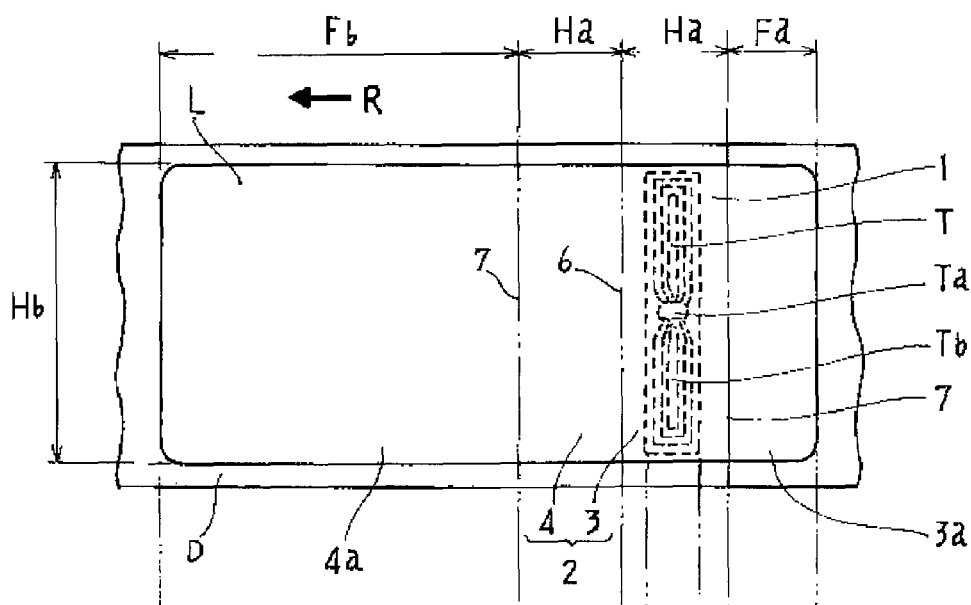
FIGS. 66A through 66C are views showing examples of a further subject label of the label affixing apparatus according to the present invention.
Figure 66:
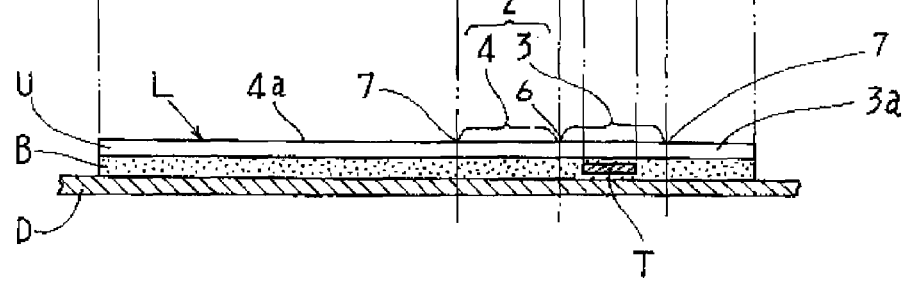
Figure 66:
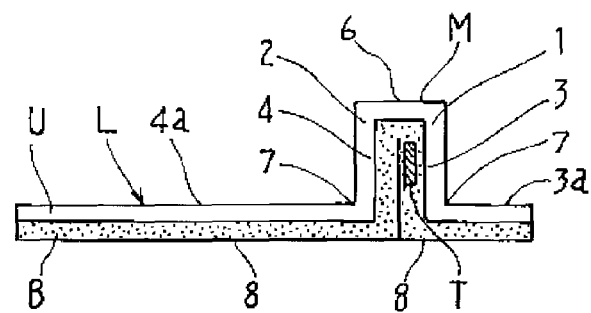
Figure 67:
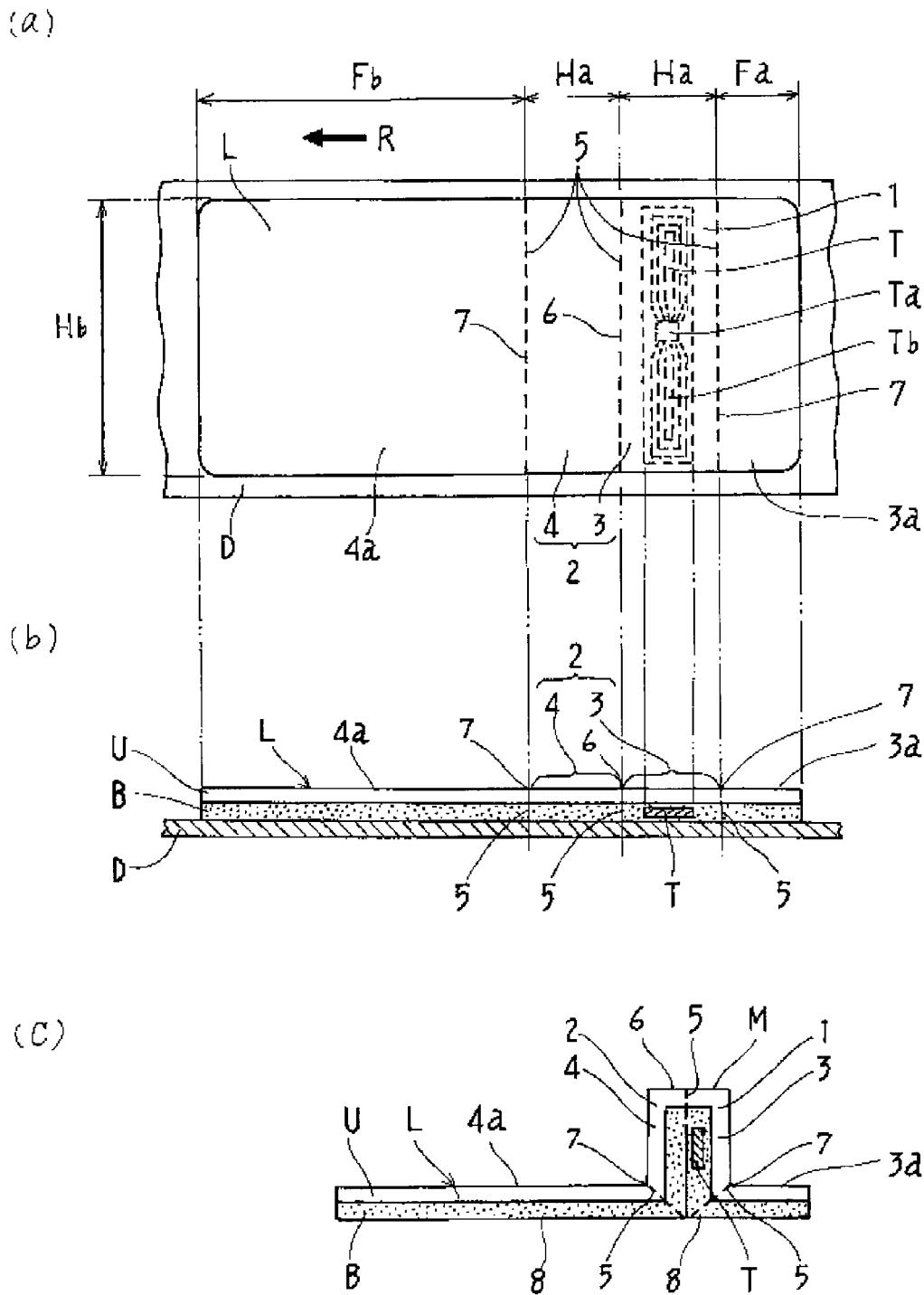
FIGS. 67A through 67C are views showing examples of a further subject label of the label affixing apparatus according to the present invention.
Figure 68:
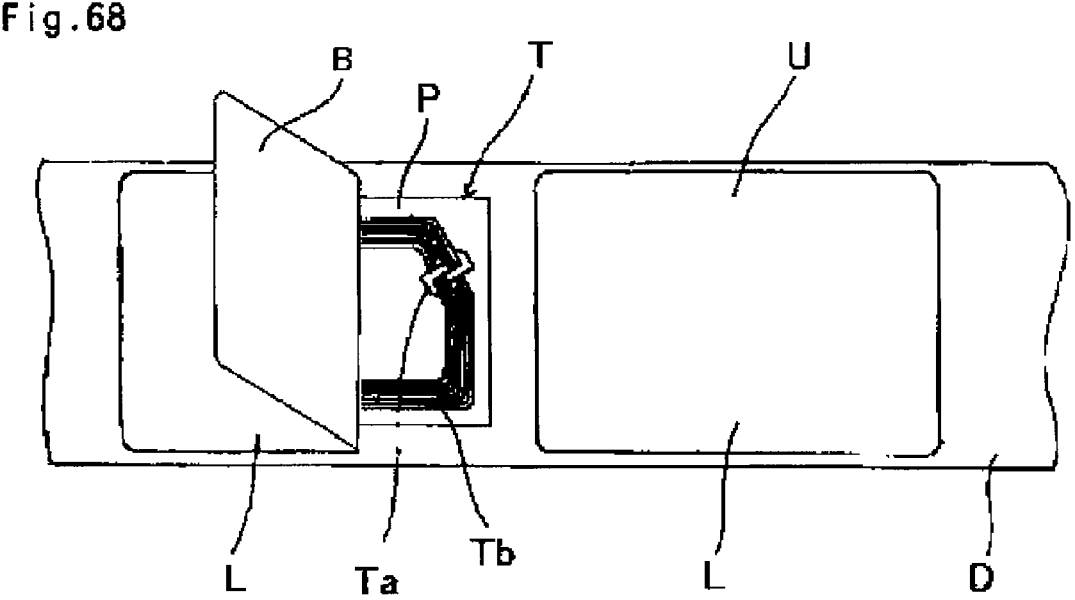
FIG. 68 is a view showing a typical example of a label having an attached RFID tag.

Further, in FIGS. 63 through 65, the tag attachment site 1 is provided on the second side face 4, whereas in FIGS. 66 and 67, the tag attachment site 1 is provided on the first side face 3. However, the tag attachment site 1 may be provided on either of the first side face 3 and second side face 4 formed about the apex portion 6 of the part 2 of the label L that projects in an angular fashion, and may therefore be modified where appropriate.

An affixing surface 8 is for affixing the angularly projecting label L to the product W.

In the label L shown in FIG. 63, the part 2 of the label L is formed in an intermediate portion located further toward the front side in the conveyance direction R of the label L than toward the center of the label L. When the part 2 of the label L is folded from the rear surface side to the front surface side, so as to project in an angular fashion, thereby forming the folded portion M, the affixing surface 8 of the label L is formed on either side of the part 2 of the label L.

The label L shown in FIG. 64 is substantially identical to the label L shown in FIG. 63 except that in the angularly projecting part 2 of the label L, perforations 5 are formed on the angularly projecting apex portion 6 and the bend portions 7. The perforations 5 enable folding to be performed easily.

In the label L shown in FIG. 65, the part 2 of the label L is formed at an end portion of the label L, and in the angularly projecting part 2 of the label L, perforations 5 are formed on the angularly projecting apex portion 6. When the part 2 of the label L is folded from the rear surface side to the front surface side so as to project in an angular fashion, the affixing surface 8 of the label L is formed on one side of the part 2 of the label L. Perforations may also be formed on the bend portions 7 of the angular part 2 of the label L shown in FIG. 65.

In the label L shown in FIG. 66, the part 2 of the label L is provided in an intermediate portion such that the relationship between a length Fa of a first side portion 3a and a length Fb of a second side portion 4a is Fa≦Fb. The second side portion 4a serves as a main display portion that is set at various lengths so that main display by means of printing or the like can be performed thereon. In other words, the length of the second side portion 4a differs according to the amount of display information and the like thereon. Therefore, there may be a plurality of types of labels L in which the length Fa of the first side portion remains the same but the length Fb of the second side portion 4a varies When the part 2 of the label L is folded from the rear surface side to the front surface side so as to project in an angular fashion, thereby forming the folded portion M, the affixing surface 8 of the label L is formed on either side of the part 2 of the label L.

The label L shown in FIG. 67 is substantially identical to the label L shown in FIG. 66 except that in the angularly projecting part 2 of the label L, perforations 5 are formed on the angularly projecting apex portion 6 and the bend portions 7. The perforations 5 enable folding to be performed easily.

Note that in the following description, it is assumed that the RFID tag T of the labels L shown in FIGS. 63 through 67 is attached to the inside of the adhesive layer B. But, the present invention is not limited thereto, and similar effects are exhibited when the RFID tag T is provided between the display layer U and the adhesive layer B, on the lower surface (the backing sheet D side) of the adhesive layer B, or on the front surface (the opposite surface to the surface contacting the adhesive layer B) of the display layer U.

However, by providing a two-ply structure in which the tag attachment site 1 is covered by the display layer U and the adhesive layer B of the label L, the strength of this part can be increased and the RFID tag T can be protected from situations in which it is easily damaged. Therefore, the RFID tag T is preferably attached to the inner side (the adhesive layer B side) of the first side face 3 or second side face 4 of the part 2 of the label L including the tag attachment site 1 for attaching the RFID tag T.

Figure 61:
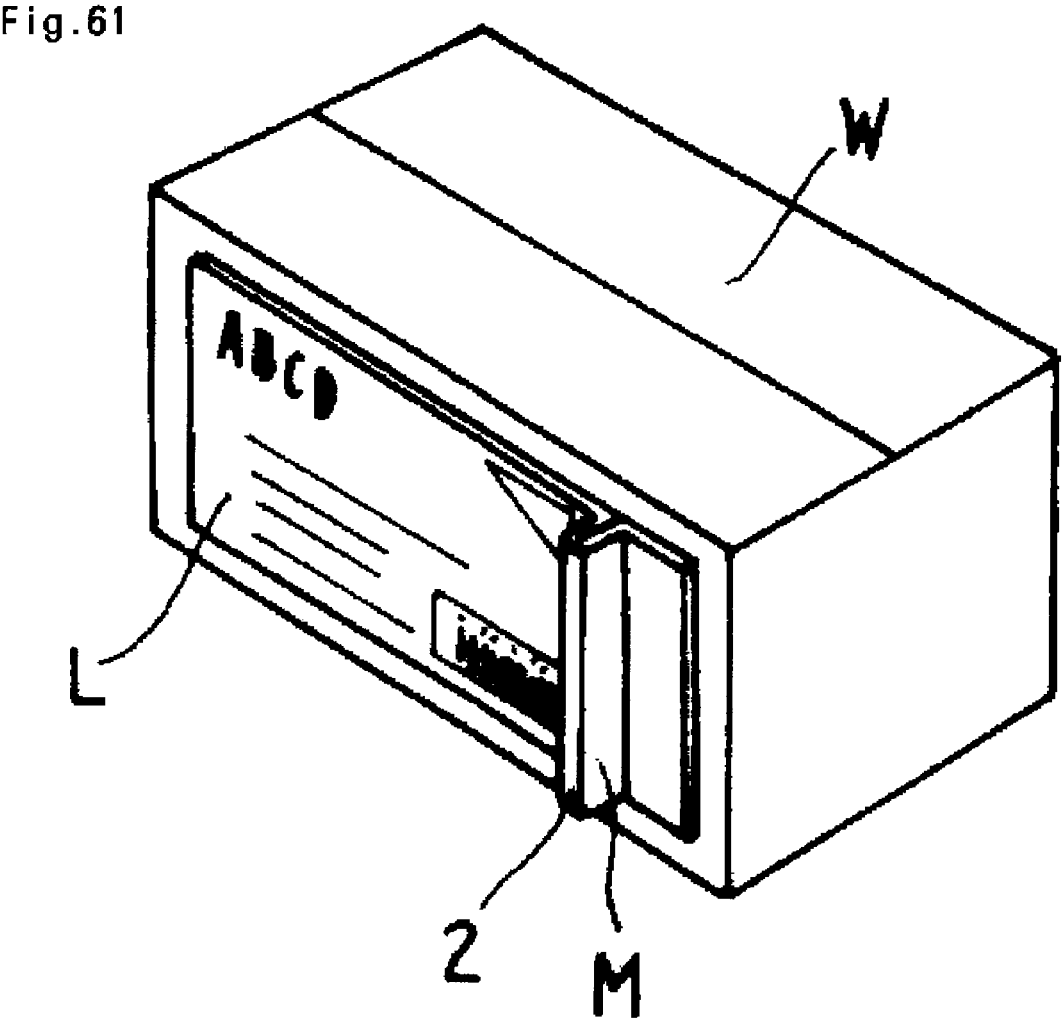
FIG. 61 is a perspective view showing the condition of a label affixed to a product by the label affixing apparatus according to an embodiment of the present invention.

FIGS. 1 through 7 and 59 show a label affixing apparatus according to a first embodiment of the present invention. As shown in FIGS. 61, 63 and 64, in the label L of a label affixing apparatus 100 according to the first embodiment, the part 2 of the label L including the tag attachment site 1, is formed in an intermediate portion of the label L.

The label affixing apparatus 100 according to the first embodiment affixes the label L to the product W, which is conveyed in a predetermined conveyance direction by a conveyor C. The label affixing apparatus 100 comprises label conveying means 10 and folding/affixing means 20a.

The label conveying means 10 are comprised of a peeling plate 11 for peeling the label L from the backing sheet D, a sensor 12 for detecting that the label L has been conveyed to a predetermined position, and a reader/writer 13 for rewriting data to the IC chip Ta of the RFID tag T. The label conveying means 10 convey the backing sheet D, which is fed from a roll not shown in the drawings with the label L temporarily adhered thereto, and peel away the label L by folding back the backing sheet D using the peeling plate 11. The folded-back backing sheet D is wound onto a reel, not shown in the drawings.

As the label L is conveyed, the sensor 12 measures a timing for activating the folding/affixing means 20a on the basis of detection of the label L, while the reader/writer 13 rewrites data to the IC chip Ta of the RFID tag T, and performs inspections and so on through information writing and reading.

The folding/affixing means 20a comprise a suction plate 21 (label holding means), and the suction plate 21 aspirates the front surface side of the label L that has been peeled away by the peeling plate 11 such that the part 2 of the label L that includes the tag attachment site, 1 to which the RFID tag T of the label L is attached, can be caused to project from the rear surface side to the front surface side. The suction plate 21 is provided with a plurality of small holes 21a that suck up air in order to aspirate the front surface of the label L.

The suction plate 21 is comprised of a pair of divided bodies 21b, 21c, which are divided along an orthogonal line to the conveyance direction R of the label L and serve to aspirate the label L. The first divided body 21b is supported on a base 23 via a support member 22.

The second divided body 21c is supported on the base 23 via a rail 24 and a slider 25 that slides along the rail 24 so as to be capable of sliding in the conveyance direction R of the label L, and thus the second divided body 21c is supported so as to be capable of moving between two positions, namely a joining position S in which a rear end portion of the second divided body 21c in the conveyance direction R of the label L meets a front end portion of the first divided body 21b in the conveyance direction R of the label L, and a removed position V in which the second divided body 21c is removed from the first divided body 21b. In the removed position V, a space e into which the part 2 of the label L that projects from the rear surface side to the front surface side can enter is formed between the first divided body 21b and the second divided body 21c, and the first divided body 21b and the second divided body 21c respectively aspirate and hold the two conveyance direction R end portion sides of the label L.

Further, the second divided body 21c is driven by an air cylinder device 26 (folding means) that positions the second divided body 21c in the joining position S during retreat and in the removed position V during advancement. The air cylinder device 26 is comprised of a piston to which the slider 25 of the second divided body 21c is attached, and a cylinder fixed to the base 23.

The folding/affixing means 20a further comprise moving means 27a for moving the suction plate 21 between two positions, namely a suction position X for aspirating the label L peeled away by the peeling plate 11 and an affixing position Y for affixing the aspirated label L to the product W. The moving means 27a comprise an air cylinder device 28 comprised of a piston to which the base 23 is attached and a cylinder provided on a machine base (not shown) side. The reference numeral 29 denotes a guide comprised of a guide shaft 29a for guiding the movement of the base 23 and a guide pipe 29b into which the guide shaft 29a is inserted slidably.

The folding/affixing means 20a further comprise folding assisting means 30a for providing assistance to ensure that the part 2 of the label L that projects from the rear surface side to the front surface side enters the gap between the first divided body 21b and second divided body 21c.

The folding assisting means 30a comprise an air blowing nozzle 31 that blows air onto the part 2 of the label L from the rear surface side (the adhesive layer B side) such that the part 2 of the label L is folded in an angular fashion toward the front surface side by the force of the air. The part 2 of the label L is folded by the air blowing nozzle 31 and the air cylinder device 26, thereby forming the folded portion M comprising the first side face 3 and the second side face 4, which are formed about the apex portion 6 and respectively include the bend portion 7, and thus folding is performed reliably.

The folding/affixing means 20a further comprise traction suppressing means for suppressing traction that causes the folding/affixing means 20a to grip the folded portion M of the label when the label hold of the suction plate 21 serving as the label holding means is released after the label L is affixed. More specifically, as shown in FIG. 4A, the traction suppressing means subject the air cylinder device 26 to drive control such that the second divided body 21c is moved from the joining position S to the removed position V and the first divided body 21b does not remain in contact with the folded portion M of the label L.

The traction suppressing means also function to blow air onto the label L from the suction plate 21 serving as the label holding means. More specifically, as shown in FIG. 4B, the traction suppressing means cause the small holes 21a in the suction plate 21 to expel air when returning the suction plate 21 to the suction position X from the affixing position Y.

Figure 59:
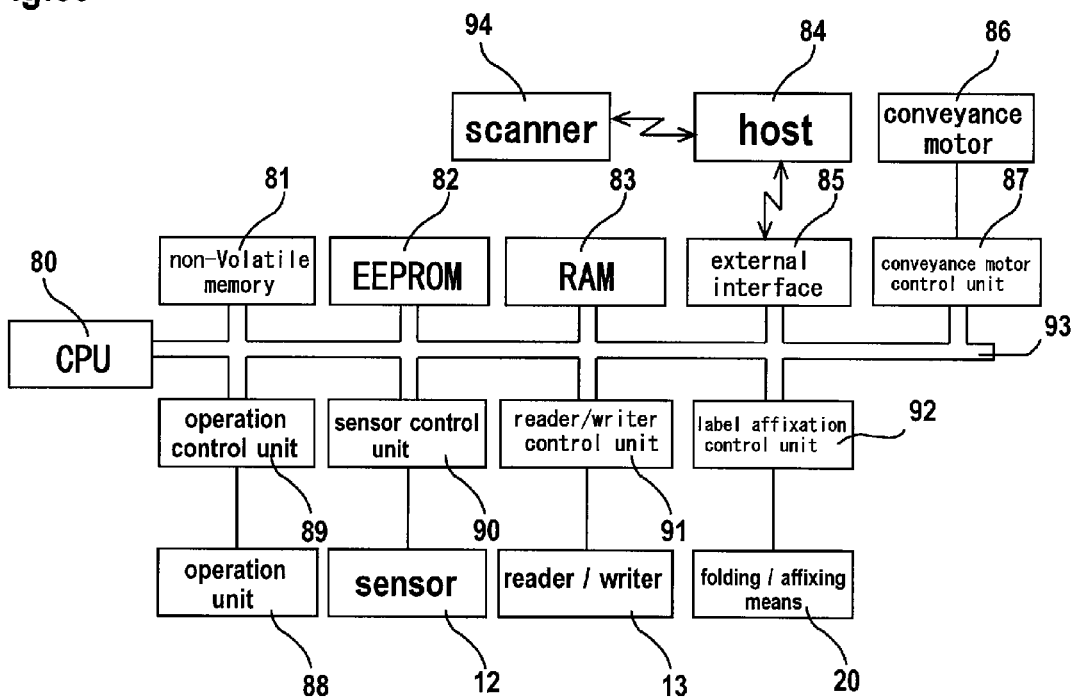
FIG. 59 is a circuit diagram of the label affixing apparatus according to the first embodiment of the present invention.

FIG. 59 is a circuit diagram of the label affixing apparatus according to the first embodiment.

The label affixing apparatus 100 controls, via a system bus 93, a CPU 80 for administering the label affixing apparatus 100, non-volatile memory 81 constituted by ROM, flash memory, or similar for storing the programs of various control units, EEPROM 82 (Electrically Erasable Programmable Read-Only Memory) for holding various operation settings of the label affixing apparatus 100 rewritably, RAM 83, which is used as the working area of the CPU 80, an external interface 85 for performing wired or wireless communication with an external machine (a host 84), a conveyance motor control unit 87 that controls a conveyance motor 86 for conveying the backing sheet D, an operation control unit 89 for controlling an operation unit 88 comprised of various buttons and a display panel, which sets information relating to the operations of the label affixing apparatus 100, a sensor control unit 90 for controlling the sensor 12 that detects the label L, a reader/writer control unit 91 for controlling the reader/writer 13 that rewrites data to the IC chip Ta of the RFID tag T, and a label affixation control unit 92 (folding control means) for controlling the folding/affixing means 20a. A scanner 94 for reading a barcode attached to the product W is connected to the host 84.

The EEPROM 82 is provided with an operation flag region for determining whether or not the label affixation control unit 92 is to operate the air cylinder device 26 (folding means) and the folding assisting means 30a. The setting of the operation flag region is performed according to any one of setting from the operation unit 88 (FIG. 5), setting that corresponds to a command received by the external interface 85 (FIG. 6), and setting performed by the reader/writer 13 to detect a normal label to which the RFID tag T is not attached and the label L to which the RFID tag T is attached (FIG. 7). Control is performed in the label affixation control unit 92 such that when ON (1) is set in the operation flag region of the EEPROM 82, the air cylinder device 26 (folding means) and folding assisting means 30a are operated during an operation to affix the label L, and when OFF (0) is set, the air cylinder device 26 (folding means) and folding assisting means 30a are not operated.

Hence, the following routine is performed to affix the label L using the label affixing apparatus 100 according to the first embodiment.

Here, a case in which setting of the operation flag in the operation flag region of the EEPROM 82 is performed in accordance with setting from the operation unit 88 (FIG. 5) will be described. At this setting, products W having identical contents are conveyed continuously by the conveyor C, for example. When the label loaded in the label affixing apparatus 100 at the product W boundary is a normal label, the operation flag is set to OFF (0), and when the label L attached with the RFID tag T is loaded, the operation flag is set to ON (1).

First, an operation of the label affixing apparatus 100 performed when the operation flag in the operation flag region of the EEPROM 82 is set to ON (1) by the operation unit 88 will be described using FIGS. 1 through 5.

Figure 5:
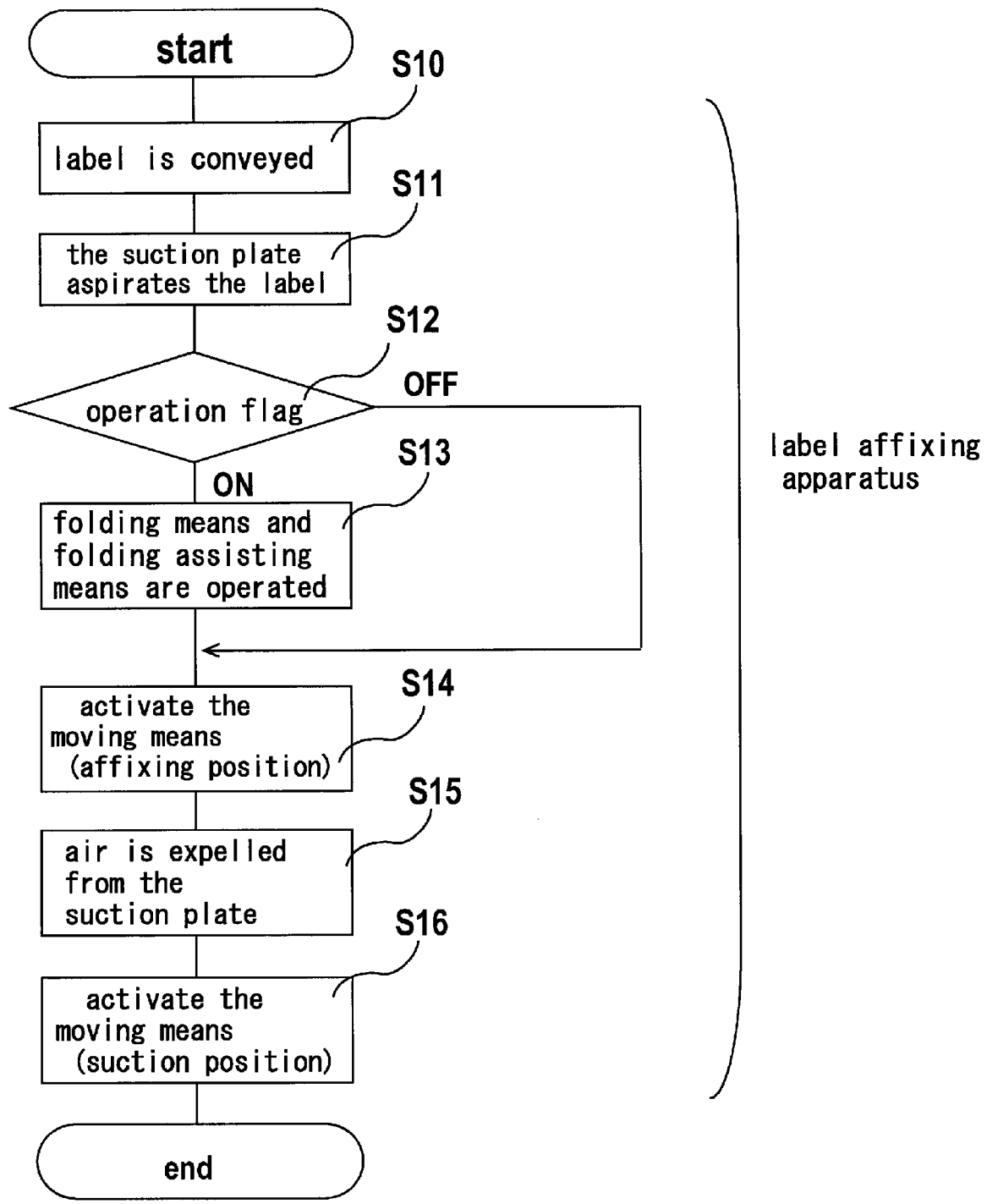
FIG. 5 is a flowchart showing operation of the label affixing apparatus according to the first embodiment of the present invention.

With reference to the flowchart shown in FIG. 5, the label L is conveyed as shown in FIG. 2A by the label conveying means 10 (S10), and the sensor 12 measures the timing at which the label affixation control unit 92 operates the folding/affixing means 20a on the basis of detection of the label L. Next, when the backing sheet D is folded back by the peeling plate 11 such that the label L is peeled away, the suction plate 21 aspirates the label L in the suction position X (S11).

Since ON (1) is set in the operation flag region of the EEPROM 82 (S12 ON), the label affixation control unit 92 operates the air cylinder device 26 (folding means) and the folding assisting means 30a during the operation to affix the label L (S13).

More specifically, as shown in FIG. 2B, the label affixation control unit 92 activates the air cylinder device 26 to position the second divided body 21c in the removed position V. As a result, the space e, into which the part 2 of the label L that projects from the rear surface side (the adhesive layer B side) to the front surface side (the display layer U side) can enter, is formed between the first divided body 21b and second divided body 21c.

Next, as shown in FIGS. 1 and 2C, the label affixation control unit 92 activates the air cylinder device 26 to move the second divided body 21c from the removed position V to the joining position S. Also at this time, the label affixation control unit 92 activates the air blowing nozzle 31 to blow air toward the rear surface side (the adhesive layer B side) of the part 2 of the label L including the tag attachment site 1 to which the RFID tag T of the label L is attached. As a result, the bend portion 7 of the first side face 3 and the bend portion 7 of the second side face 4 are pressed in a direction for causing the respective rear surfaces of the first side face 3 and second side face 4 to approach each other while the first divided body 21b and second divided body 21c respectively aspirate and hold the two conveyance direction R end portion sides of the label L, thereby forming the folded portion M. In this case, the part 2 of the label L is pushed toward the front surface side (the display layer U side) by the force of the air blown by the air blowing nozzle 31, and therefore the part 2 of the label L is reliably folded into an angular shape.

As shown in FIG. 2D, when the second divided body 21c moves from the removed position V to the joining position S, the opposing end surfaces of the first divided body 21b and the second divided body 21c respectively come into contact with the front surfaces (display layer U) of the first side face 3 and second side face 4 forming the part 2 of the label L and press these front surfaces such that the rear surfaces of the first side face 3 and second side face 4 are joined. As a result, the folded portion M is formed.

Figure 3:
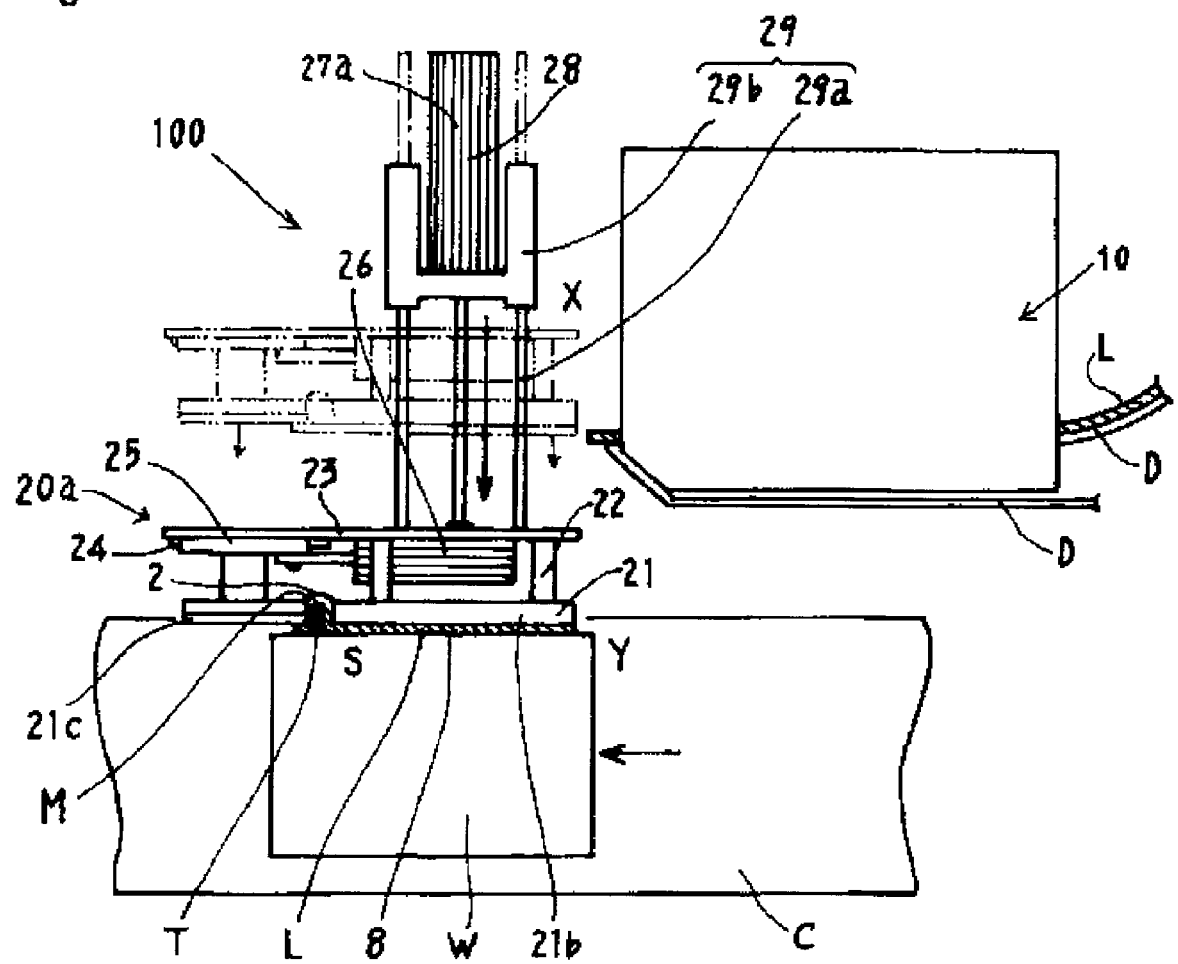
FIG. 3 is a plan view showing the label affixing apparatus according to the first embodiment of the present invention, and its action.
Figure 4:
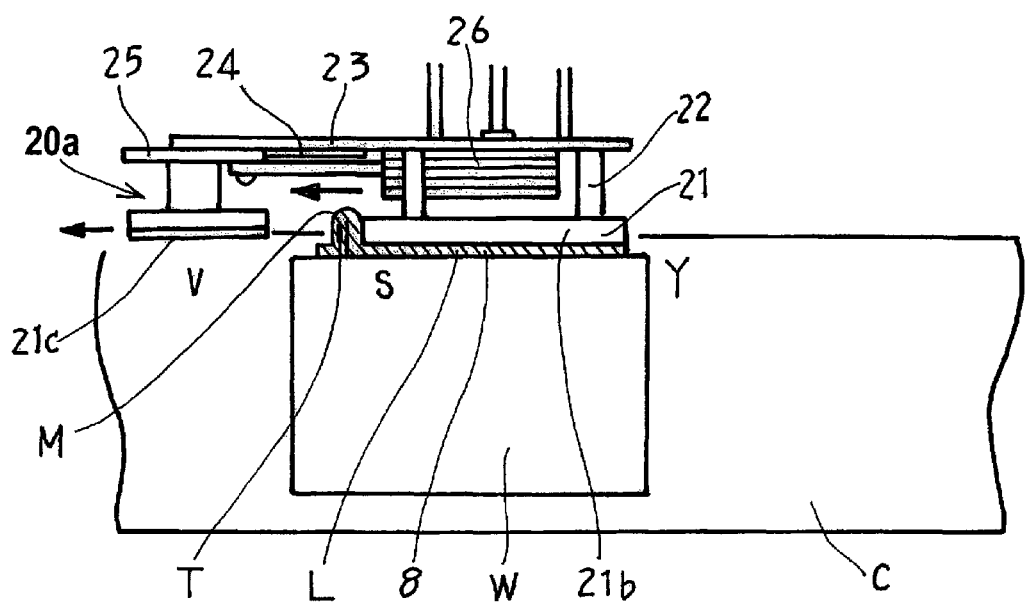
FIGS. 4A and 4B are plan views showing the label affixing apparatus according to the first embodiment of the present invention, and its action.
Figure 4:
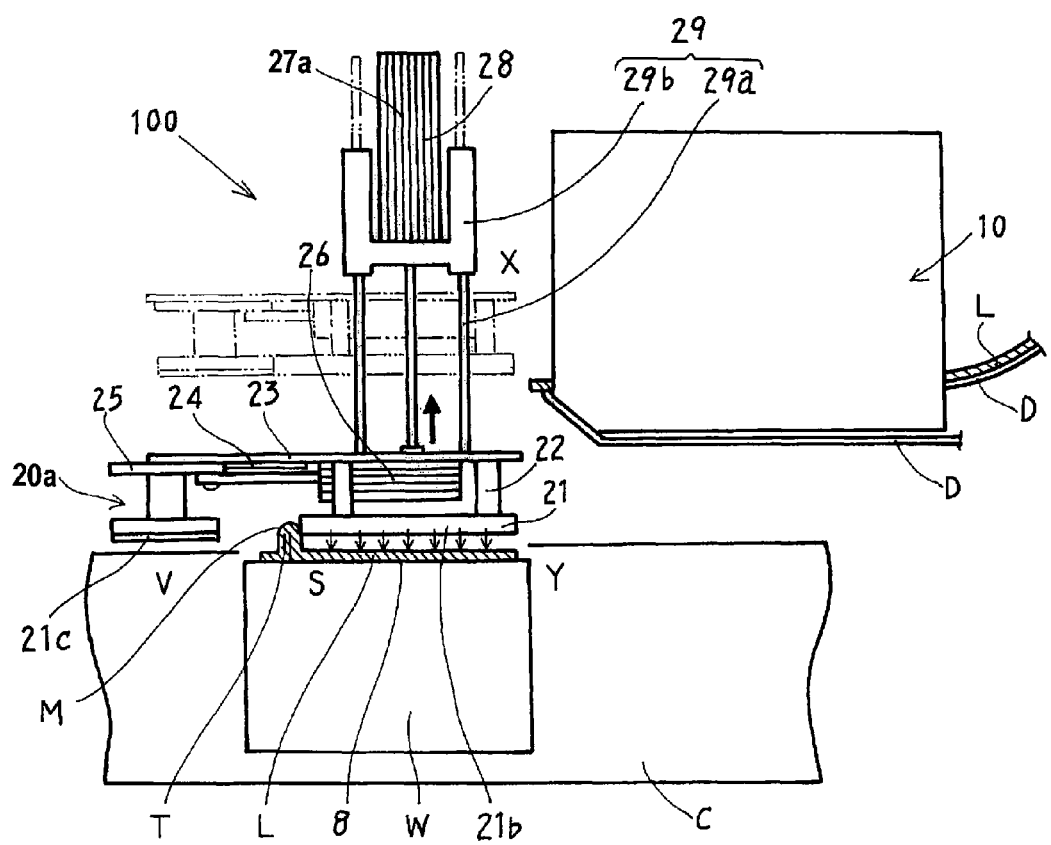

Next, as shown in FIG. 3, the label affixation control unit 92 activates the air cylinder device 28 of the moving means 27a to move the suction plate 21 from the suction position X to the affixing position Y (S14). As a result, the aspirated label L is affixed to the product W. In this case, the affixing surface 8 of the label L is formed on either side of the folded portion M forming the angularly projecting part 2 of the label L, and therefore the affixing surface 8 is pressed against the product W by the first divided body 21b and second divided body 21c such that the label L is reliably affixed to the product W.

Next, the traction suppressing means are operated, or more specifically, as shown in FIG. 4A, the air cylinder device 26 (folding means) is drive-controlled to move the second divided body 21c from the joining position S to the removed position V (S15). Further, as shown in FIG. 4B, air is expelled from the small holes 21a in the suction plate 21 (S15). As shown in FIG. 4B, the air cylinder device 28 of the moving means 27a is activated in synchronized with the operation of the traction suppressing means to return the suction plate 21 to the suction position X from the affixing position Y (S16).

In this case, the second divided body 21c is moved to the removed position V side, and since the folded portion M of the label L is not gripped and dragged by the divided bodies 21b, 21c, traction is suppressed, thereby preventing the folded portion M being pulled such that the label L is peeled away. A situation in which the divided bodies 21b, 21c scratch the label L so as to damage the label is also prevented, and therefore label affixation can be performed reliably. Furthermore, air is blown onto the label L from the suction plate 21, and therefore a force for pressing the label L toward the product W side, while separating the label L from the suction plate 21, acts on the label L. Thus, label affixation can be performed reliably.

Next, a case in which a normal label not attached with the RFID tag T is affixed is described. In this case, the operation flag in the operation flag region of the EEPROM 82 is set to OFF (0) in the operation unit 88.

As shown in FIG. 2A, the label L is conveyed by the label conveying means 10 (S10), and the sensor 12 measures the timing at which the label affixation control unit 92 operates the folding/affixing means 20a on the basis of detection of the label L. Next, when the backing sheet D is folded back by the peeling plate 11 such that the label L is peeled away, the suction plate 21 aspirates the label L in the suction position X (S11).

Since OFF (0) is set in the operation flag region of the EEPROM 82 (S12 OFF), the label affixation control unit 92 activates the air cylinder device 28 of the moving means 27a without operating the air cylinder device 26 (folding means) and folding assisting means 30a, whereby the suction plate 21 is moved from the suction position X to the affixing position Y (S14).

Next, similarly to the operation described above, air is expelled from the small holes 21a in the suction plate 21 (S15). Note that in this case, the air cylinder device 26 (folding means) is not drive-controlled. The air cylinder device 28 of the moving means 27a is then activated to return the suction plate 21 to the suction position X from the affixing position Y (S16).

In this case, air is blown onto the label L from the suction plate 21, providing a force for pressing the label L toward the product W side while separating the label L from the suction plate 21 acts on the label L. Thus, the label L can be affixed reliably. As a result, the aspirated normal label is affixed in planar form to the product W. Hence, the setting from the operation unit 88 can be introduced easily into a small system in which the number of product types is small and simple sorting is performed.

Next, a case in which the operation flag is set in accordance with a command received by the external interface 85 will be described using the flowchart shown in FIG. 6. This setting is employed when the label L attached with the RFID tag T is loaded in the label affixing apparatus 100 and products W having different contents are conveyed together by the conveyor C, for example. A barcode written with an instruction indicating whether to affix the label L attached with the RFID tag T in planar form (operation flag OFF) or in an angularly folded form (operation flag ON) is provided on the product W in accordance with the type of the product W, and the label L is affixed in accordance with the instruction on the barcode.

Figure 6:
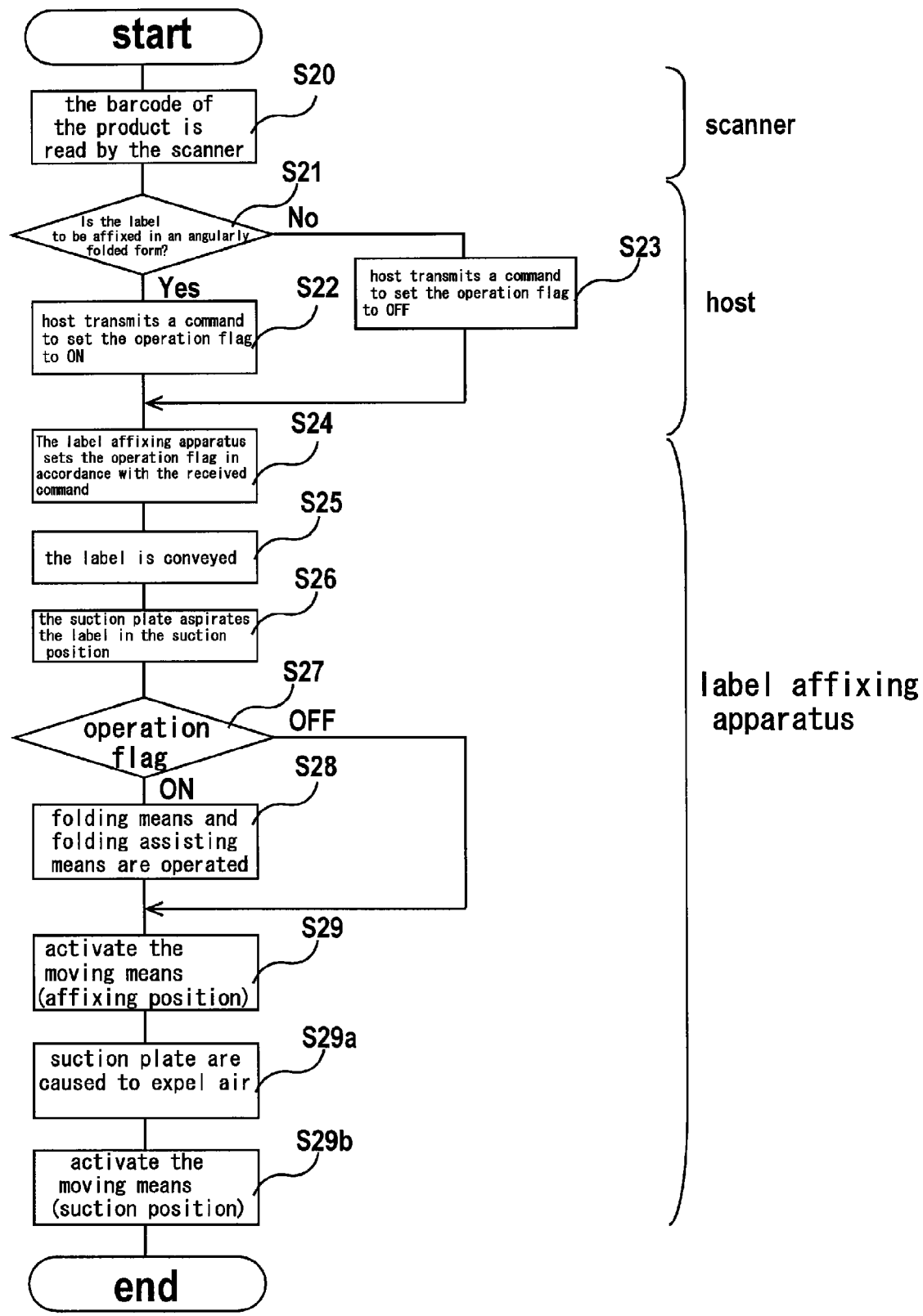
FIG. 6 is a flowchart showing another operation of the label affixing apparatus according to the first embodiment of the present invention.
Figure 7:
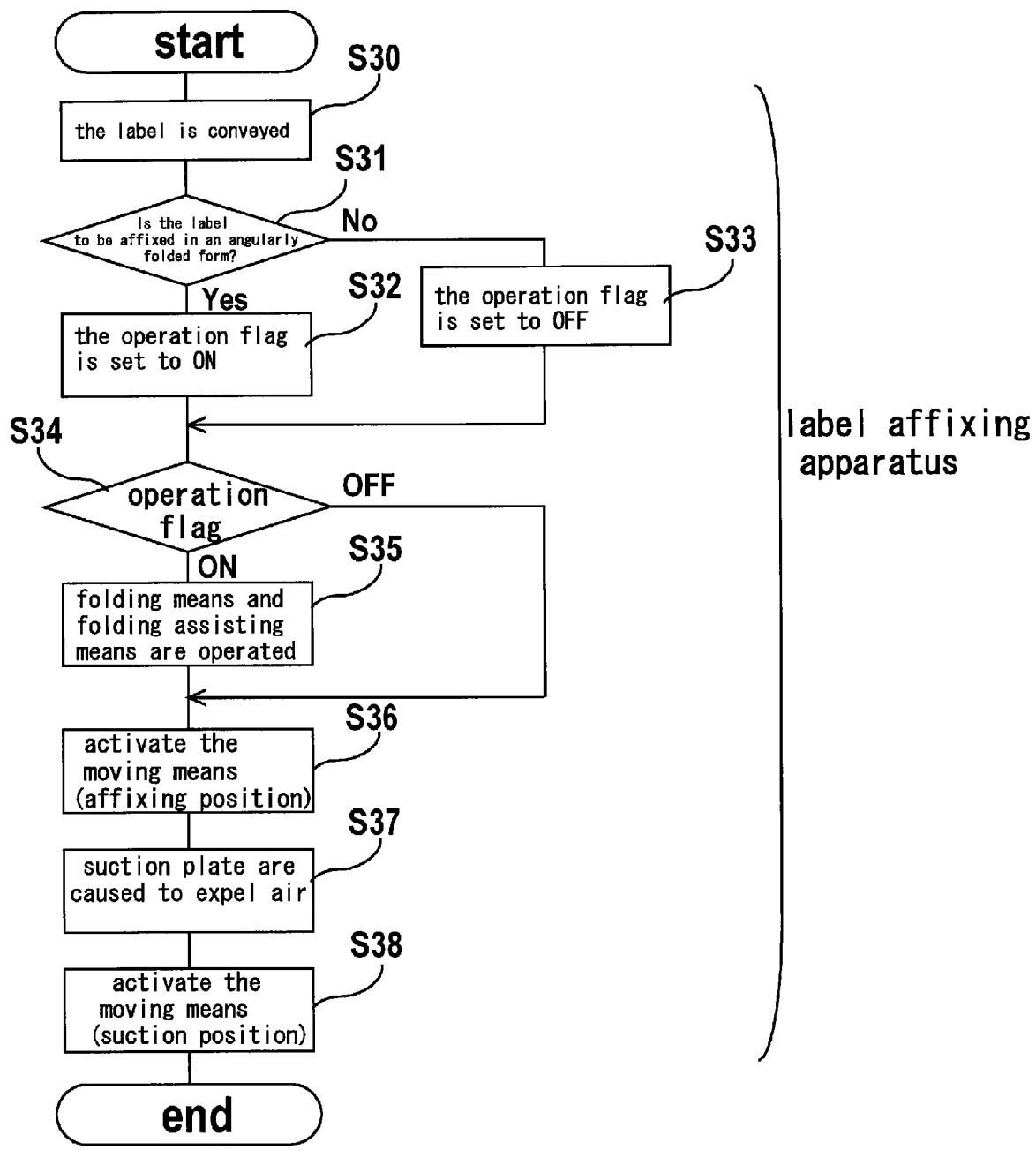
FIG. 7 is a flowchart showing a further operation of the label affixing apparatus according to the first embodiment of the present invention.

As shown in FIG. 6, first, the barcode of the product W is read by the scanner 94 (S20), whereupon the host 84 determines whether the content of the barcode read by the scanner 94 indicates that the label L is to be affixed in an angularly folded form (operation flag ON) or a planar form (operation flag OFF) (S21), and transmits a corresponding command (S22, S23). The label affixing apparatus 100 sets the operation flag in the operation flag region of the EEPROM 82 to ON (1) or OFF (0) in accordance with the received command (S24).

Then, when the label L is conveyed by the label conveying means 10 (S25) and the backing sheet D is folded back by the peeling plate 11 such that the label L is peeled away, the suction plate 21 aspirates the label L in the suction position X (S26).

Next, when the operation flag in the operation flag region of the EEPROM 82 is set at ON (1) (S27 ON), the label affixation control unit 92 operates the air cylinder device 26 (folding means) and folding assisting means 30a (S28).

The label affixation control unit 92 then activates the moving means 27a (S29) such that the label L is affixed to the product W in an angularly folded form.

Next, similarly to the operation described above, the air cylinder device 26 (folding means) is drive-controlled to move the second divided body 21c from the joining position S to the removed position V side, and the small holes 21a in the suction plate 21 are caused to expel air (S29a).

The air cylinder device 28 of the moving means 27a is then activated to return the suction plate 21 to the suction position X from the affixing position Y (S29b).

When OFF (0) is set in the operation flag region of the EEPROM 82 (S27 OFF), the label affixation control unit 92 activates the air cylinder device 28 of the moving means 27a without operating the air cylinder device 26 (folding means) and folding assisting means 30a, whereby the suction plate 21 is moved from the suction position X to the affixing position Y (S29).

As a result, the aspirated normal label is affixed to the product W in planar form.

Next, similarly to the operation described above, air is expelled from the small holes 21a in the suction plate 21 (S29a), and the air cylinder device 28 of the moving means 27a is activated to return the suction plate 21 to the suction position X from the affixing position Y (S29b).

In a setting that corresponds to a command received by the external interface 85, the form in which the label L attached with the RFID tag T is affixed (planar form or angularly folded form) can be modified easily according to the type or content of the product W.

Note that in the above description, the barcode of the product W is read by the scanner 94, whereupon the host 84 determines whether the content of the barcode read by the scanner 94 indicates that the label L is to be affixed in an angularly folded form or a planar form and transmits a corresponding command. However, a construction may be employed in which an external machine is used as a scanner, the label affixing apparatus 100 receives barcode data read by the scanner via the external interface 85, and the label affixation control unit 92 operates the air cylinder device 26 (folding means) and folding assisting means 30*a* in accordance with the content of the barcode read by the scanner.

A case in which setting of the operation flag is performed by having the reader/writer 13 detect either a normal label to which the RFID tag T is not attached or the label L to which the RFID tag T is attached will be described using the flowchart shown in FIG. 7.

In this setting, the type of label loaded in the label affixing apparatus 100 is determined by the reader/writer 13 during conveyance, for example, such that when an RFID label requiring advance folding is detected, the operation flag is set to ON, and when a normal label or an RFID label not requiring advance folding is detected, the operation flag is set to OFF.

As shown in FIG. 7, the label is conveyed (S30), and the reader/writer 13 determines whether or not folding into an angular shape is required (S31). When folding is required (S31 YES), the operation flag is set to ON (S32), and when folding is not required (S31 NO), the operation flag is set to OFF (S33).

When the operation flag is at ON (1) (S34 ON), the air cylinder device 26 (folding means) and folding assisting means 30*a* are operated (S35).

Next, the moving means 27*a* are activated (S36) such that the label L is affixed to the product W in an angularly folded form.

Next, similarly to the operation described above, the air cylinder device 26 (folding means) is drive-controlled to move the second divided body 21*c* from the joining position S to the removed position V side, and the small holes 21*a* in the suction plate 21 are caused to expel air (S37).

The air cylinder device 28 of the moving means 27*a* is then activated to return the suction plate 21 to the suction position X from the affixing position Y (S38).

When the operation flag is at OFF (0) (S34 OFF), on the other hand, the moving means 27*a* are activated without operating the air cylinder device 26 (folding means) and folding assisting means 30*a* (S36), and as a result, the label L is affixed to the product W in planar form.

Next, similarly to the operation described above, air is expelled from the small holes 21*a* in the suction plate 21 (S37), and the air cylinder device 28 of the moving means 27*a* is activated to return the suction plate 21 to the suction position X from the affixing position Y (S38).

According to the setting performed by the reader/writer 13, the operation flag is set after the reader/writer 13 determines whether the label is a normal label or a label to which the RFID tag T is attached, and therefore the setting performed by the operation unit 88 is eliminated, and the operations of the air cylinder device 26 (folding means) and the folding assisting means 30*a* are switched ON and OFF automatically simply by loading the two types of labels in accordance with the application. As a result, the operating efficiency is favorable.

Furthermore, when the operation flag is set in accordance with the type of the label L to which the RFID tag T is attached, the form of the label L attached with the RFID tag T (whether the label L is to be affixed in planar form or after being folded angularly) can be modified according to the type of label to be affixed or the information stored on the IC chip in the RFID tag, and thus the range of usage applications can be widened.

According to the above description, the part 2 of the label L to which the RFID tag T is attached to the product in an angularly projecting form such that the RFID tag T is removed from the product, and therefore effects from the product to which the RFID tag T is affixed can be reduced, ensuring that data can be read and written with stability. Moreover, the respective rear surfaces of the first side face 3 and second side face 4 of the folded portion M are joined by the folding means, and therefore the display layer U and adhesive layer B of the label L cover the tag attachment site 1 to form a two-ply structure. As a result, the strength of this part can be increased, and the RFID tag T can be protected from situations in which it is easily damaged.

Further, by employing the label L shown in FIG. 64 in accordance with this application, the angularly projecting folded portion M can be removed easily once the product W has served its intended purpose. Therefore, information leakage can be prevented, and separation/disposal can be performed easily.

Furthermore, the determining whether to affix the label L to the product W in planar form or angularly folded form can be switched according to the application or system by setting the operation flag, and the content or type of the product W can be recognized easily according to the form of the affixed label L (whether the label L has been affixed in planar form or angularly folded form).

FIGS. 8 through 11 show a label affixing apparatus according to a second embodiment of the present invention. As shown in FIGS. 61, 63 and 64, the label L serving as the subject of a label affixing apparatus 200 according to the second embodiment is such that the part 2 of the label L including the tag attachment site 1 is formed in an intermediate portion of the label L.

The label affixing apparatus 200 according to the second embodiment has a substantially identical construction to the label affixing apparatus 100 according to the first embodiment described above, but differs from the label affixing apparatus 100 according to the first embodiment in the construction of the folding assisting means 30.

Note that in the following description, similar parts to the embodiment described above have identical reference symbols, and detailed description thereof has been omitted.

Folding/affixing means 20*b* of the label affixing apparatus 200 according to the second embodiment comprise a suction nozzle 32 serving as folding assisting means 30*b* for aspirating the part 2 of the label L including the tag attachment site 1 to which the RFID tag T of the label L is attached from the front surface side (the display layer U) and folding the part 2 of the label L toward the front surface side.

The suction nozzle 32 can be caused to advance and retreat by an air cylinder device 33. The air cylinder device 33 includes a piston to which the suction nozzle 32 is attached and a cylinder on the machine base (not shown) side. When it is caused to advance by the air cylinder device 33, the suction nozzle 32 contacts or approaches the front surface of the part 2 of the label L so as to aspirate the label L through suction. When it is caused to retreat by the air cylinder device 33, the suction nozzle 32 folds the part 2 of the label L from the rear surface side to the front surface side into an angularly projecting form, thereby forming the folded portion M. The part 2 of the label L is folded by the suction nozzle 32 as well as the air cylinder device 26 (folding means), and therefore folding is performed reliably.

Hence, according to the label L affixing apparatus 200 of the second embodiment, the label L is affixed in the following manner. A case in which the operation flag is set to ON (1) is described using FIG. 5 and FIGS. 8 through 11. When the operation flag is set to OFF (0), the label is affixed in planar form, as described above.

As shown in FIG. 9A, label L is conveyed by the label conveying means 10. When the backing sheet D is folded back by the peeling plate 11 such that the label L is peeled away, the suction plate 21 aspirates the label L in the suction position X. In this state, as shown in FIG. 9B, the air cylinder device 26 is activated to position the second divided body 21c in the removed position V. As a result, the space e into which the part 2 of the label L that projects from the rear surface side to the front surface side can enter is formed between the first divided body 21b and second divided body 21c.

Further, as shown in FIG. 9B, the air cylinder device 33 is activated to cause the suction nozzle 32 to advance into contact with or close to the front surface of the part 2 of the label L, whereupon the suction nozzle 32 is activated to aspirate the label L through suction.

Figure 8:
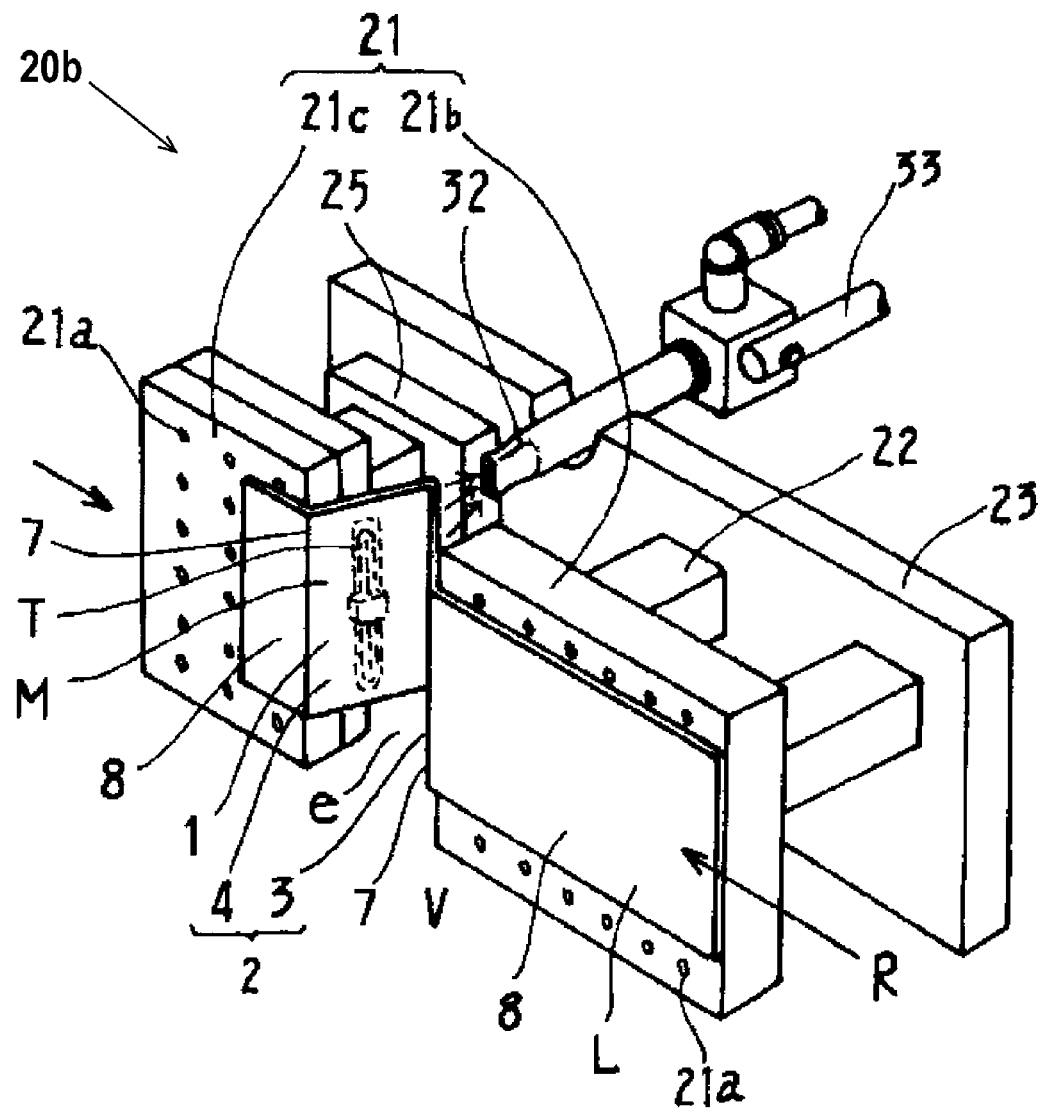
FIG. 8 is a perspective view showing the main parts of a label affixing apparatus according to a second embodiment of the present invention.
Figure 9:
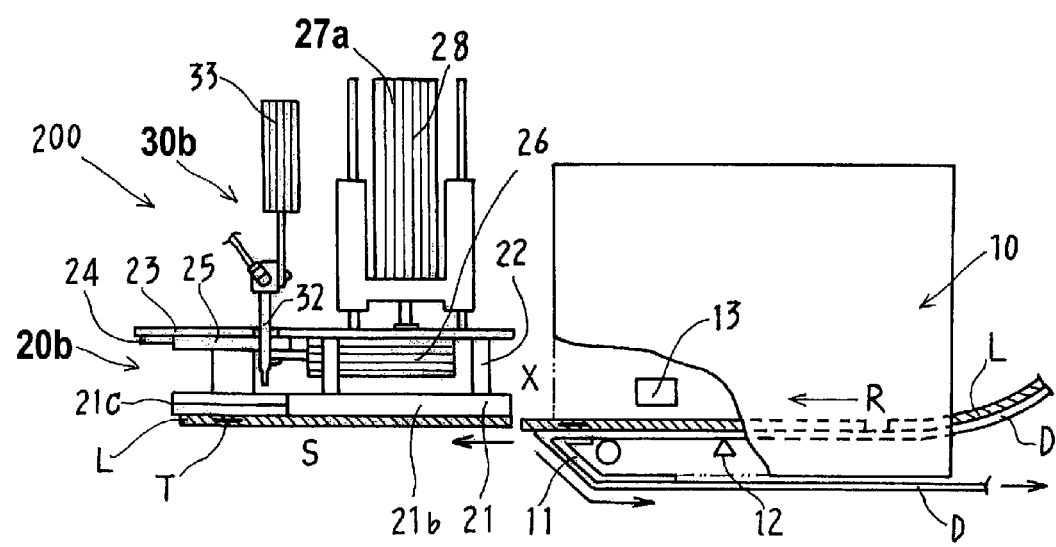
FIGS. 9A through 9D are plan views showing the label affixing apparatus according to the second embodiment of the present invention, and its action.
Figure 9:
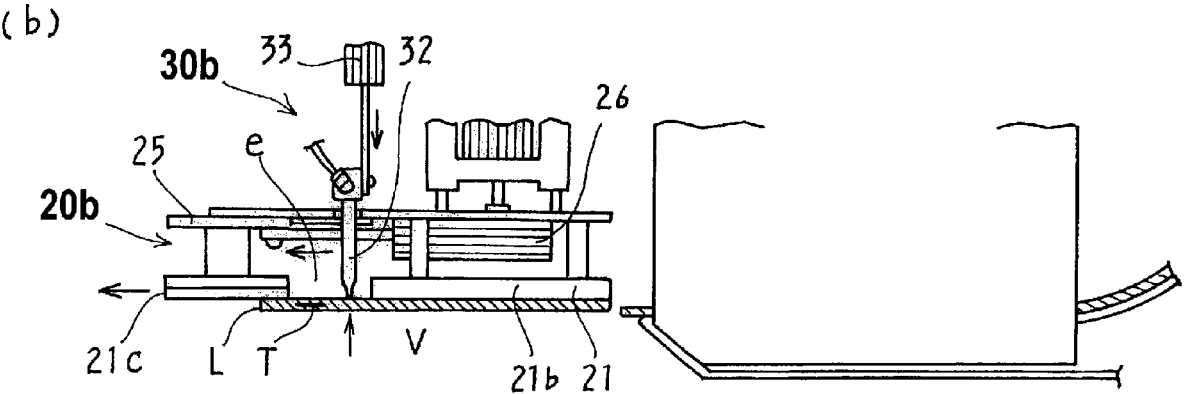
Figure 9:
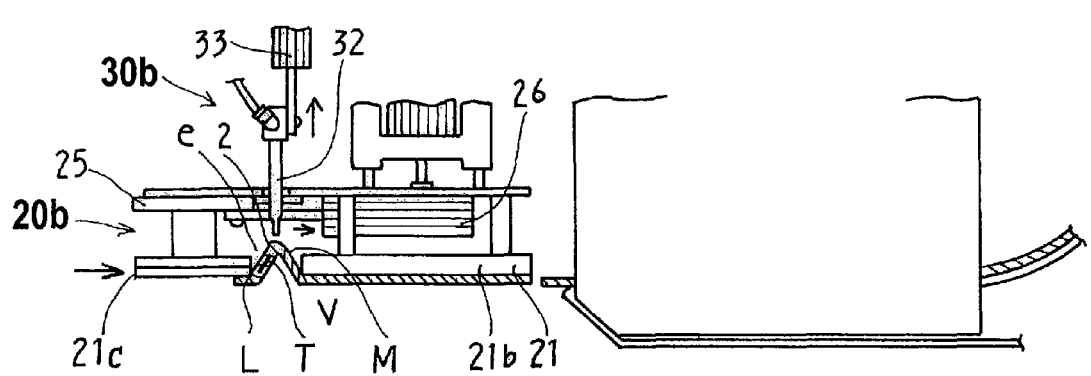
Figure 9:
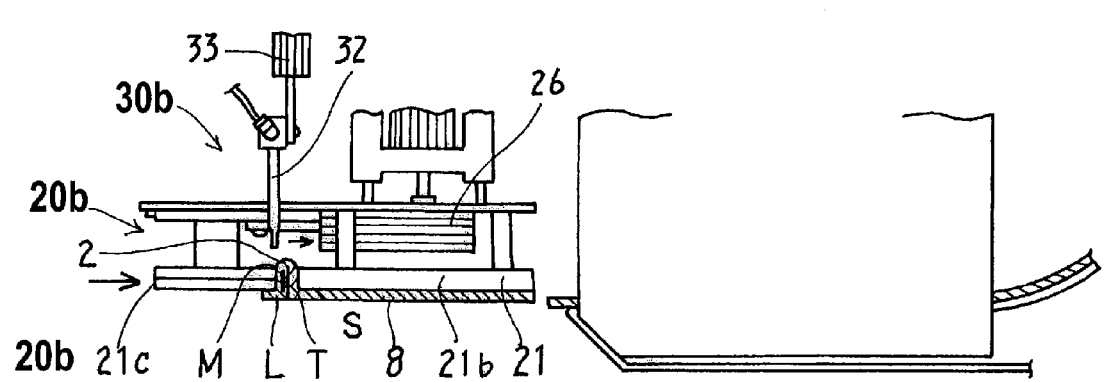

Next, as shown in FIGS. 8 and 9C, the air cylinder device 26 is activated to move the second divided body 21c from the removed position V to the joining position S, and the air cylinder device 33 is activated to cause the suction nozzle 32 to retreat. As a result, the bend portion 7 of the first side face 3 and the bend portion 7 of the second side face 4 are pressed in a direction for causing the respective rear surfaces of the first side face 3 and second side face 4 to approach each other, while the first divided body 21b and second divided body 21c respectively aspirate and hold the two conveyance direction R end portion sides of the label L, thereby forming the folded portion M. In this case, the part 2 of the label L is pulled by the suction nozzle 32, and therefore the part 2 of the label L is reliably folded into an angular shape.

As shown in FIG. 9D, when the second divided body 21c moves from the removed position V to the joining position S, the opposing end surfaces of the first divided body 21b and second divided body 21c respectively come into contact with the front surfaces of the first side face 3 and the second side face 4 forming the part 2 of the label L and press these front surfaces such that the rear surfaces of the first side face 3 and second side face 4 are joined. As a result, the folded portion M is formed.

Figure 10:
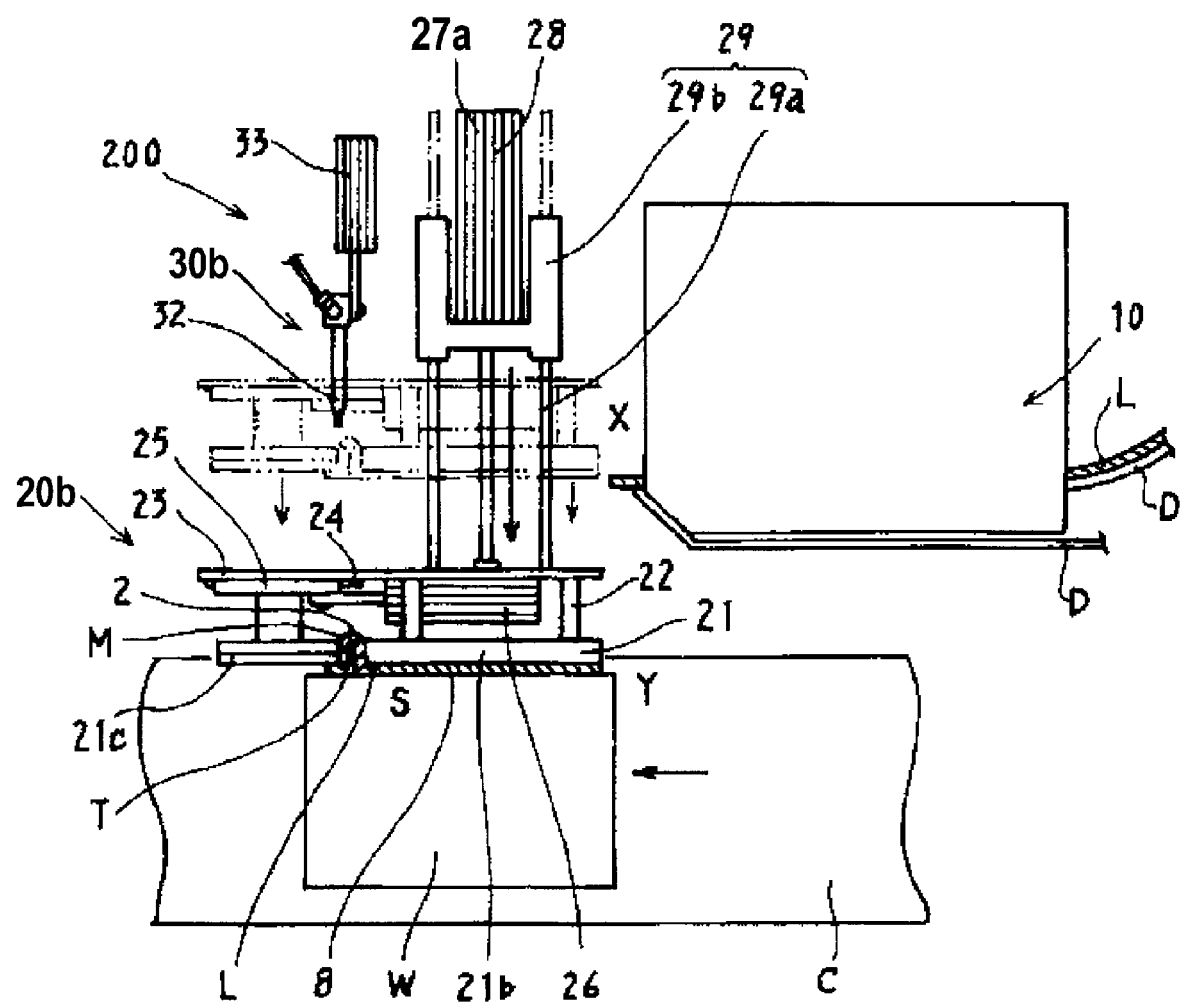
FIG. 10 is a plan view showing the label affixing apparatus according to the second embodiment of the present invention, and its action.
Figure 11:
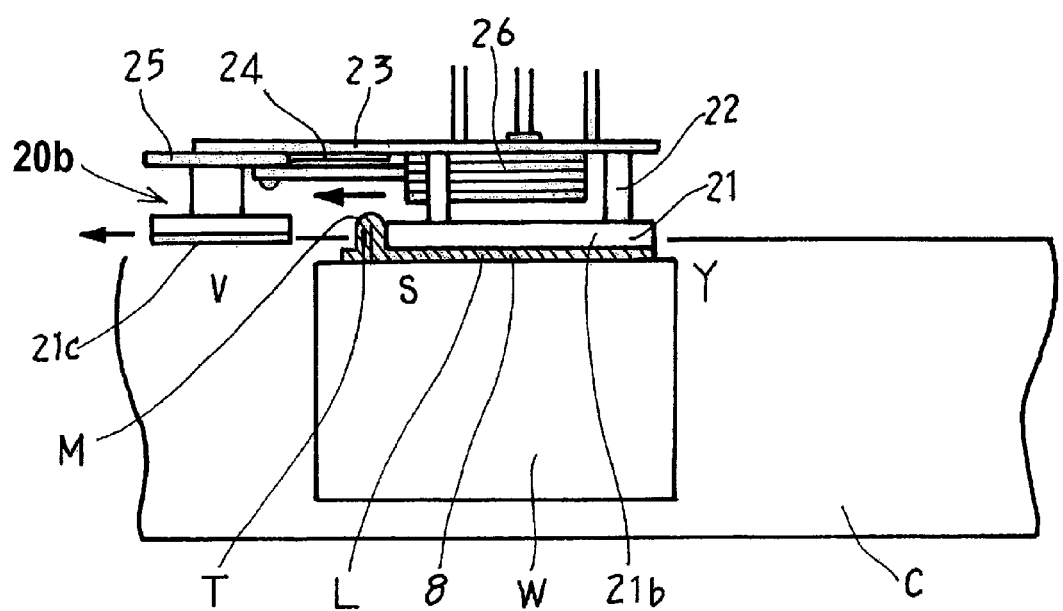
FIGS. 11A and 11B are plan views showing the label affixing apparatus according to the second embodiment of the present invention, and its action.
Figure 11:
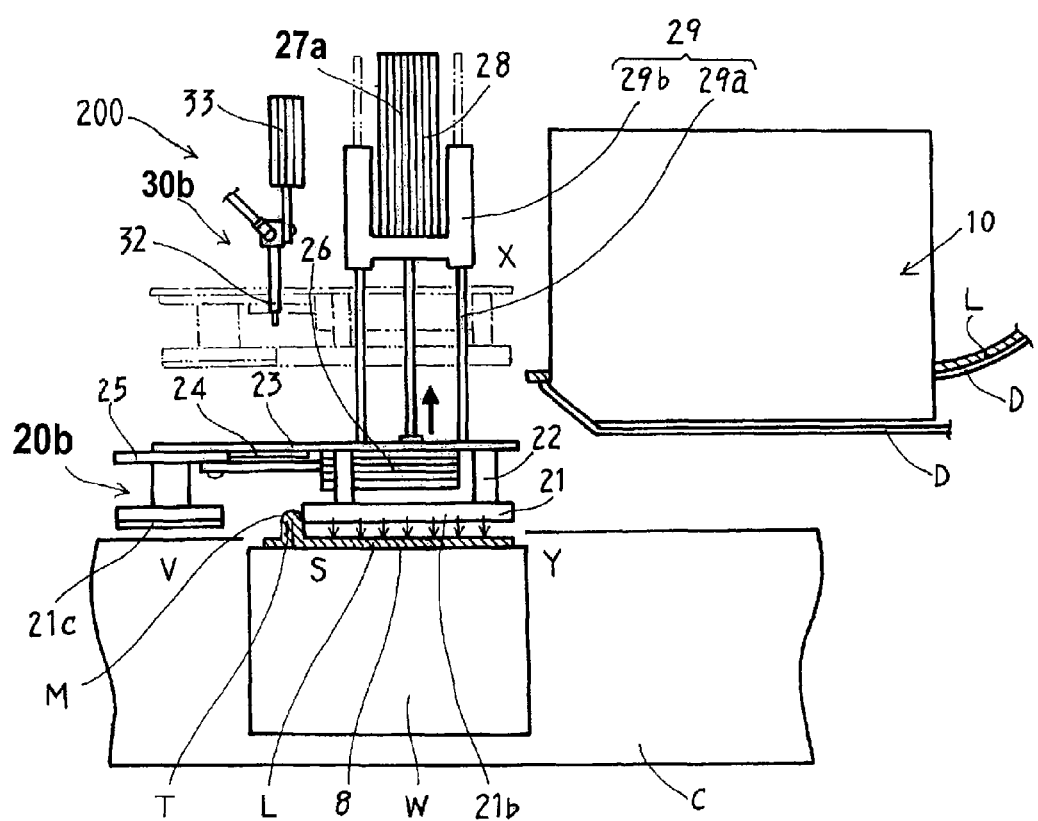
Figure 11:
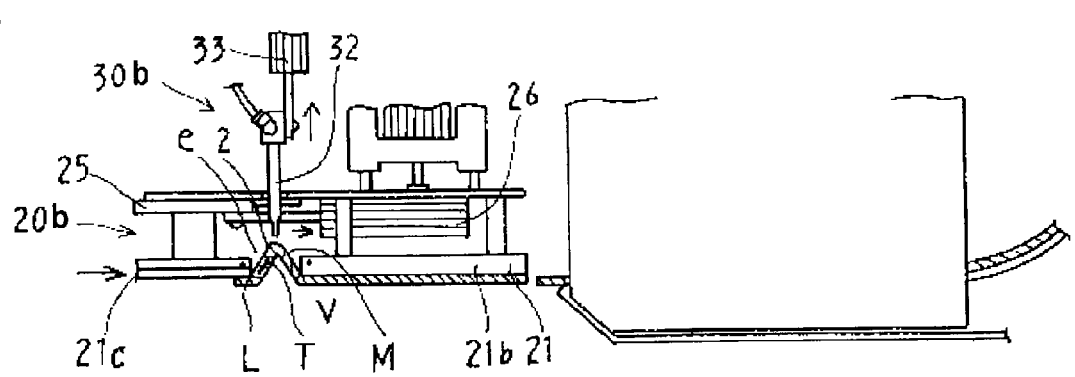
Figure 11:
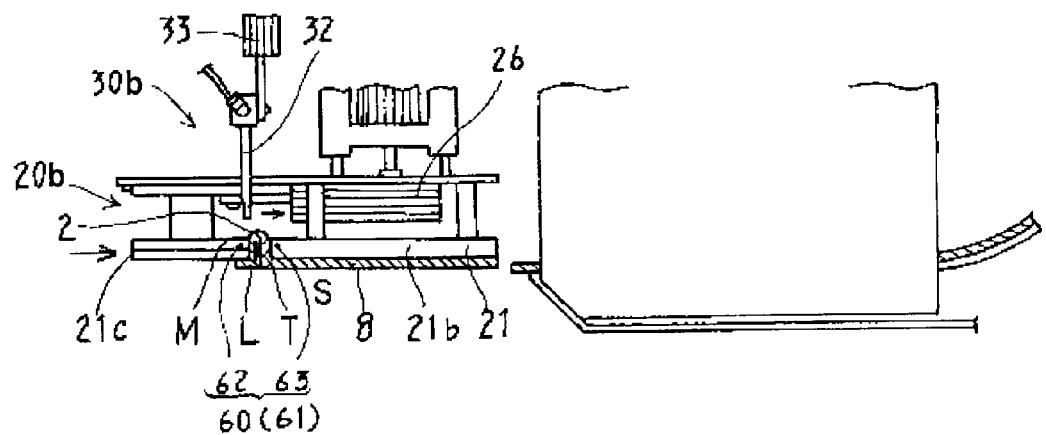

Next, as shown in FIG. 10, the air cylinder device 33 is halted, whereupon the air cylinder device 28 of the moving means 27a is activated to move the suction plate 21 from the suction position X to the affixing position Y, similarly to the first embodiment. As a result, the label L is affixed to the product W.

Next, similarly to the first embodiment, the second divided body 21c, which serves as the traction suppressing means, is moved from the joining position S to the removed position V side, as shown in FIG. 11A, and air is expelled from the small holes 21a in the suction plate 21, as shown in FIG. 11B.

As shown in FIG. 11B, the air cylinder device 28 of the moving means 27a is activated synchronized the operation of the traction suppressing means to return the suction plate 21 to the suction position X from the affixing position Y.

Thus, the actions and effects of the second embodiment are similar to those of the label affixing apparatus according to the first embodiment described above.

Note that in the first and second embodiments, the traction suppressing means perform drive-control of the air cylinder device 26 and control to cause air to be expelled from the small holes 21a in the suction plate 21, but the present invention is not necessarily limited thereto, and the traction suppressing means may perform either control equally effectively. Therefore, the present invention may be modified appropriately.

Also note that in the embodiments described above, the folding assisting means 30 employ either an air blowing nozzle that blows air onto the part 2 of the label from the rear surface side or a suction nozzle that aspirates the part 2 of the label from the front surface side, but the present invention is not limited thereto, and any means that assist the operation to fold the part 2 of the label L to which the RFID tag T is attached in the same direction may be employed. Therefore, the present invention may be modified appropriately.

Figure 62:
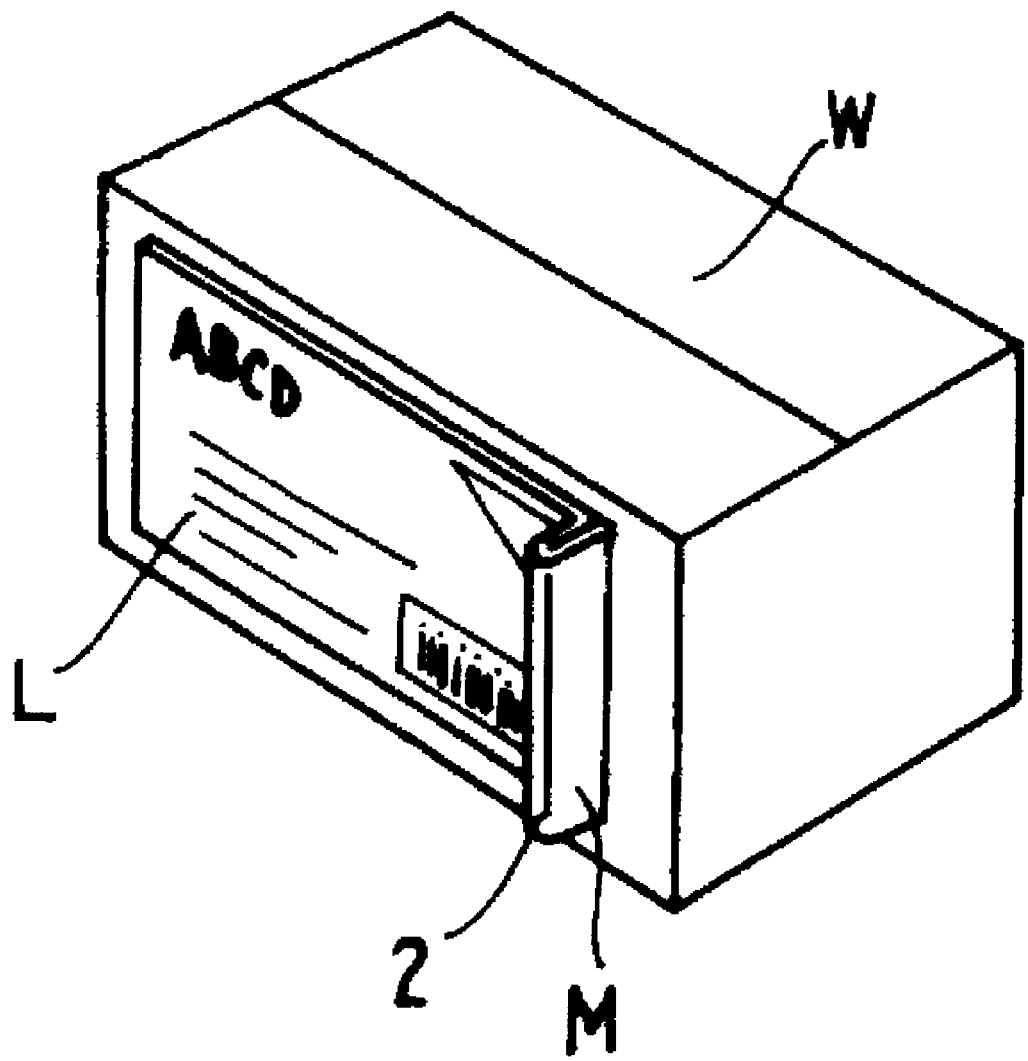
FIG. 62 is a perspective view showing the condition of another label affixed to a product by the label affixing apparatus according to an embodiment of the present invention.

FIGS. 12 through 15 show a label affixing apparatus according to a third embodiment of the present invention. As shown in FIGS. 62 and 65, the label L serving as the subject of a label affixing apparatus 300 according to the third embodiment is such that the part 2 of the label L including the tag attachment site 1 attached with the RFID tag T of the label L is formed on the end portion of the label L.

The label affixing apparatus 300 according to the third embodiment has a substantially identical construction to the label affixing apparatus 100 according to the first embodiment described above, but differs from the label affixing apparatus 100 according to the first embodiment in the construction of the folding/affixing means 20.

As folding/affixing means 20c, the label affixing apparatus 300 according to the third embodiment comprises a suction plate 41 (label holding means), and in contrast to the suction plate 21 of the label affixing apparatus 100 according to the first embodiment, the suction plate 41 is not divided. In other words, the suction plate 41 aspirates the front surface side (the display layer U side) of the label L that has been peeled away by the peeling plate 11 such that the part 2 of the label L that includes the tag attachment site 1 to which the RFID tag T of the label L is attached can be caused to project from the rear surface side (the adhesive layer B side) to the front surface side (the display layer U side). The suction plate 41 of the folding/affixing means 20c is provided with a plurality of small holes 41a that suck up air in order to aspirate the front surface of the label L. The suction plate 41 is supported on the base 43 via a support member 42.

Further, in the folding/affixing means 20c, a slider 45 that can slide along a rail 44 in the conveyance direction R of the label L, a pressing member 46 that is fixed to the slider 45 and presses the bend portion 7 side of the second side face 4 of the label L, and an air cylinder device 47 (folding means) that has a piston attached to the pressing member 46 and moves the pressing member 46 between the removed position V and the joining portion S, are supported on a support body 48.

Further, a bearing portion 49 that supports the conveyance direction R front end of the label L is provided so as to project from the rear end portion of the pressing member 46 in the conveyance direction R of the label L. The bearing portion 49 is provided with a sensor 50 that detects the front end of the conveyed label L in the joining position S of the pressing member 46.

Further, similarly to the label affixing apparatus 100 according to the first embodiment, the moving means 27a of the folding/affixing means 20c are comprised of the air cylinder device 28. The air cylinder device 28 is comprised of a piston to which a base 43 is attached and a cylinder provided on the machine base (not shown) side, and moves the suction plate 41 between two positions, namely the suction position X for aspirating the label L peeled away by the peeling plate 11 and the affixing position Y for affixing the aspirated label L to the product W.

Folding assisting means 30c of the folding/affixing means 20c are fixed to the support body 48 in a substantially intermediate position between the removed position V and the joining position S of the pressing member 46, and comprise an air blowing nozzle 34 that blows air onto the part 2 of the label L from the rear surface side (the adhesive layer B side) such that the part 2 of the label L is folded in an angular fashion toward the front surface side (the display layer U side) by the force of the air.

Figure 14:
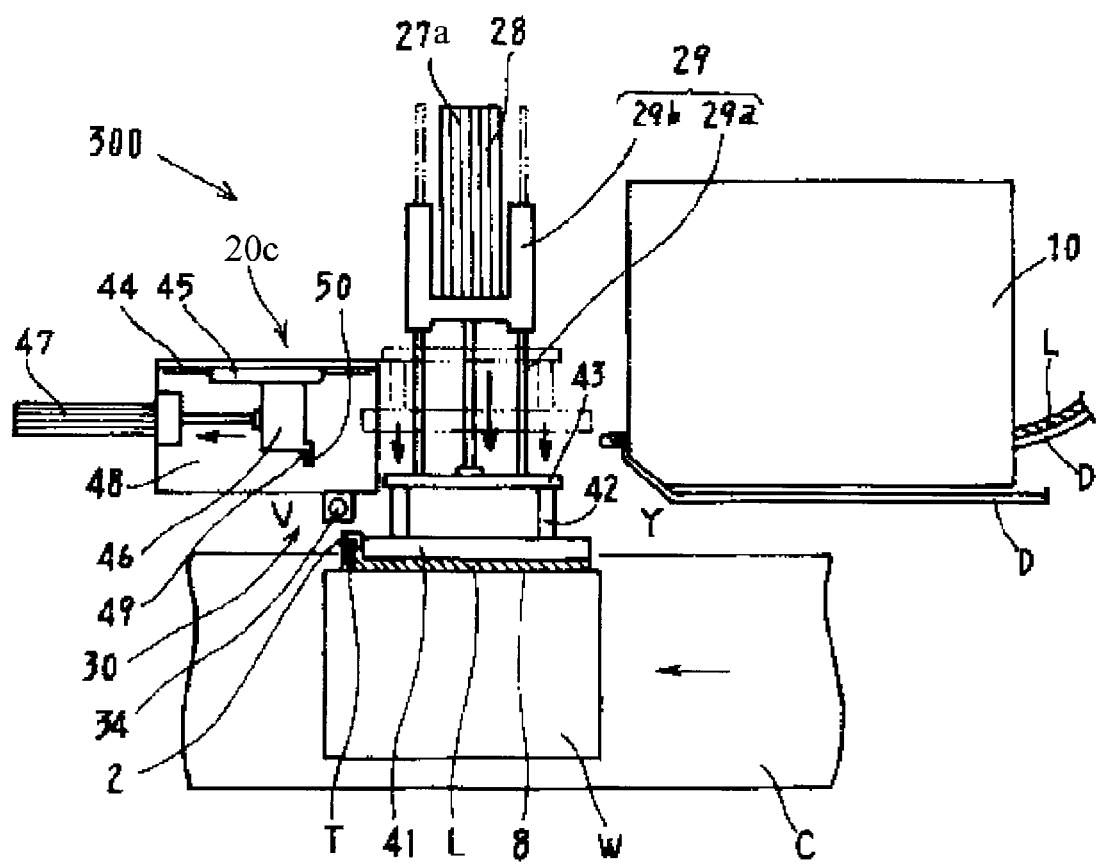
FIG. 14 is a plan view showing the label affixing apparatus according to the third embodiment of the present invention, and its action.

The folding/affixing means 20c further comprise traction suppressing means for suppressing traction that drags the folded portion M of the label. More specifically, as shown in FIG. 14, the traction suppressing means activate the air cylinder device 47 (folding means) using the label affixation control unit 92 such that the pressing member 46 is moved from the joining position S to the removed position V.

Figure 15:
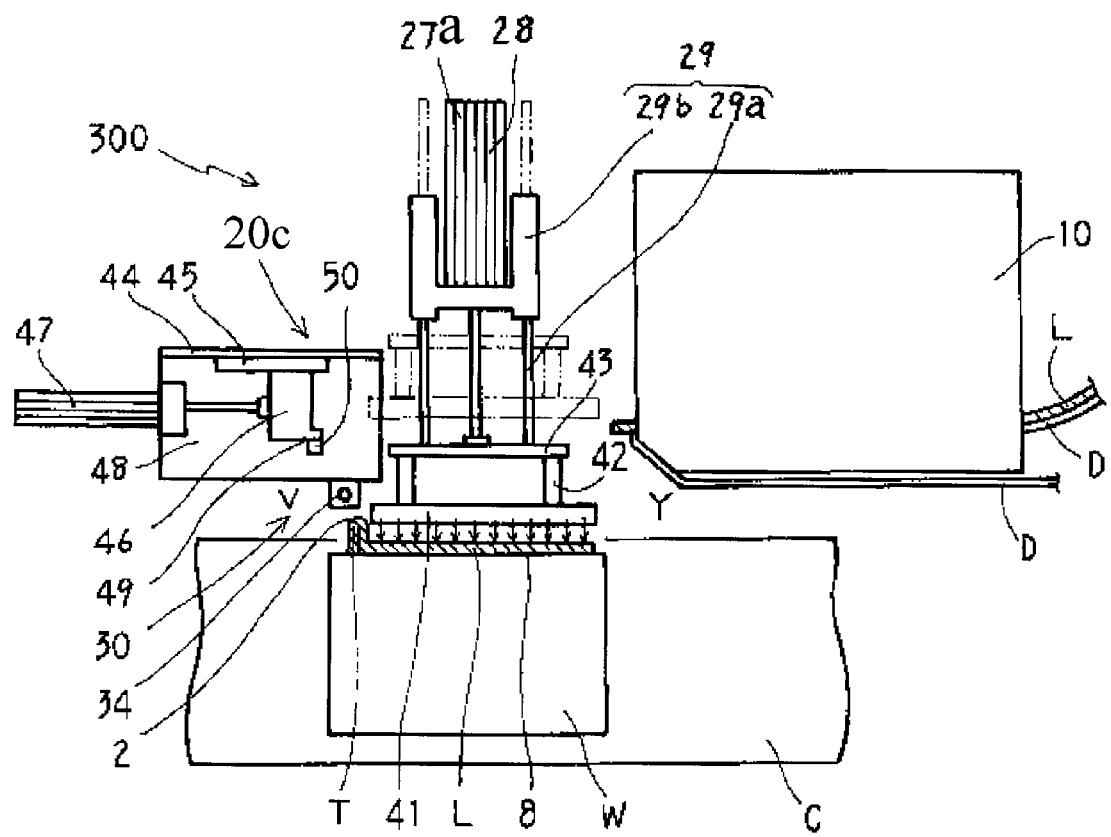
FIG. 15 is a plan view showing the label affixing apparatus according to the third embodiment of the present invention, and its action.

The traction suppressing means also function to blow air onto the label L from the suction plate 41 serving as the label holding means. More specifically, as shown in FIG. 15, the traction suppressing means cause the small holes 41a in the suction plate 41 to expel air when returning the suction plate 41 to the suction position X from the affixing position Y.

Note that the circuit configuration of the label affixing apparatus 300 according to the third embodiment is similar to the circuit configuration of the label affixing apparatus 100 according to the first embodiment (see FIG. 59) such that the folding/affixing means 20c are controlled by the label affixation control unit 92.

Hence, according to the label affixing apparatus 300 of the third embodiment, the label L is affixed in the following manner. A case with the operation flag set to ON (1) is described using FIG. 5 and FIGS. 12 through 15. When the operation flag is set to OFF (0), the label is affixed in planar form, as described above.

As shown in FIG. 13A, the label L is conveyed by the label conveying means 10. When the backing sheet D is folded back by the peeling plate 11 such that the label L is peeled away, the label L is conveyed in the conveyance direction R of the label L while being aspirated by the suction plate 41. At the same time, the label affixation control unit 92 activates the air cylinder device 47 to move the pressing member 46 from the removed position V to the joining position S.

When the front end of the label L reaches the bearing portion 49 of the pressing member 46, the sensor 50 detects this and outputs a signal to the label affixation control unit 92. On the basis of the detection of the sensor 51, the label affixation control unit 92 activates the air cylinder device 47 to move the pressing member 46 from the joining position S to the removed position V, as shown in FIG. 13B, whereby the suction plate 41 aspirates the label L in the suction position X.

In this state, as shown in FIG. 13B, the pressing member 46 is positioned in the removed position V, and therefore the space e into which the part 2 of the label L that projects from the rear surface side to the front surface side can enter is formed between the suction plate 41 and the pressing member 46.

Figure 12:
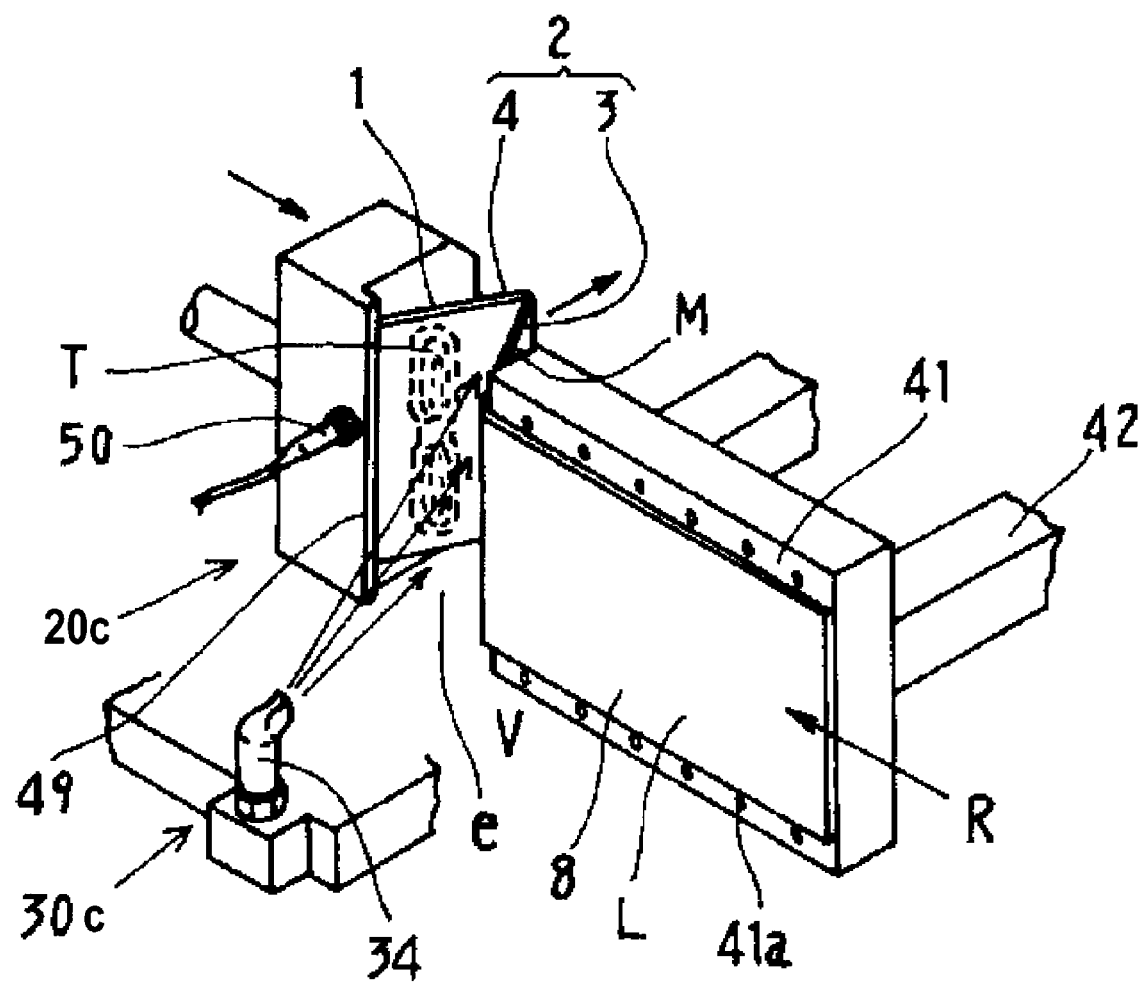
FIG. 12 is a perspective view showing the main parts of a label affixing apparatus according to a third embodiment of the present invention.
Figure 13:
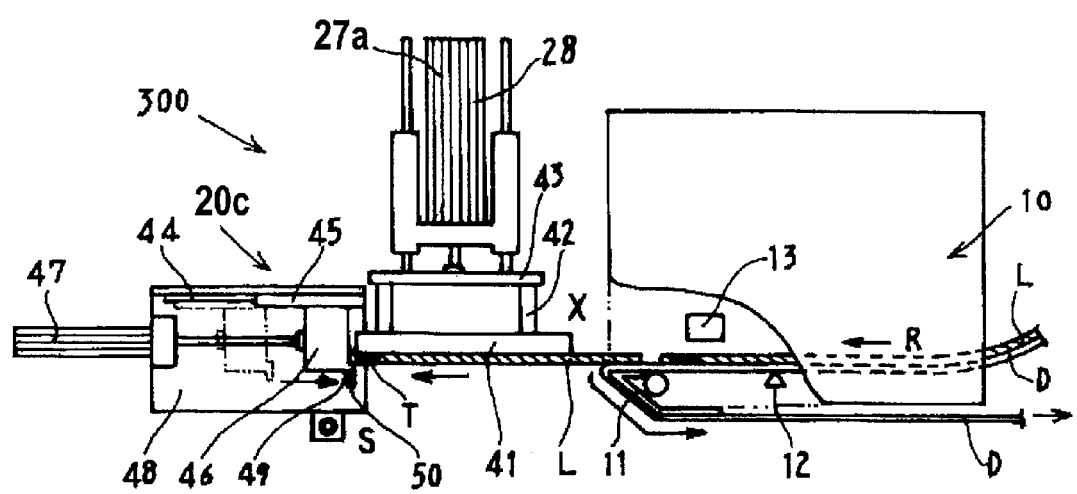
FIGS. 13A through 13D are plan views showing the label affixing apparatus according to the third embodiment of the present invention, and its action.
Figure 13:
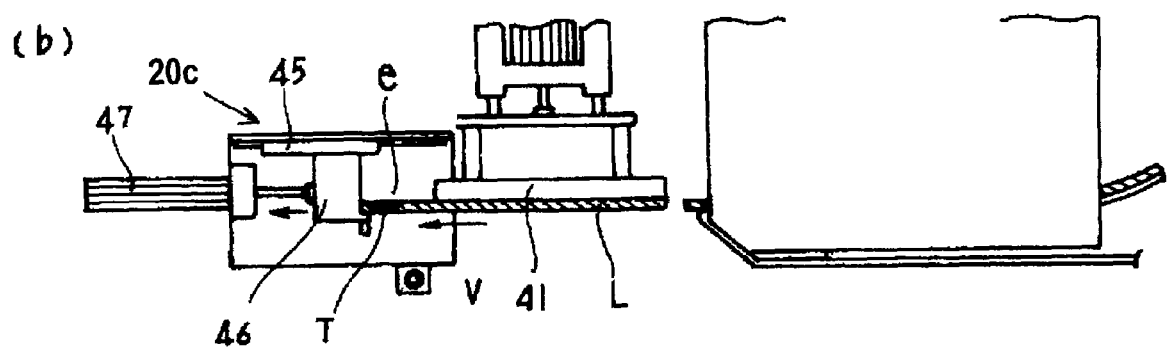
Figure 13:
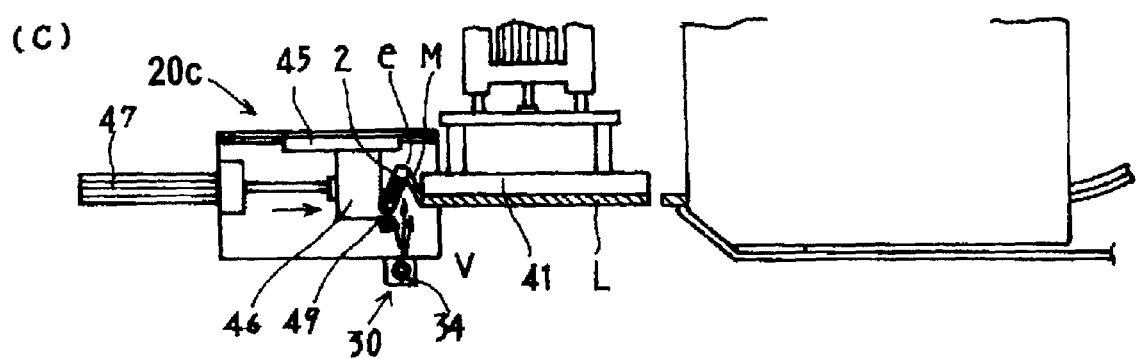
Figure 13:
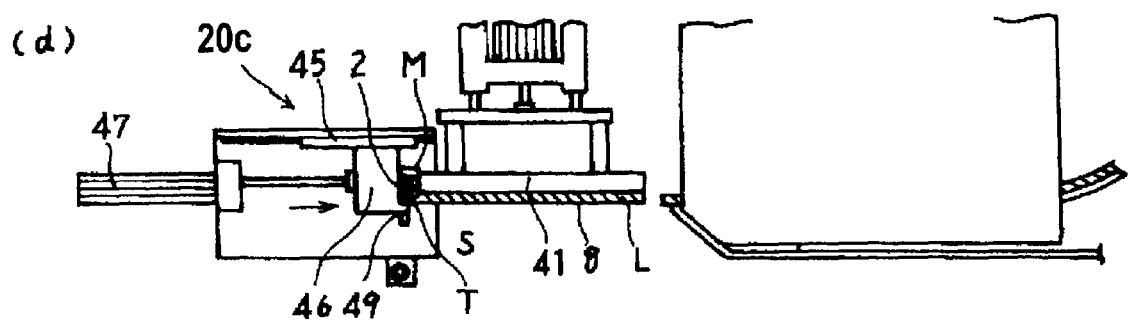

Next, as shown in FIGS. 12 and 13C, the label affixation control unit 92 activates the air cylinder device 47 to move the pressing member 46 from the removed position V to the joining position S, and the label affixation control unit 92 activates the air blowing nozzle 34 to blow air toward the rear surface side (the adhesive layer B side) of the part 2 of the label L including the tag attachment site 1 to which the RFID tag T of the label L is attached. As a result, the suction plate 41 and pressing member 46 press the bend portion 7 of the first side face 3 and the bend portion 7 of the second side face 4 in a direction for causing the respective rear surfaces of the first side face 3 and second side face 4 to approach each other while the suction plate 41 aspirates and holds the label L, whereby the part 2 of the label L is folded to form the folded portion M. In this case, the part 2 of the label L is folded angularly toward the front surface side (the display layer U side) by the force of the air blown by the air blowing nozzle 34, and therefore the part 2 of the label L is reliably folded into an angular shape.

As shown in FIG. 13D, when the label affixation control unit 92 activates the air cylinder device 47 to move the pressing member 46 from the removed position V to the joining position S, the opposing end surfaces of the suction plate 41 and pressing member 46 respectively come into contact with the front surfaces of the first side face 3 and second side face 4 forming the part 2 of the label L and press these front surfaces such that the rear surfaces of the first side face 3 and second side face 4 are joined. As a result, the folded portion M is formed.

Next, as shown in FIG. 14, the traction suppressing means are operated, or more specifically, the label affixation control unit 92 activates the air cylinder device 47 (folding means) to move the pressing member 46 from the joining position S to the removed position V. Further, the label affixation control unit 92 activates the air cylinder device 28 to move the suction plate 41 from the suction position X to the affixing position Y. As a result, the label L is affixed to the product W.

Further, as shown in FIG. 15, air is expelled from the small holes 41a in the suction plate 41, and the air cylinder device 28 of the moving means 27a is activated to return the suction plate 41 to the suction position X from the affixing position Y.

Thus, the actions and effects of the third embodiment are similar to those of the label affixing apparatus according to the first and second embodiments described above.

Figure 16:
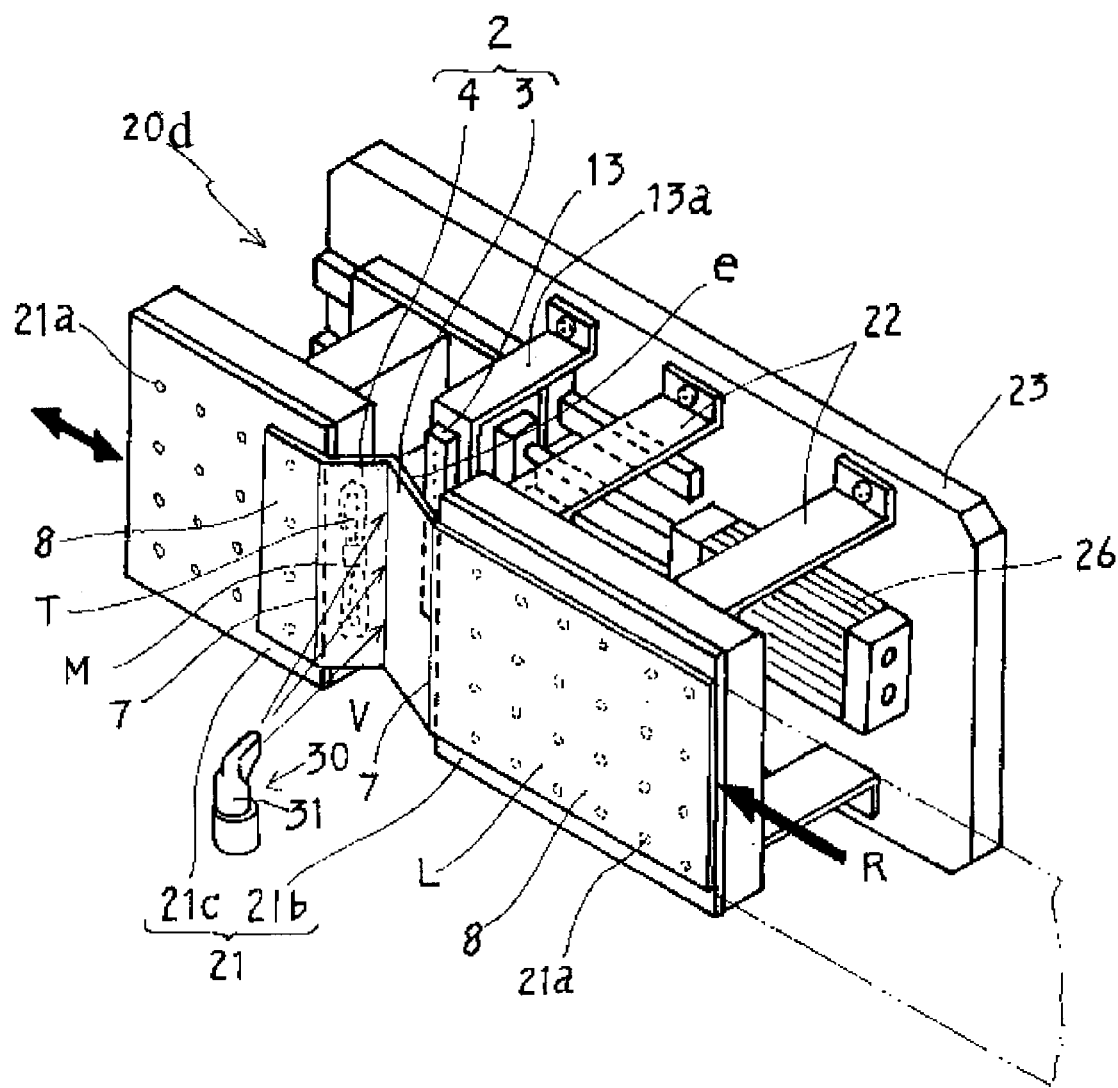
FIG. 16 is a perspective view showing the main parts of a label affixing apparatus according to a fourth embodiment of the present invention.
Figure 17:
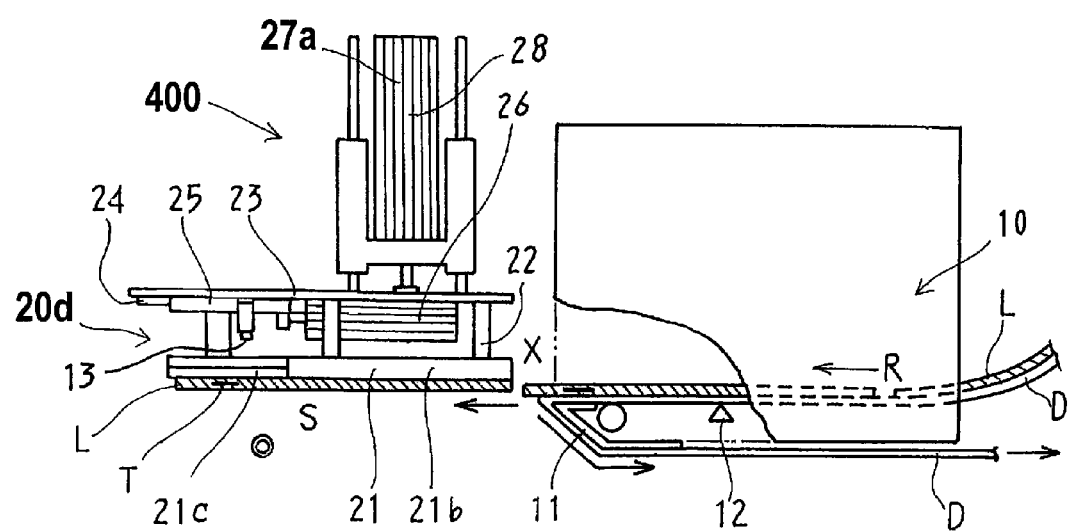
FIGS. 17A through 17D are plan views showing the label affixing apparatus according to the fourth embodiment of the present invention, and its action.
Figure 17:
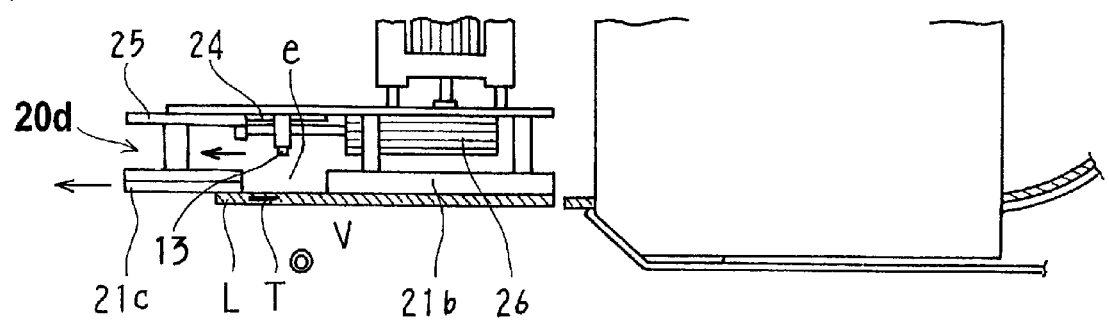
Figure 17:
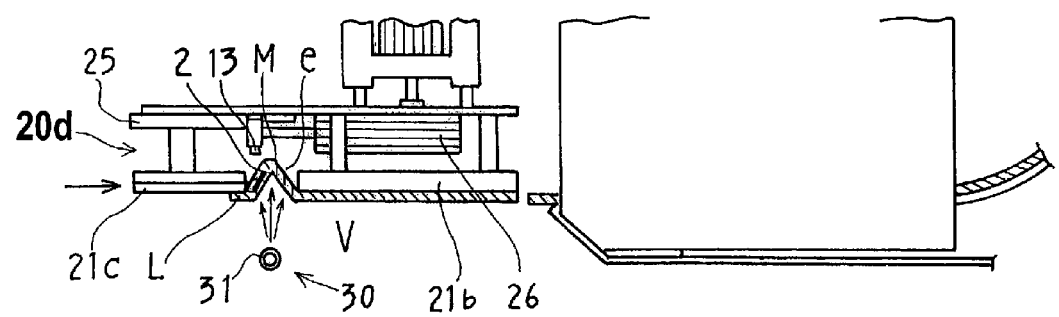
Figure 17:
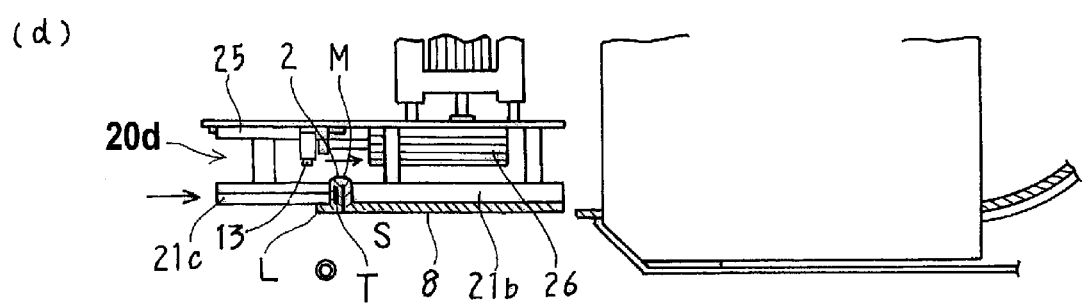
Figure 18:
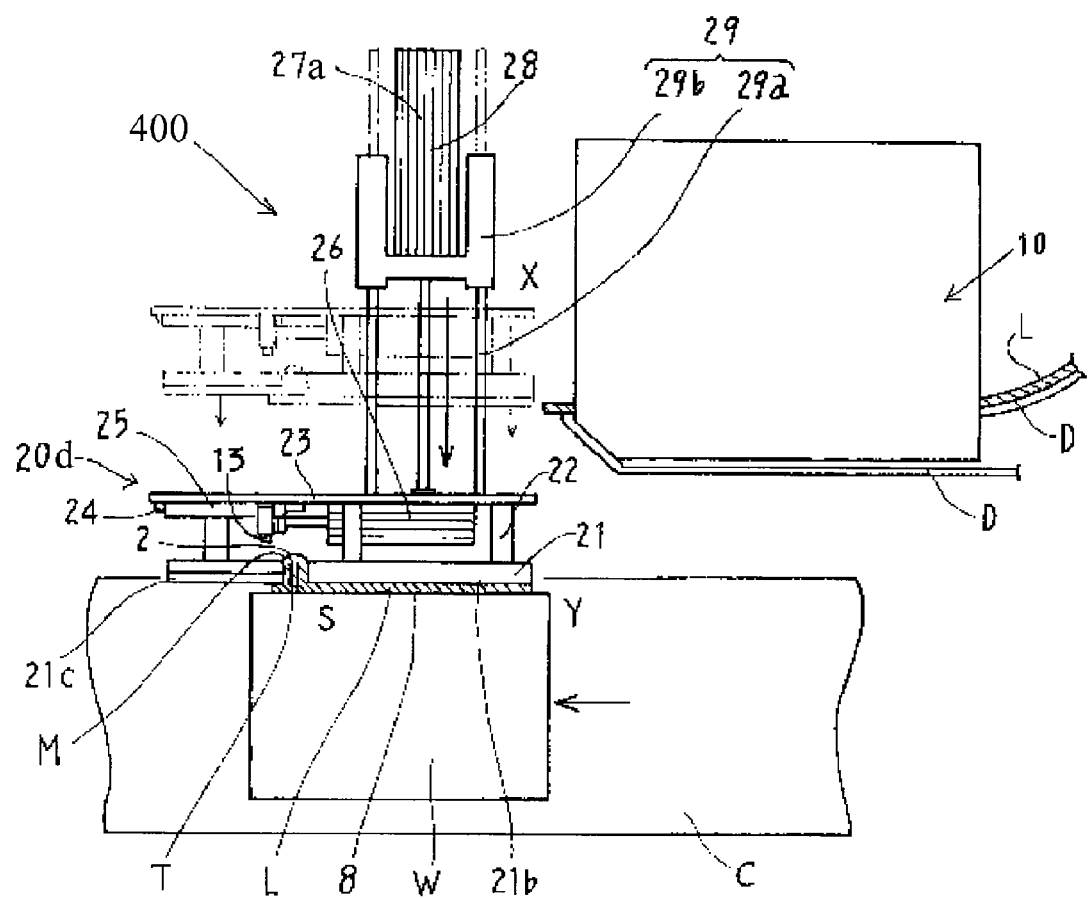
FIG. 18 is a plan view showing the label affixing apparatus according to the fourth embodiment of the present invention, and its action.

FIGS. 16 through 18 show a label affixing apparatus according to a fourth embodiment of the present invention. As shown in FIGS. 61, 63 and 64, the label L serving as the subject of a label affixing apparatus 400 according to the fourth embodiment is such that the part 2 of the label L including the tag attachment site 1 is formed in an intermediate portion of the label L.

In the label affixing apparatus 400 according to the fourth embodiment, the reader/writer 13 of the label affixing apparatus 100 according to the first embodiment is provided in the folding/affixing means 20 rather than the label conveying means 10.

More specifically, as shown in FIG. 16, folding/affixing means 20d of the label affixing apparatus 400 comprise a reader/writer 13 for rewriting data to the IC chip Ta of the RFID tag T, and at least an antenna (not shown) of the reader/writer 13 is provided in a position facing the part 2 of the label L, or in other words a position opposing the folding space e.

In more detail, the reader/writer 13 opposes the folding space e, which is formed between the divided bodies 21b, 21c in the removed position V of the second divided body 21c, so as to be capable of communicating with the IC chip Ta of the RFID tag T, and is fixed to the base 23 via the attachment member 13a.

In this case, when the reader/writer 13 is provided on the suction plate 21, it becomes necessary to manufacture the suction plate 21 from resin or take similar measures to ensure that communication with the RFID tag T is not impaired. As a result, problems such as a corresponding reduction in strength, a reduction in design freedom, and an increase in cost occur, and since the reader/writer 13 moves repeatedly together with the second divided body 21c of the suction plate 21, a cable that connects a read/write module and the antenna of the reader/writer 13 must be bent repeatedly, leading to an increase in the likelihood of damage thereto. However, in this embodiment the reader/writer 13 is provided on the base 23, and is therefore not affected by the material, thickness and so on of the suction plate 21. Hence, communication with the RFID tag T can be performed reliably, design freedom can be improved, and manufacture can be achieved at a reasonable cost. Moreover, since the reader/writer 13 is fixed to the base 23, damage due to bends in the cable and so on is less likely to occur, enabling an improvement in durability.

The circuit configuration of the label affixing apparatus 400 according to the fourth embodiment is similar to the circuit configuration of the label affixing apparatus 100 according to the first embodiment (see FIG. 59).

According to the label affixing apparatus 400 of the fourth embodiment, the label L is affixed in the following manner. A case in which the operation flag is set to ON (1) will be described using FIG. 5 and FIGS. 16 through 18. When the operation flag is set to OFF (0), the label is affixed in planar form, as described above.

As shown in FIG. 17A, the label L is conveyed by the label conveying means 10, and when the backing sheet D is folded back by the peeling plate 11 such that the label L is peeled away, the suction plate 21 aspirates the label L in the suction position X. In this state, as shown in FIG. 17B, the air cylinder device 26 (folding means) and the folding assisting means 30a are activated to position the second divided body 21c in the removed position V. As a result, the folding space e into which the part 2 of the label L that projects from the rear surface side (the adhesive layer B side) to the front surface side (the display layer U side) can enter is formed between the first divided body 21b and second divided body 21c.

In this state, the reader/writer 13 writes or reads information to or from the IC chip Ta of the RFID tag T. At least the antenna of the reader/writer 13 is positioned so as to face the part 2 of the label L, and therefore information can be written to or read from the IC chip Ta of the RFID tag T reliably at the final stage before the label L is affixed to the product W with no effect from the suction plate 21 (label holding means), which is comprised of a metallic member, or any other members.

Defects in the RFID tag T may be detected at this time, and when the RFID tag T is not defective, information can be written to the IC chip Ta reliably. Moreover, the RFID tag T is not damaged subsequently. When a defect is detected in the RFID tag T, measures such as halting the apparatus and removing the defective label may be taken based on the detection, for example. As a result, the precision of the defect detection can be improved reliably.

Thereafter, similarly to the first embodiment, the label affixation control unit 92 activates the air cylinder device 26 to move the second divided body 21c from the removed position V to the joining position S, as shown in FIGS. 16 and 17C, and activates the air blowing nozzle 31 to blow air toward the rear surface side (the adhesive layer B side) of the part 2 of the label L including the tag attachment site 1 to which the RFID tag T of the label L is attached. As a result, the part 2 of the label L is reliably folded into an angular shape, thereby forming the folded portion M, as shown in FIG. 17D.

Further, as shown in FIG. 18, the label affixation control unit 92 activates the air cylinder device 28 of the moving means 27a to move the suction plate 21 from the suction position X to the affixing position Y, whereby the label L is affixed to the product W. Once the label is affixed, the suction plate 21 is returned to the suction position X.

Figure 19:
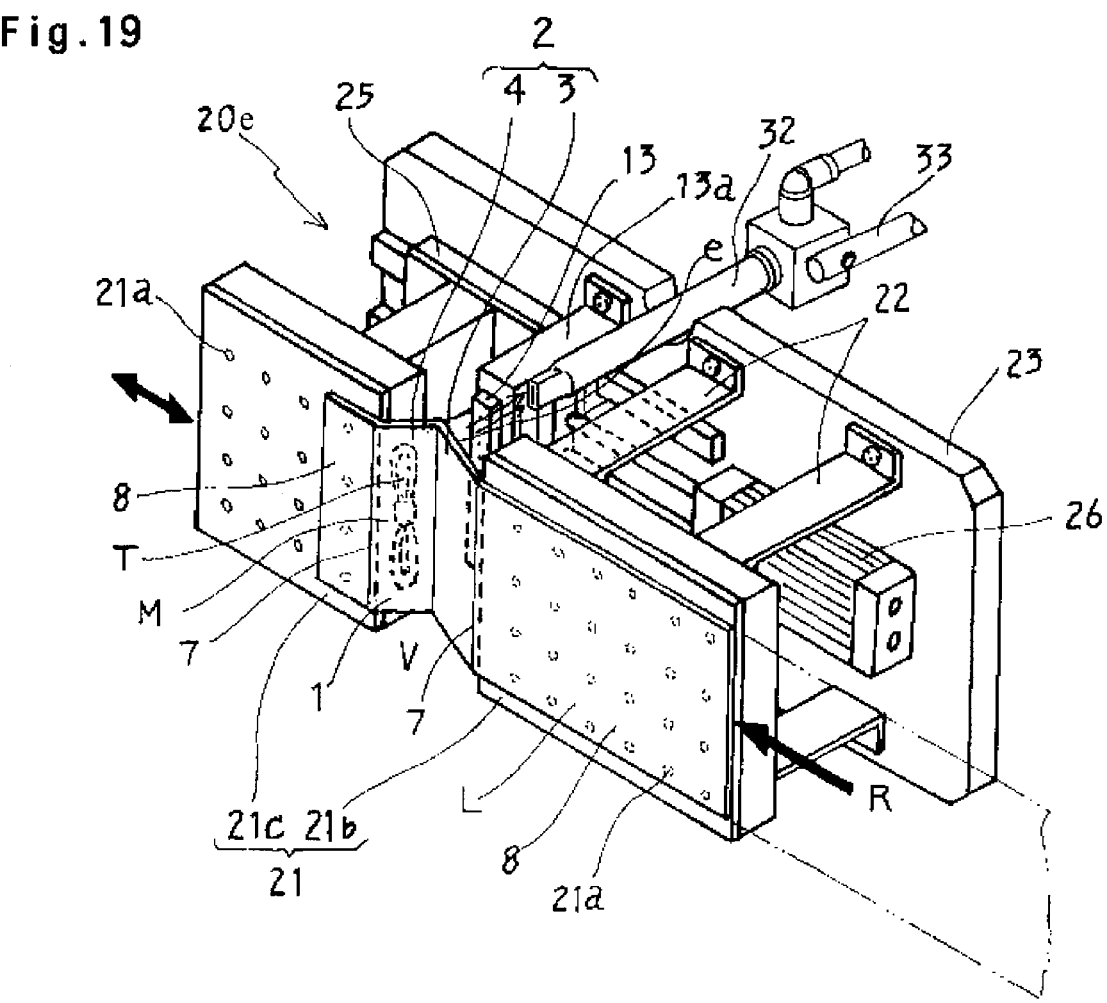
FIG. 19 is a perspective view showing the main parts of a label affixing apparatus according to a fifth embodiment of the present invention.
Figure 20:
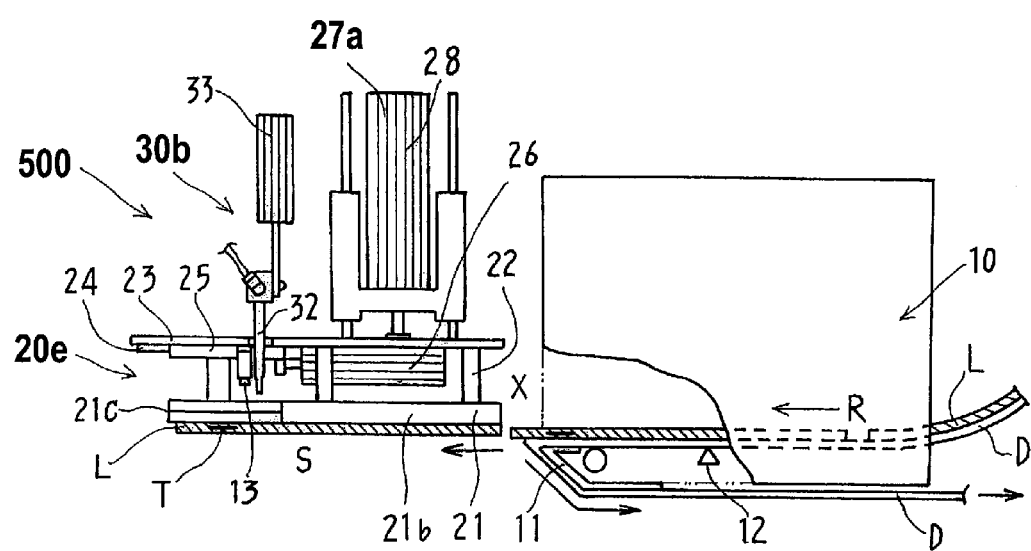
FIGS. 20A through 20D are plan views showing the label affixing apparatus according to the fifth embodiment of the present invention, and its action.
Figure 20:
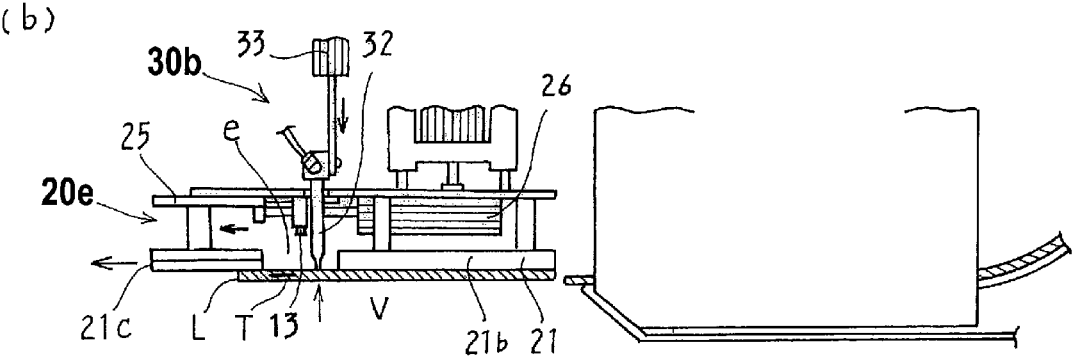
Figure 20:
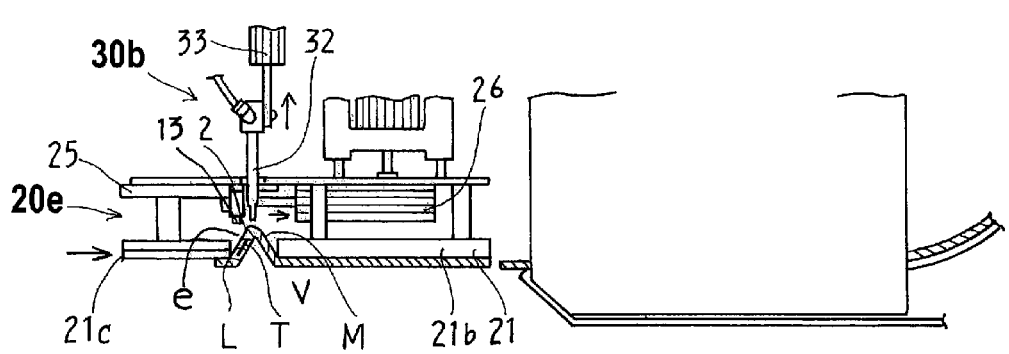
Figure 20:
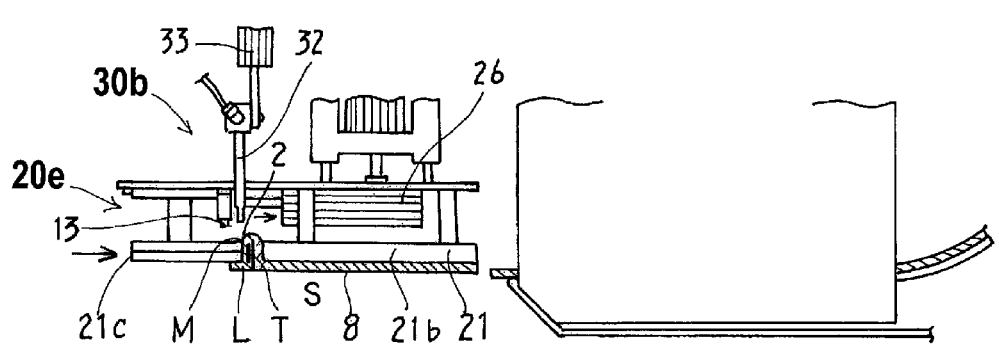
Figure 21:
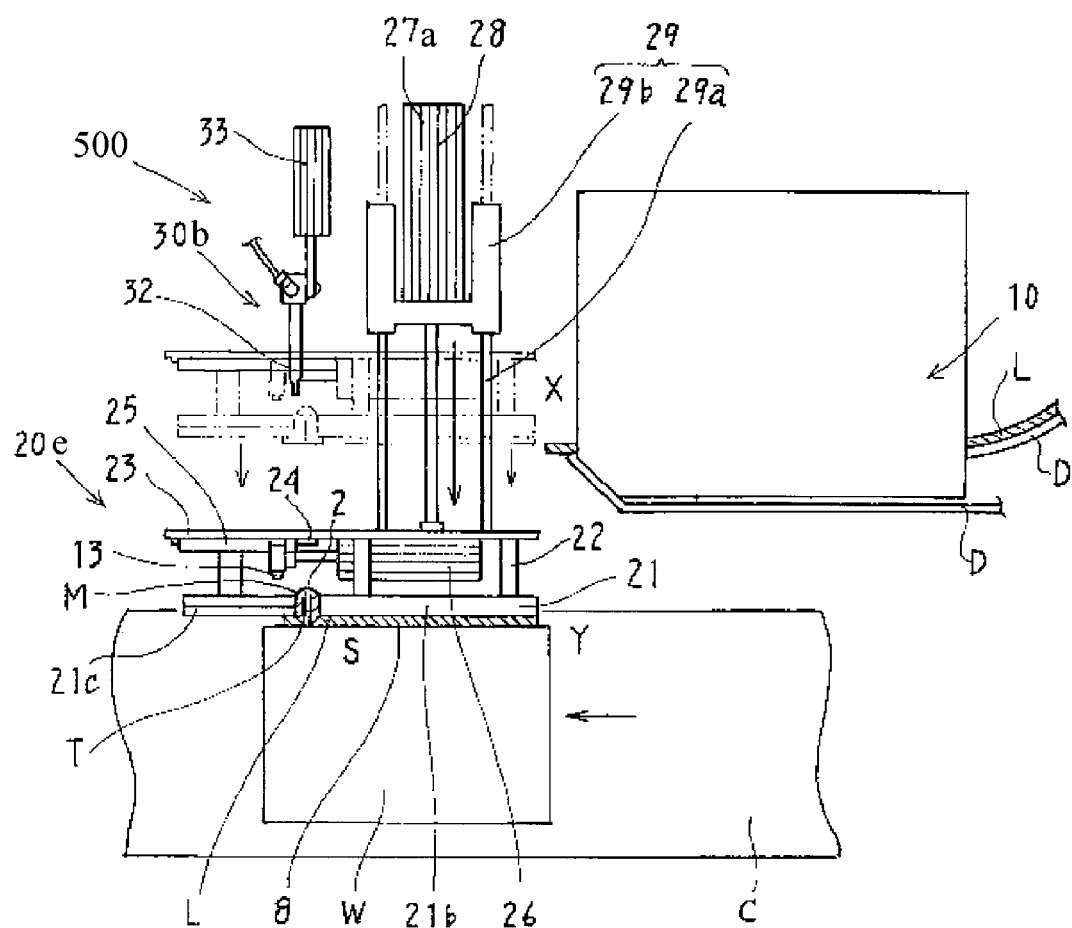
FIG. 21 is a plan view showing the label affixing apparatus according to the fifth embodiment of the present invention, and its action.

FIGS. 19 through 21 show a label affixing apparatus 500 according to a fifth embodiment of the present invention, in which the reader/writer 13 of the label affixing apparatus 200 according to the second embodiment is provided in the folding/affixing means 20 rather than the label conveying means 10.

More specifically, as shown in FIG. 19, folding/affixing means 20e of the label affixing apparatus 500 comprise the suction nozzle 32 serving as the folding assisting means 30b for aspirating the part 2 of the label L including the tag attachment site 1 to which the RFID tag T of the label L is attached from the front surface side (the display layer U) and folding the part 2 of the label L toward the front surface side, and also comprise the reader/writer 13, at least the antenna (not shown) of which is provided in a position facing the part 2 of the label L, or in other words a position opposing the folding space e.

In more detail, the reader/writer 13 opposes the folding space e, which is formed between the divided bodies 21b, 21c in the removed position V of the second divided body 21c, so as to be capable of communicating with the IC chip Ta of the RFID tag T, and is fixed to the base 23 via the attachment member 13a.

The circuit configuration of the label affixing apparatus 500 according to the fifth embodiment is similar to the circuit configuration of the label affixing apparatus 100 according to the second (first) embodiment (see FIG. 59).

According to the label affixing apparatus 500 of the fifth embodiment, the label L is affixed in the following manner. A case in which the operation flag is set to ON (1) will be described using FIG. 5 and FIGS. 19 through 21. When the operation flag is set to OFF (0), the label is affixed in planar form, as described above.

As shown in FIG. 20A, the label L is conveyed by the label conveying means 10, and when the backing sheet D is folded back by the peeling plate 11 such that the label L is peeled away, the suction plate 21 aspirates the label L in the suction position X. In this state, as shown in FIG. 9B, the air cylinder device 26 is activated to position the second divided body 21c in the removed position V. As a result, the folding space e into which the part 2 of the label L that projects from the rear surface side to the front surface side can enter is formed between the first divided body 21b and second divided body 21c.

In this state, the reader/writer 13 writes or reads information to or from the IC chip Ta of the RFID tag T. At this time, defects in the RFID tag T may be detected through information writing or reading, as described above.

Thereafter, similarly to the second embodiment, the air cylinder device 33 is activated to cause the suction nozzle 32 to advance into contact with or close to the front surface of the part 2 of the label L, as shown in FIG. 20B, whereupon the suction nozzle 32 is activated to aspirate the label L through suction. Next, as shown in FIGS. 19 and 20C, the air cylinder device 26 is activated to move the second divided body 21c from the removed position V to the to the joining position S, and the air cylinder device 33 is activated to cause the suction nozzle 32 to retreat. As a result, the part 2 of the label L is pulled by the suction nozzle 32, and therefore the part 2 of the label L is reliably folded into an angular shape so as to form the folded portion M, as shown in FIG. 20D.

Next, as shown in FIG. 21, the air cylinder device 33 is halted, whereupon the air cylinder device 28 of the moving means 27a is activated to move the suction plate 21 from the suction position X to the affixing position Y. As a result, the label L is affixed to the product W. Once the label is affixed, the suction plate 21 is returned to the suction position X.

Thus, the actions and effects of the fifth embodiment are similar to those of the label affixing apparatus according to the fourth embodiment described above.

Figure 22:
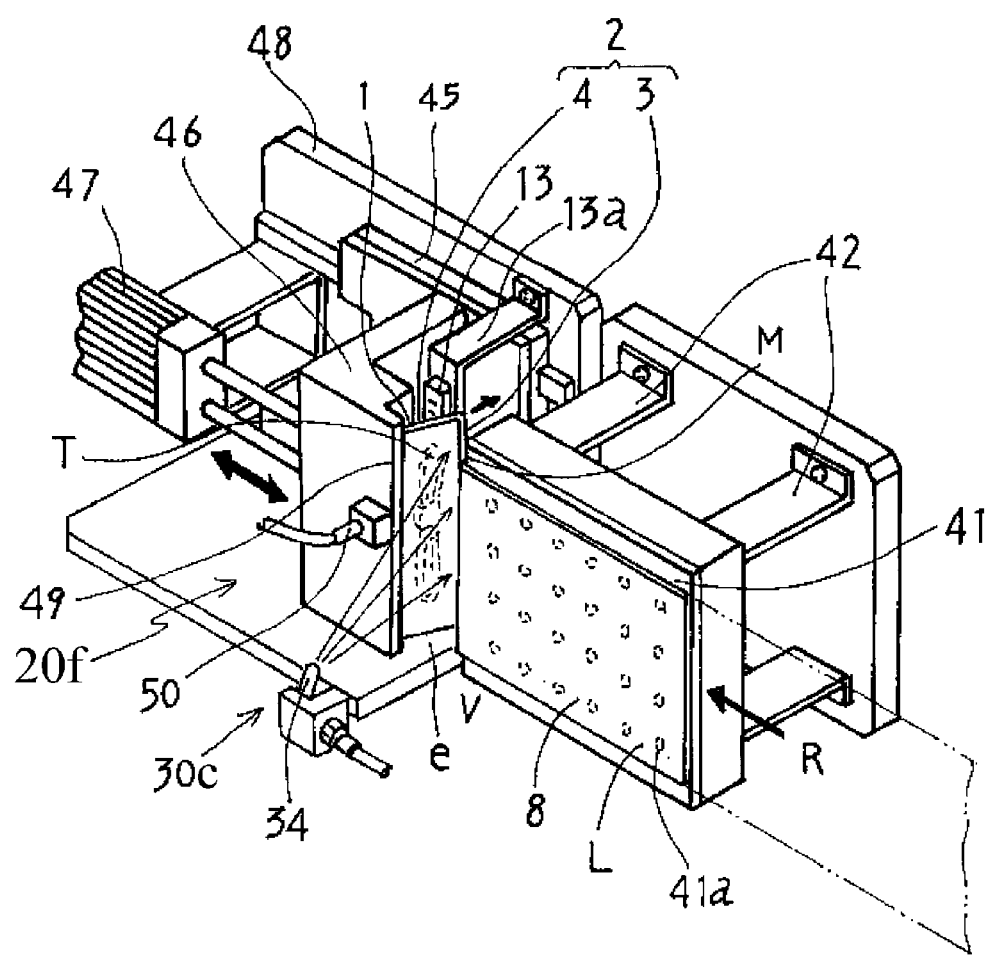
FIG. 22 is a perspective view showing the main parts of a label affixing apparatus according to a sixth embodiment of the present invention.
Figure 23:
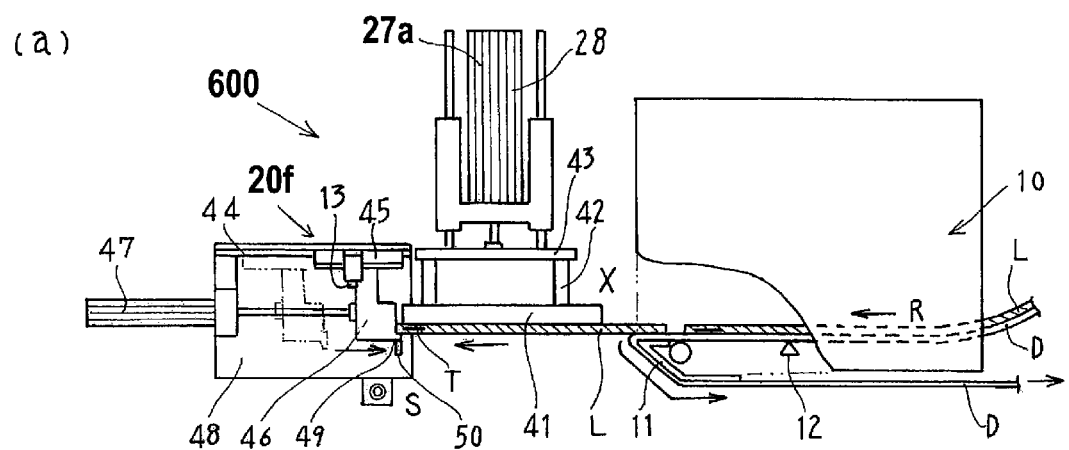
FIGS. 23A through 23D are plan views showing the label affixing apparatus according to the sixth embodiment of the present invention, and its action.
Figure 23:
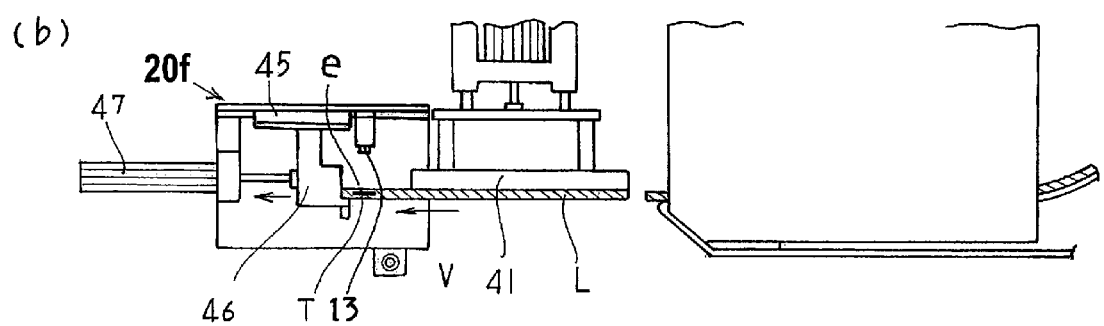
Figure 23:
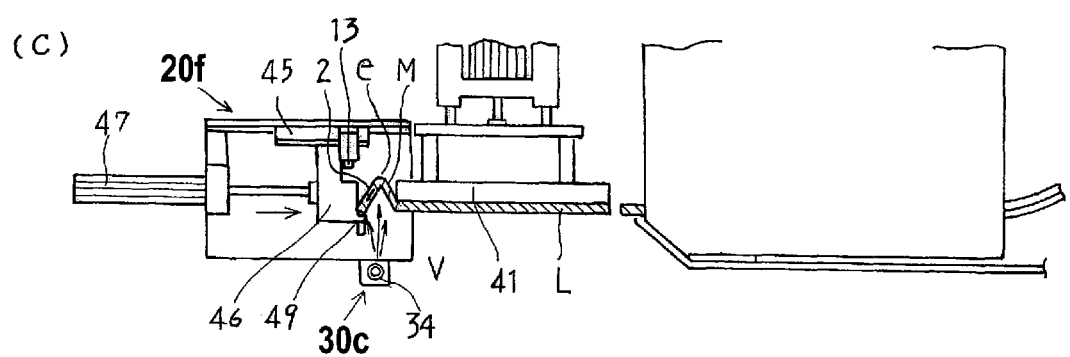
Figure 23:
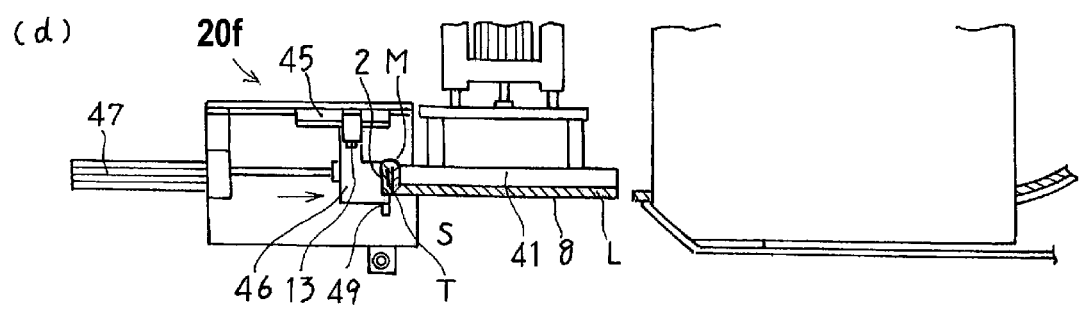
Figure 24:
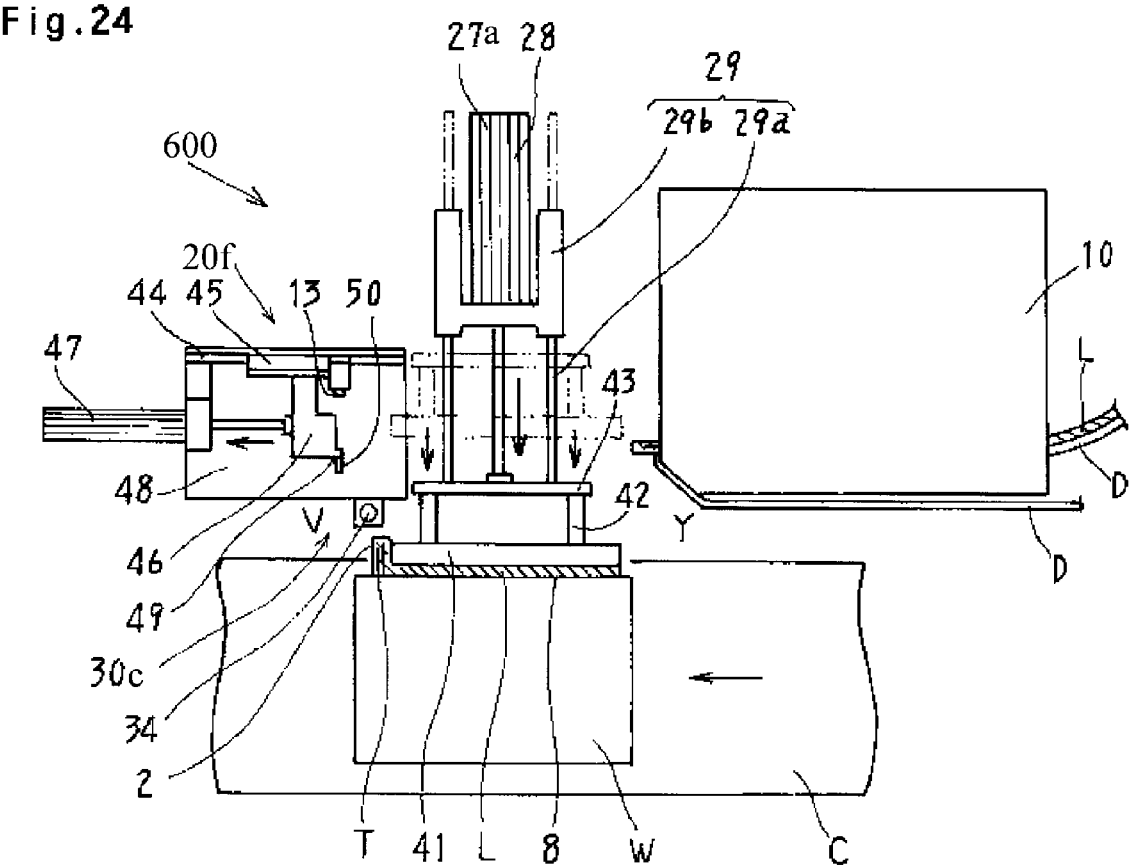
FIG. 24 is a plan view showing the label affixing apparatus according to the sixth embodiment of the present invention, and its action.

FIGS. 22 through 24 show a label affixing apparatus 600 according to a sixth embodiment of the present invention, in which the reader/writer 13 of the label affixing apparatus 300 according to the third embodiment is provided in the folding/affixing means 20 rather than the label conveying means 10.

More specifically, as shown in FIG. 22, the label affixing apparatus 600 comprises the suction plate 41 (label holding means) as folding/affixing means 20f, and similarly to the label affixing apparatus 300 according to the third embodiment, the suction plate 41 is not divided.

In contrast to the label affixing apparatus according to the third embodiment, the label affixing apparatus 600 further comprises the reader/writer 13, and at least the antenna (not shown) of the reader/writer 13 is provided in a position facing the part 2 of the label L, or in other words a position opposing the folding space e.

In more detail, the reader/writer 13 opposes the folding space e, which is formed between the pressing member 46 and the suction plate 41 in the removed position V of the pressing member 46, so as to be capable of communicating with the IC chip Ta of the RFID tag T, and is fixed to the support body 48 serving as a support member via the attachment member 13a.

The circuit configuration of the label affixing apparatus 600 according to the sixth embodiment is similar to the circuit configuration of the label affixing apparatus 100 according to the third (first) embodiment (see FIG. 59).

According to the label affixing apparatus 600 of the sixth embodiment, the label L is affixed in the following manner. A case in which the operation flag is set to ON (1) is described using FIG. 5 and FIGS. 22 through 24. When the operation flag is set to OFF (0), the label is affixed in planar form, as described above.

As shown in FIG. 23A, the label L is conveyed by the label conveying means 10, and when the backing sheet D is folded back by the peeling plate 11 such that the label L is peeled away, the label L is conveyed in the conveyance direction R while being aspirated by the suction plate 41. At the same time, the air cylinder device 47 is activated to move the pressing member 46 from the removed position V to the joining position S.

When the front end of the label L reaches the bearing portion 49 of the pressing member 46, the sensor 50 detects this and outputs a signal to the label affixation control unit 92. The air cylinder device 47 is then activated to move the pressing member 46 from the joining position S to the removed position V, and the suction plate 41 aspirates the label L in the suction position X, as shown in FIG. 23B. As a result, the folding space e, into which the part 2 of the label L that projects from the rear surface side to the front surface side can enter, is formed between the suction plate 41 and the pressing member 46.

In this state, the reader/writer 13 writes or reads information to or from the IC chip Ta of the RFID tag T. At this time, defects in the RFID tag T may be detected through information writing or reading, as described above.

Thereafter, similarly to the third embodiment, the air cylinder device 47 is activated to move the pressing member 46 from the removed position V to the joining position S, and the air blowing nozzle 34 is activated to blow air toward the rear surface side (the adhesive layer B side) of the part 2 of the label L including the tag attachment site 1 to which the RFID tag T of the label L is attached, as shown in FIGS. 22 and 23C. As a result, the suction plate 41 and pressing member 46 press the bend portion 7 of the first side face 3 and the bend portion 7 of the second side face 4 in a direction for causing the respective rear surfaces of the first side face 3 and second side face 4 to approach each other while the suction plate 41 aspirates and holds the label L, whereby the part 2 of the label L is reliably folded into an angular shape by the force of the air blown by the air blowing nozzle 34. Thus, the folded portion M is formed, as shown in FIG. 23D.

As shown in FIG. 24, the air cylinder device 47 is then activated to move the pressing member 46 from the joining position S to the removed position V, and the air cylinder device 28 is activated to move the suction plate 41 from the suction position X to the affixing position Y. As a result, the label L is affixed to the product W. Once the label is affixed, the suction plate 41 is returned to the suction position X.

Thus, the actions and effects of the sixth embodiment are similar to those of the label affixing apparatuses according to the fourth and fifth embodiments described above.

Note that in the fourth through sixth embodiments described above, the entire reader/writer 13 is attached to the base 23 or the support body 48. But, the present invention is not necessarily limited thereto, and only the antenna (not shown) of the reader/writer 13 may be attached. Therefore, the present invention may be modified appropriately.

FIGS. 25 through 29 and FIG. 60 show a label affixing apparatus according to a seventh embodiment of the present invention. In a label affixing apparatus 700 according to the seventh embodiment, fold detecting means 60 are added to the folding/affixing means 20 of the label affixing apparatus 100 according to the first and second embodiments.

Note that the label affixing apparatus 700 described below is substantially identical to the label affixing apparatus 100 according to the first embodiment.

Figure 25:
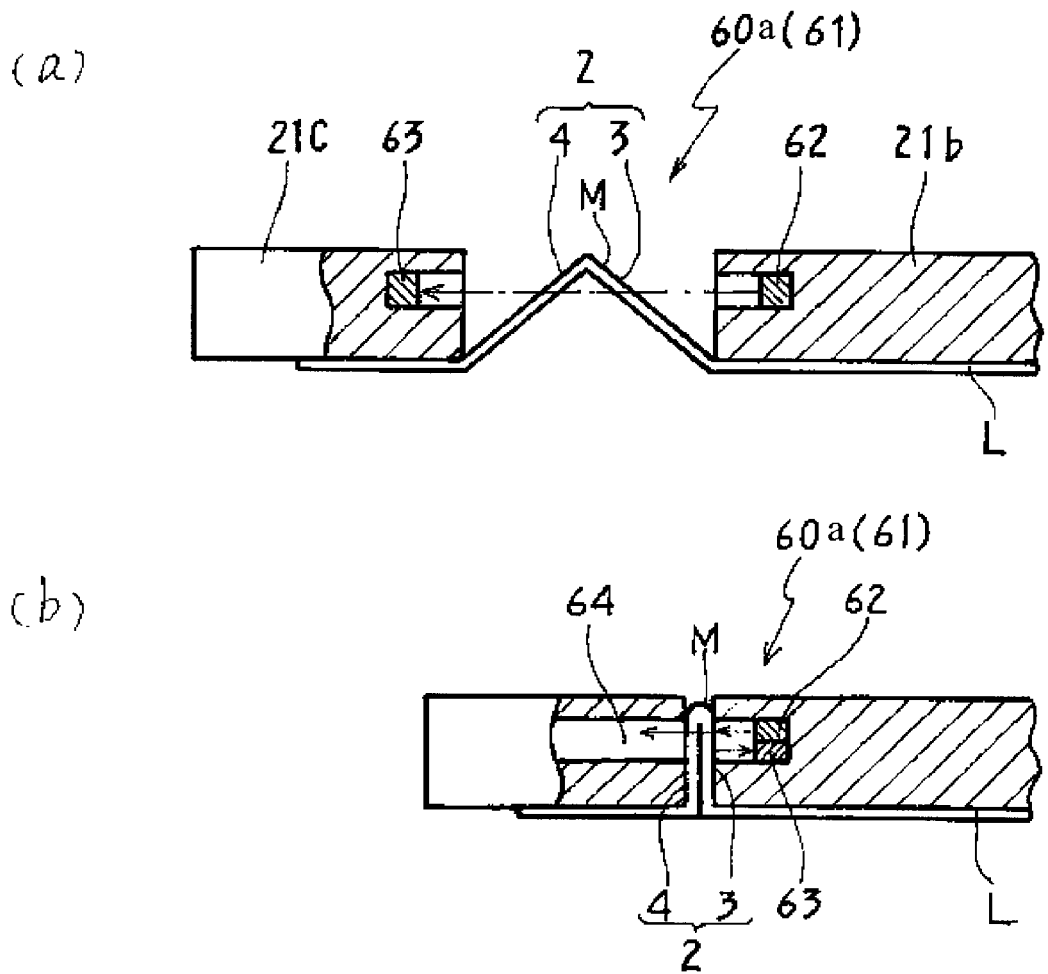
FIG. 25 is a perspective view showing the main parts of a label affixing apparatus according to a seventh embodiment of the present invention.
Figure 26:
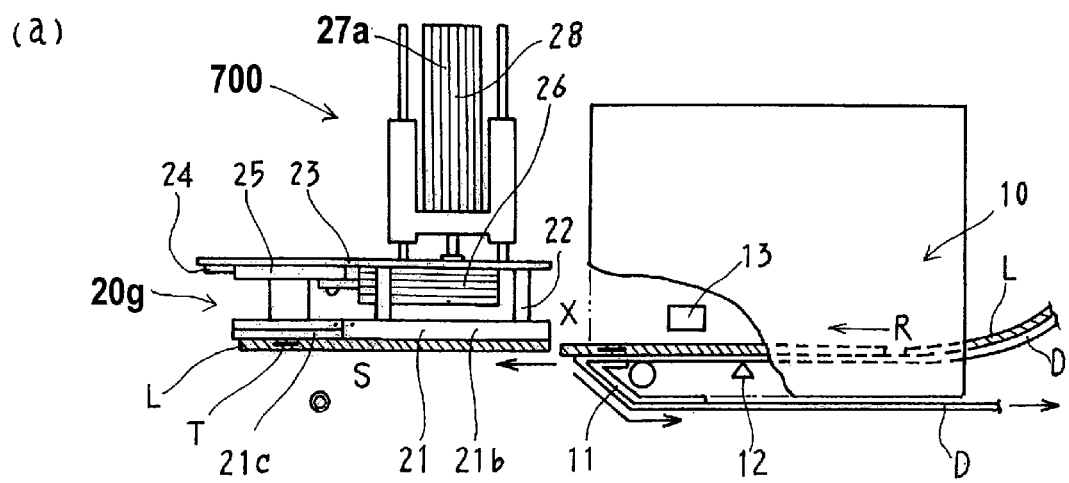
FIGS. 26A through 26D are plan views showing the label affixing apparatus according to the seventh embodiment of the present invention, and its action.
Figure 26:
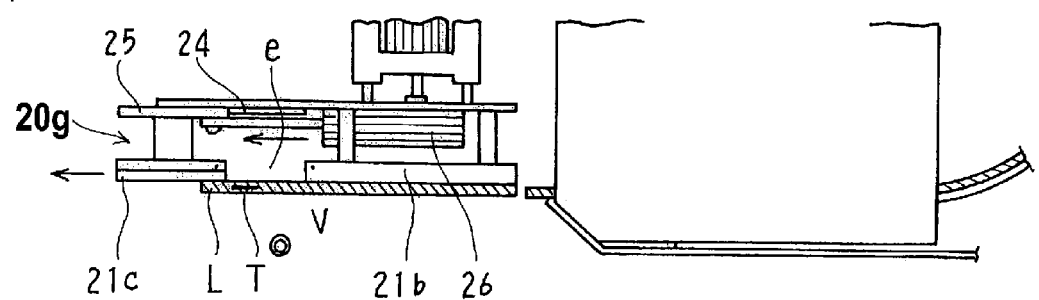
Figure 26:
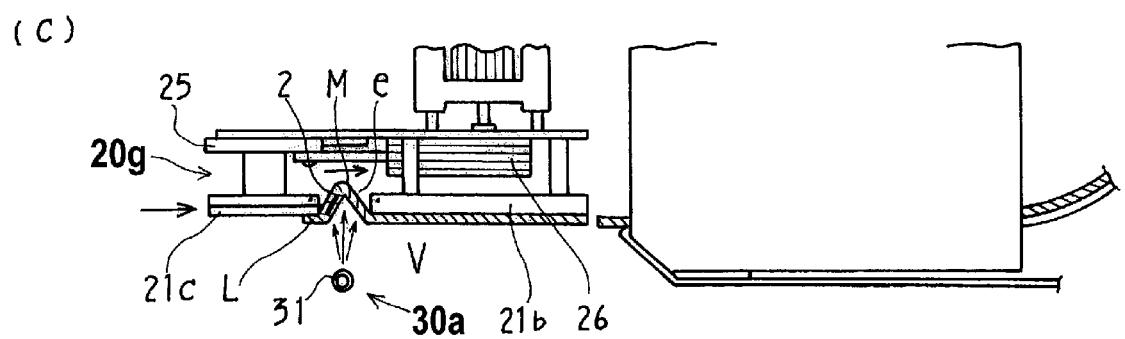
Figure 26:
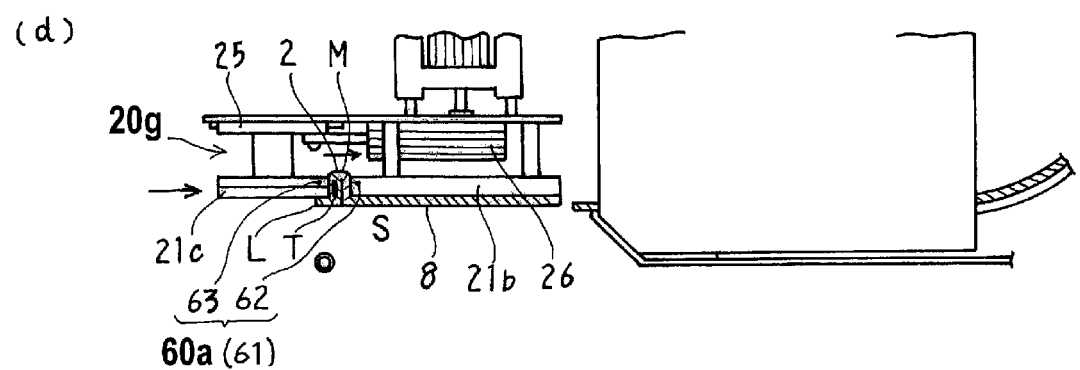

FIGS. 25 and 26 show the label affixing apparatus 700 according to the seventh embodiment, in which folding/affixing means 20g comprise fold detecting means 60a for detecting whether or not the part 2 of the label L has been folded into an angular shape. The fold detecting means 60a comprise a light-projecting and light-receiving optical sensor 61 that detects the presence or absence of the folded portion M of the label L facing the gap between the end surfaces of the pair of divided bodies 21b, 21c when the second divided body 21c is positioned in the joining position S.

As shown in FIG. 25A, for example, the optical sensor 61 employs a transmission detection-type sensor that comprises a light projection portion 62 provided on the first divided body 21b and a light reception portion 63 provided on the second divided body 21c. The light reception portion 63 detects the presence or absence of light from the light projection portion 62 when the second divided body 21c is positioned in the joining position S. Note that the positional relationship between the light projection portion 62 and the light reception portion 63 may be reversed.

The light reception portion 63 indicates a normal state when no light is detected from the light projection portion 62, and indicates an abnormality when light is detected from the light projection portion 62.

Further, as shown in FIG. 25B, for example, the optical sensor 61 may employ a reflection detection-type sensor in which the light projection portion 62 and light reception portion 63 are provided on the first divided body 21b and the light reception portion 63 detects the presence or absence of reflected light, which is produced when the light from the light projection portion 62 is reflected by the folded portion M of the label L, while the second divided body 21c is positioned in the joining position S. In FIG. 25B, a hole 64 transmits light when the folded portion M of the label L is detected to be absent during the detection of the light reception portion 63. Note that the positional relationship between the hole 64 and the light projection portion 62 and light reception portion 63 may be reversed. The light reception portion 63 indicates a normal state when reflected light is detected, and indicates an abnormality when reflected light is not detected.

Figure 60:
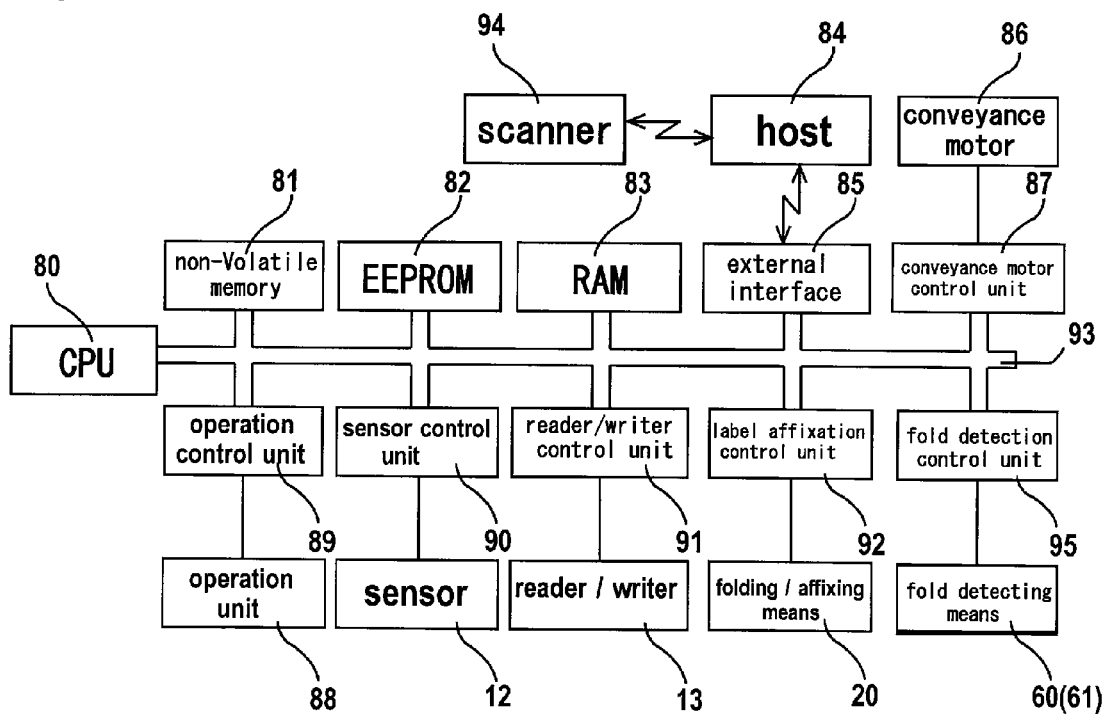
FIG. 60 is a circuit diagram of the label affixing apparatus according to the seventh embodiment of the present invention.

FIG. 60 is a circuit diagram of the label affixing apparatus 700 according to the seventh embodiment.

The circuit configuration of the label affixing apparatus 700 according to this embodiment is formed by adding a fold detection control unit 95 for controlling the fold detecting means 60a (optical sensor 61) to the circuit configuration of the label affixing apparatus 100 according to the first embodiment (see FIG. 59).

The fold detection control unit 95 functions as abnormality signal transmitting means for activating detection by the fold detecting means 60a (optical sensor 61) when the second divided body 21c is positioned in the joining position S, and for transmitting an abnormality signal when the fold detecting means 60a (optical sensor 61) detect that the part 2 of the label L has not been folded into an angular shape. On the basis of the abnormality signal, control may be performed such as halting the apparatus, causing a warning buzzer to sound, or illuminating a warning lamp, for example.

According to the label affixing apparatus 700 of the seventh embodiment, the label L is affixed in the following manner. A case in which the operation flag in the operation region of the EEPROM 82 is set to ON (1) by the operation unit 88 is described using FIGS. 25 through 27.

Figure 27:
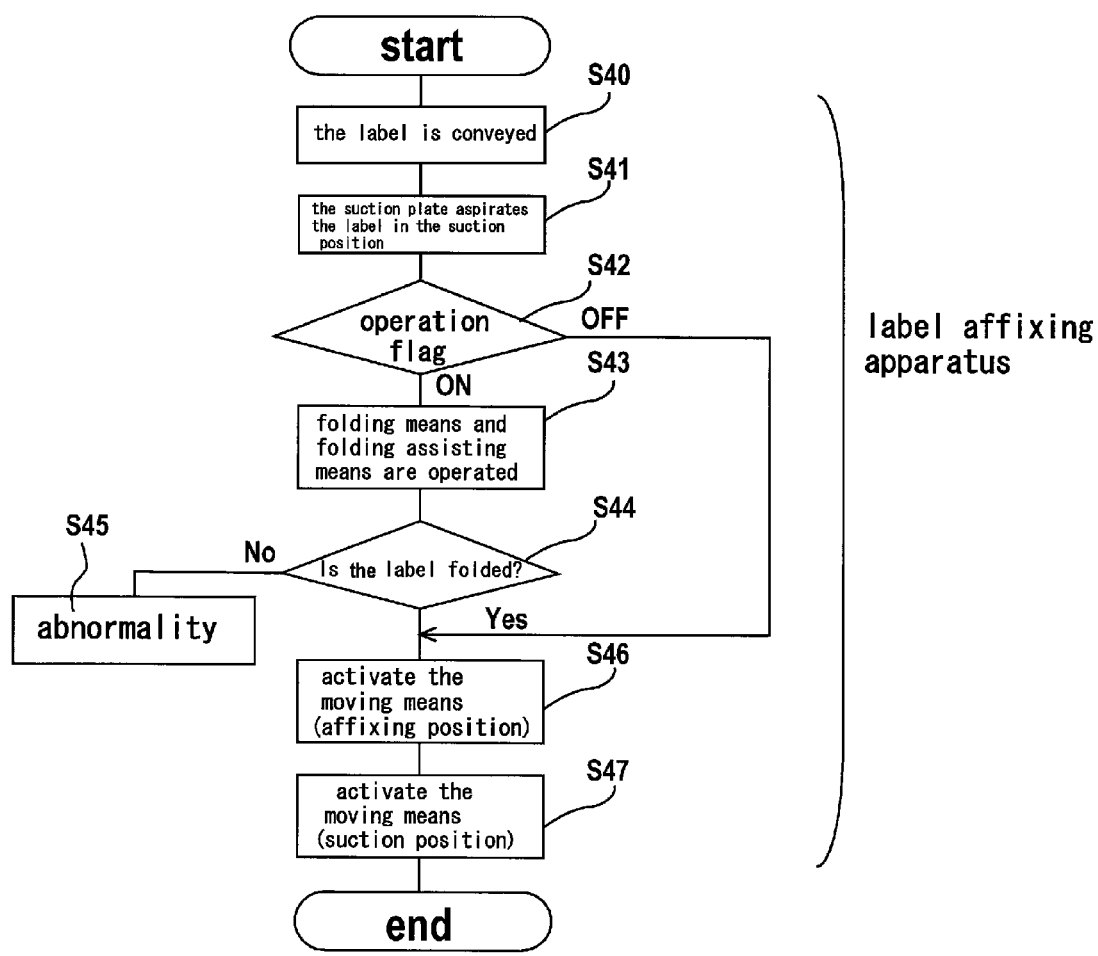
FIG. 27 is a flowchart showing an operation of the label affixing apparatus according to the seventh embodiment of the present invention.

With reference to the flowchart shown in FIG. 27, the label L is conveyed as shown in FIG. 26A by the label conveying means 10 (S40), and the sensor 12 measures the timing at which the label affixation control unit 92 operates the folding/affixing means 20g based on detection of the label L. Next, when the backing sheet D is folded back by the peeling plate 11 such that the label L is peeled away, the suction plate 21 aspirates the label L in the suction position X (S41).

Since ON (1) is set in the operation flag region of the EEPROM 82 (S42 ON), the air cylinder device 26 (folding means) and the folding assisting means 30a are operated during the operation to affix the label L (S43). Hence, as shown in FIG. 26B, the second divided body 21c is positioned in the removed position V. As a result, the space e, into which the part 2 of the label L that projects from the rear surface side (the adhesive layer B side) to the front surface side (the display layer U side) can enter, is formed between the first divided body 21b and the second divided body 21c.

Next, as shown in FIGS. 1 and 26C, the air cylinder device 26 is activated to move the second divided body 21c from the removed position V to the joining position S. Further, the air blowing nozzle 31 is activated to blow air toward the rear surface side (the adhesive layer B side) of the part 2 of the label L including the tag attachment site 1 to which the RFID tag T of the label L is attached. As a result, the part 2 of the label L is reliably folded into an angular shape, forming the folded portion M, as shown in FIG. 26D.

Once the second divided body 21c has moved from the removed position V to the joining position S, detection by the fold detecting means 60a (optical sensor 61) is performed (S44), and when it is detected that the part 2 of the label L is not folded into an angular shape (S44 NO), an abnormality signal is transmitted (S45). As a result, control is performed such as halting the apparatus, causing a warning buzzer to sound, or illuminating a warning lamp, for example.

On the other hand, when the fold detecting means 60a (optical sensor 61) detect that the part 2 of the label L has been folded into an angular shape (S44 YES), the folded portion M is determined to be formed normally, and thereafter, similarly to the first embodiment, the label affixation control unit 92 activates the air cylinder device 28 of the moving means 27a to move the suction plate 21 from the suction position X to the affixing position Y (S46), whereby the label L is affixed to the product. In this case, the affixing surface 8 of the label L is formed on either side of the folded portion M forming the angularly projecting part 2 of the label L. Therefore, the affixing surface 8 is pressed against the product W by the first divided body 21b and second divided body 21c such that the label L is reliably affixed to the product W.

Further, defects may occur during folding of the label L such that the RFID tag overlaps the perforations of the label L or the label L is fed incorrectly. In such cases, the label L cannot be folded correctly, leading to defective folding. However, the fold detecting means 60 detect whether or not the part 2 of the label L has been folded into an angular shape. As a result of this detection performed by the fold detecting means 60a, control such as halting the apparatus can be performed in relation to a defectively folded label to ensure that the label L is not affixed. Thus, affixation defects can be reliably prevented. Once the label has been affixed, the suction plate 21 is returned to the suction position X (S47).

Next, a case in which a normal label not attached with the RFID tag T is affixed is described. In this case, in the operation flag in the operation flag region of the EEPROM 82 is set to OFF (0) in the operation unit 88.

As shown in FIG. 26A, the label L is conveyed by the label conveying means 10 (S40). The sensor 12 measures the timing at which the label affixation control unit 92 operates the folding/affixing means 20g on the basis of the detection of the label L. Next, when the backing sheet D is folded back by the peeling plate 11 such that the label L is peeled away, the suction plate 21 aspirates the label L in the suction position X (S41).

Since OFF (0) is set in the operation flag region of the EEPROM 82 (S42 OFF), the label affixation control unit 92 activates the air cylinder device 28 of the moving means 27a without activating the air cylinder device 26 (folding means) and folding assisting means 30a, whereby the suction plate 21 is moved from the suction position X to the affixing position Y (S46). As a result, the aspirated normal label is affixed in planar form to the product W. Hence, the setting from the operation unit 88 can be introduced easily into a small system in which the number of product types is small and simple sorting is performed. Once the label has been affixed, the suction plate 21 is returned to the suction position X (S47).

Figure 28:
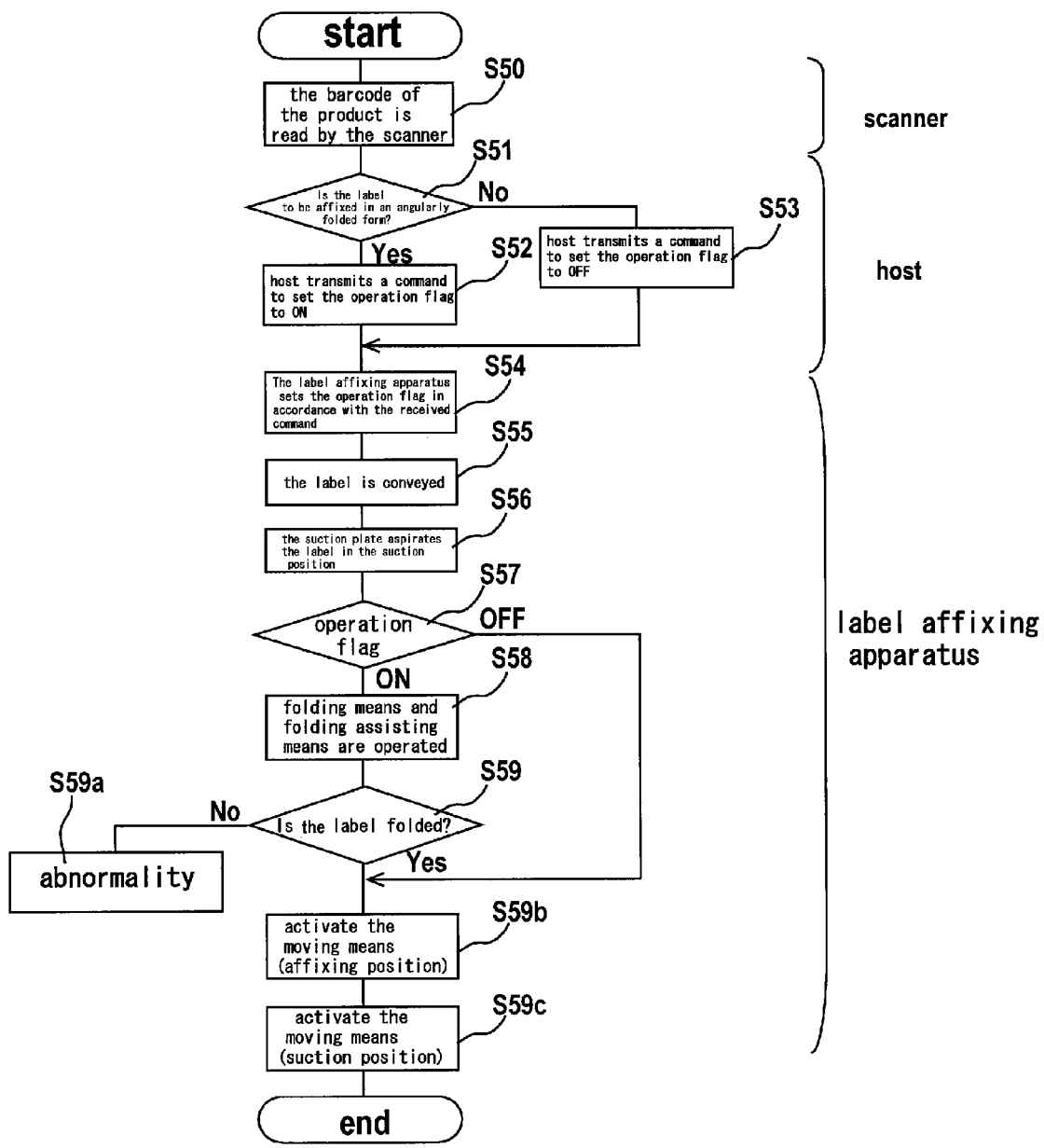
FIG. 28 is a flowchart showing another operation of the label affixing apparatus according to the seventh embodiment of the present invention.

Next, a case in which the operation flag is set in accordance with a command received by the external interface 85 is described using the flowchart shown in FIG. 28. This setting is employed when the label L attached with the RFID tag T is loaded in the label affixing apparatus and products W having different contents are conveyed together by the conveyor C, for example. A barcode written with an instruction indicating whether to affix the label L attached with the RFID tag T in planar form (operation flag OFF) or in an angularly folded form (operation flag ON) is provided on the product W in accordance with the type of the product W, and the label L is affixed in accordance with the instruction on the barcode.

As shown in FIG. 28, first, the barcode of the product W is read by the scanner 94 (S50), whereupon the host 84 determines whether the content of the barcode read by the scanner 94 indicates that the label L is to be affixed in an angularly folded form (operation flag ON) or a planar form (operation flag OFF) (S51), and transmits a corresponding command (S52, S53). The label affixing apparatus 700 sets the operation flag in the operation flag region of the EEPROM 82 to ON (1) or OFF (0) in accordance with the received command (S54).

Then, when the label L is conveyed by the label conveying means 10 (S55) and the backing sheet D is folded back by the peeling plate 11 such that the label L is peeled away, the suction plate 21 aspirates the label L in the suction position X (S56). Next, when the operation flag in the operation flag region of the EEPROM 82 is set at ON (1) (S57 ON), the label affixation control unit 92 activates the air cylinder device 26 (folding means) and folding assisting means 30a (S58).

Next, as described above, once the second divided body 21c has moved from the removed position V to the joining position S, detection by the fold detecting means 60a (optical sensor 61) is performed (S59). When the fold detecting means 60a (optical sensor 61) detects that the part 2 of the label L is not folded into an angular shape (S59 NO), an abnormality signal is transmitted (S59a). As a result, control is performed, such as halting the apparatus, causing a warning buzzer to sound, or illuminating a warning lamp, for example.

On the other hand, when the fold detecting means 60a (optical sensor 61) detect that the part 2 of the label L has been folded into an angular shape (S59 YES), the folded portion M is determined to be formed normally. Thereafter, the label affixation control unit 92 activates the moving means 27a (S59b), whereby the label L is affixed to the product W in an angularly folded form.

When OFF (0) is set in the operation flag region of the EEPROM 82 (S57 OFF), the label affixation control unit 92 activates the air cylinder device 28 of the moving means 27a without activating the air cylinder device 26 (folding means) and folding assisting means 30a, whereby the suction plate 21 is moved from the suction position X to the affixing position Y (S59b). As a result, the aspirated normal label is affixed to the product W in planar form.

According to a setting that corresponds to the command received by the external interface 85, the form in which the label L attached with the RFID tag T is affixed (planar form or angularly folded form) can be modified easily according to the type or content of the product W. Once the label has been affixed, the suction plate 21 is returned to the suction position X (S59c).

Note that in the above description, the barcode of the product W is read by the scanner 94, whereupon the host 84 determines whether the content of the barcode read by the scanner 94 indicates that the label L is to be affixed in an angularly folded form or a planar form and transmits a corresponding command. However, in a construction in which an external machine is used as a scanner, the label affixing apparatus 700 receives barcode data read by the scanner via the external interface 85, and the label affixation control unit 92 operates the air cylinder device 26 (folding means) and folding assisting means 30a in accordance with the content of the barcode read by the scanner.

Figure 29:
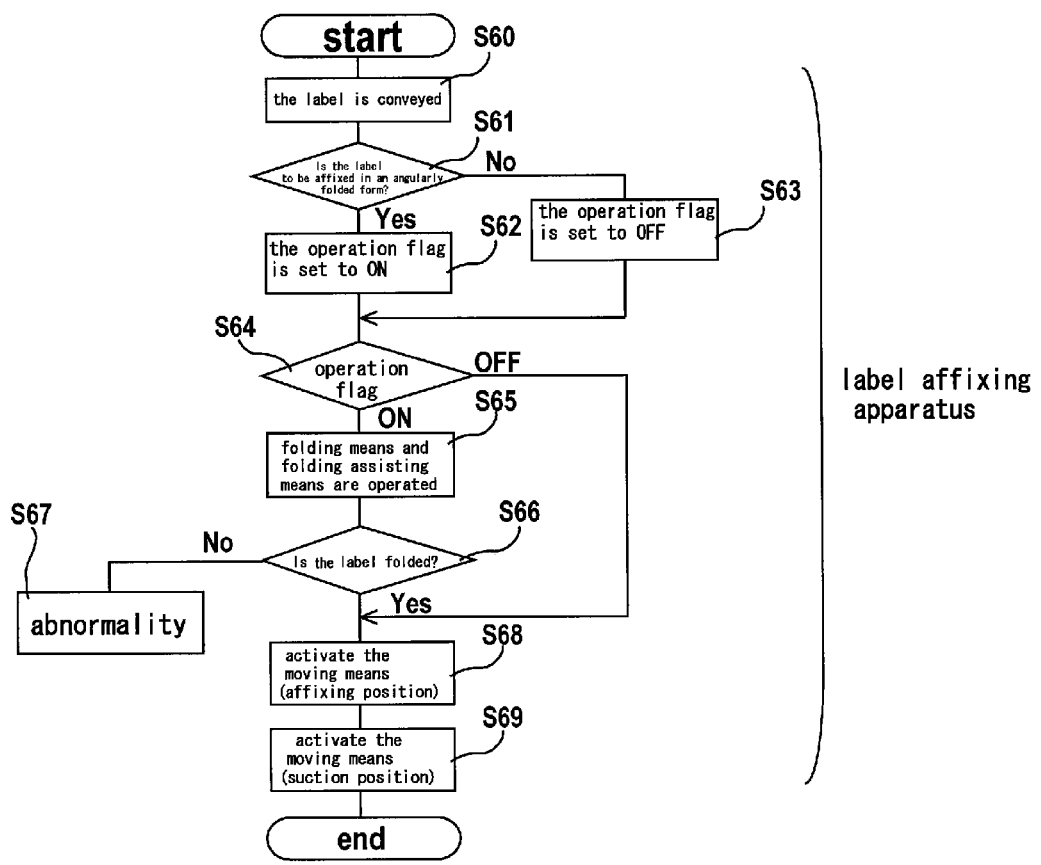
FIG. 29 is a flowchart showing a further operation of the label affixing apparatus according to the seventh embodiment of the present invention.

Next, a case in which setting of the operation flag is performed by having the reader/writer 13 detect either a normal label to which the RFID tag T is not attached or the label L to which the RFID tag T is attached is described using the flowchart shown in FIG. 29.

In this setting, the type of label loaded in the label affixing apparatus 700 is determined by the reader/writer 13 during conveyance, for example, such that when an RFID label requiring advance folding is detected, the operation flag is set to ON, and when a normal label or an RFID label not requiring advance folding is detected, the operation flag is set to OFF.

As shown in FIG. 29, the label is conveyed (S60), and the reader/writer 13 determines whether or not folding into an angular form is required (S61). When folding is required (S61 YES), the operation flag is set to ON (S62), and when folding is not required (S61 NO), the operation flag is set to OFF (S63).

When the operation flag is at ON (1) (S64 ON), the air cylinder device 26 (folding means) and folding assisting means 30a are operated (S65).

Next, as described above, once the second divided body 21c has moved from the removed position V to the joining position S, detection by the fold detecting means 60a (optical sensor 61) is performed (S66). When the fold detecting means 60a (optical sensor 61) detect that the part 2 of the label L is not folded into an angular shape (S66 NO), an abnormality signal is transmitted (S67). As a result, control such as halting the apparatus, causing a warning buzzer to sound, or illuminating a warning lamp, for example, is performed.

On the other hand, when the fold detecting means 60a (optical sensor 61) detect that the part 2 of the label L has been folded into an angular shape (S66 YES), the folded portion M is determined to be formed normally, and thereafter, the moving means 27a are activated (S68), whereby the label L is affixed to the product W in an angularly folded form.

When the operation flag is set at OFF (0) (S64 OFF), the moving means 27a are activated with the air cylinder device 26 (folding means) and folding assisting means 30a (S68) not activated, whereby the label L is affixed to the product W in planar form. Once the label has been affixed, the suction plate 21 is returned to the suction position X (S69).

Note that the label affixing apparatus 700 described above is substantially identical to the label affixing apparatus 100 according to the first embodiment, but the label affixing apparatus 700 may also be applied to the label affixing apparatus 200 of the second embodiment, which differs only in the construction of the folding assisting means 30.

More specifically, in the first and second embodiments, as described above, the folding assisting means 30 are not limited to an air blowing nozzle that blows air onto the part 2 of the label from the rear surface side or a suction nozzle that aspirates the part 2 of the label from the front surface side. Instead, any means that assist the operation to fold the part 2 of the label L to which the RFID tag T is attached in the same direction may be employed. Therefore, the present invention may be modified appropriately.

Accordingly, the label affixing apparatus 200 according to the second embodiment may be provided with the fold detecting means 60 similarly to the seventh embodiment.

Figure 30:
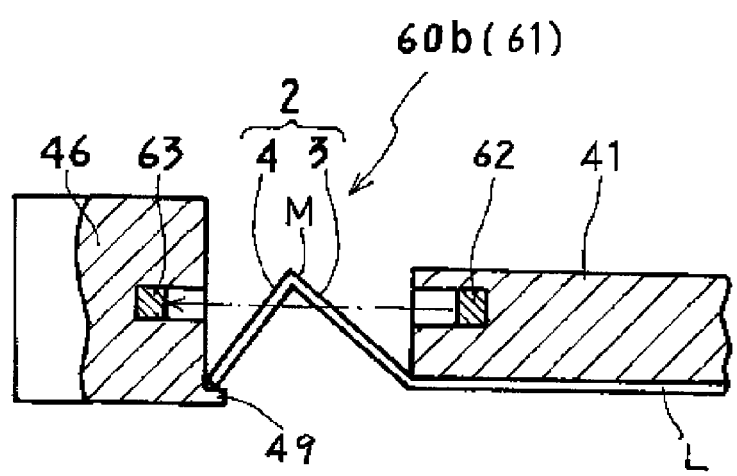
FIGS. 30A and 30B are perspective views showing the main parts of a label affixing apparatus according to an eighth embodiment of the present invention.
Figure 30:
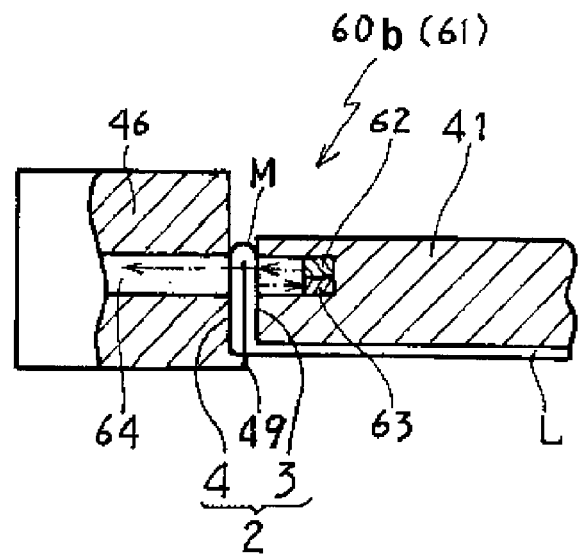
Figure 31:
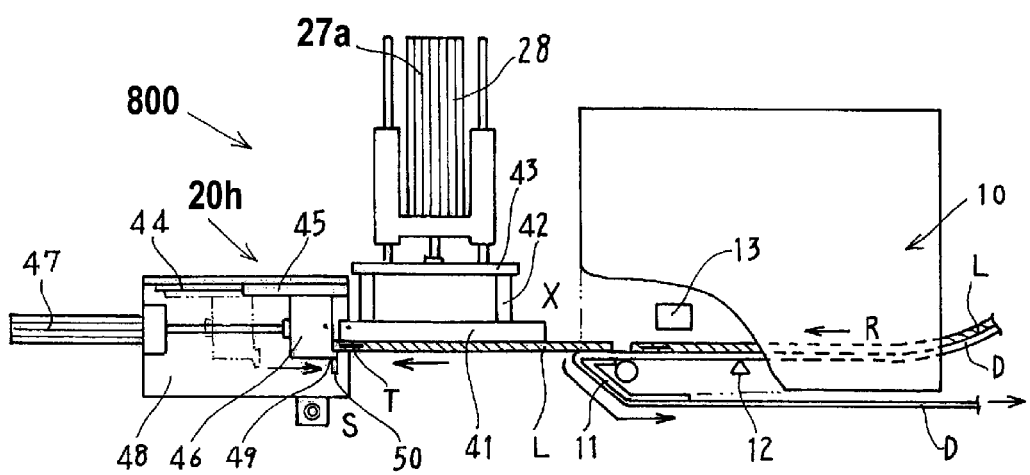
FIGS. 31A through 31D are plan views showing the label affixing apparatus according to the eighth embodiment of the present invention, and its action.
Figure 31:
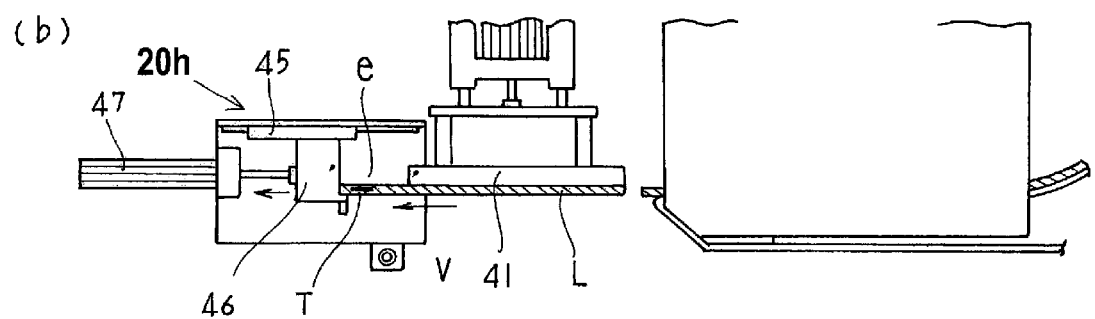
Figure 31:
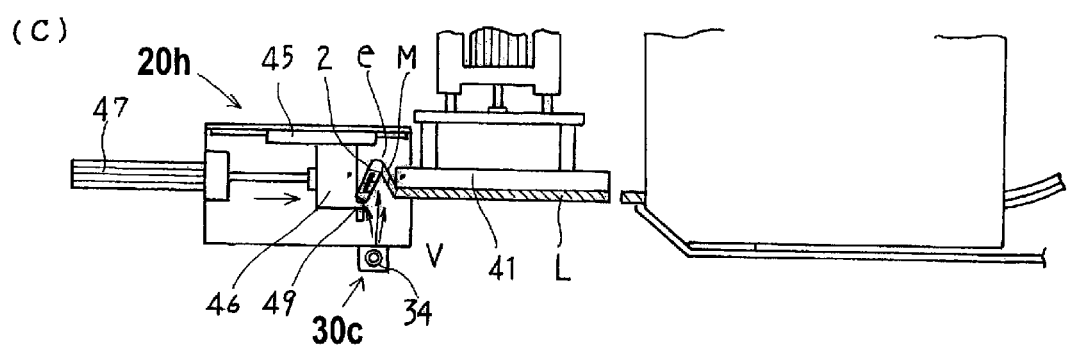
Figure 31:
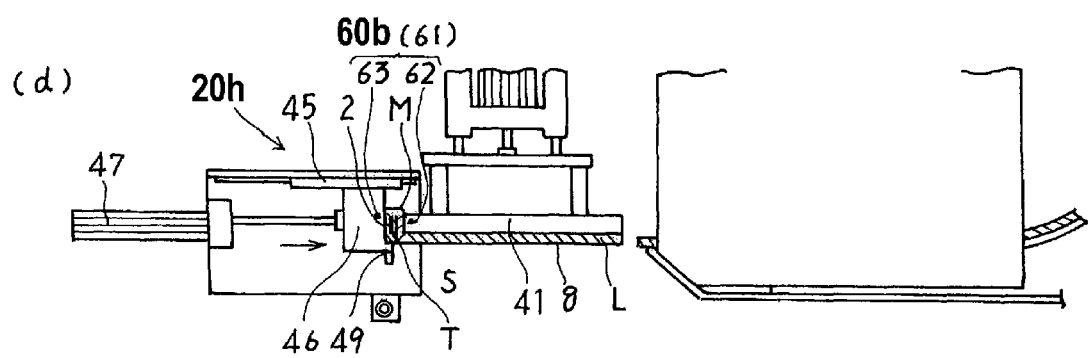

FIGS. 30 and 31 show a label affixing apparatus according to an eighth embodiment of the present invention. In a label affixing apparatus 800 according to the eighth embodiment, the fold detecting means 60 are added to the folding/affixing means 20 of the label affixing apparatus 300 according to the third embodiment.

As shown in FIGS. 62 and 65, the label L that is the subject of the label affixing apparatus 800 according to the eighth embodiment is such that the part 2 of the label L including the tag attachment site 1 attached with the RFID tag T of the label L is formed on the end portion of the label L.

Note that the label affixing apparatus 800 to be described below is substantially identical to the label affixing apparatus 300 according to the third embodiment.

As shown in FIGS. 30 and 31, the label affixing apparatus 800 according to the eighth embodiment of the present invention comprises the suction plate 41 (label holding means) as folding/affixing means 20h, and similarly to the label affixing apparatus 300 according to the third embodiment, the suction plate 41 is not divided.

As shown in FIGS. 30 and 31, the label affixing apparatus 800 according to the eighth embodiment differs from the label affixing apparatus according to the third embodiment in comprising fold detecting means 60b for detecting whether or not the part 2 of the label L has been folded into an angular shape.

The fold detecting means 60b comprise a light-projecting and light-receiving optical sensor 61 that detects the presence or absence of the folded portion M of the label L facing the gap between the pressing member 46 and the suction plate 41 when the pressing member 46 is positioned in the joining position S. As shown in FIG. 31A, for example, the optical sensor 61 employs a transmission detection-type sensor that comprises a light projection portion 62 provided on the suction plate 41 and a light reception portion 63 provided on the pressing member 46, wherein the light reception portion 63 detects the presence or absence of light from the light projection portion 62 when the pressing member 46 is positioned in the joining position S. Note that the positional relationship between the light projection portion 62 and the light reception portion 63 may be reversed. The light reception portion 63 indicates a normal state when no light is detected from the light projection portion 62, and indicates an abnormality when light is detected from the light projection portion 62.

Further, as shown in FIG. 31B, for example, the optical sensor 61 may employ a reflection detection-type sensor in which the light projection portion 62 and light reception portion 63 are provided on the suction plate 41 and the light reception portion 63 detects the presence or absence of reflected light, which is produced when the light from the light projection portion 62 is reflected by the folded portion M of the label L, while the pressing member 46 is positioned in the joining position S. In FIG. 31B, a hole 64 transmits light when the folded portion M of the label L is detected to be absent during the detection of the light reception portion 63. Note that the positional relationship between the hole 64 and the light projection portion 62 and light reception portion 63 may be reversed. The light reception portion 63 indicates a normal state when reflected light is detected, and indicates an abnormality when reflected light is not detected.

Note that the circuit configuration of the label affixing apparatus 800 according to the eighth embodiment is similar to the circuit configuration of the label affixing apparatus 700 according to the seventh embodiment (see FIG. 60).

According to the label affixing apparatus 800 of the eighth embodiment, the label L is affixed in the following manner. A case in which the operation flag is set to ON (1) will be described using FIGS. 27, 30 and 31. When the operation flag is set to OFF (0), the label is affixed in planar form, as described above.

As shown in FIG. 31A, label L is conveyed by the label conveying means 10, and when the backing sheet D is folded back by the peeling plate 11 such that the label L is peeled away, the label L is conveyed in the conveyance direction R of the label L while being aspirated by the suction plate 41. At the same time, the label affixation control unit 92 activates the air cylinder device 47 to move the pressing member 46 from the removed position V to the joining position S.

When the front end of the label L reaches the bearing portion 49 of the pressing member 46, the sensor 50 detects this and outputs a signal to the label affixation control unit 92. On the basis of the detection of the sensor 51, the air cylinder device 47 is activated to move the pressing member 46 from the joining position S to the removed position V, and the suction plate 41 aspirates the label L in the suction position X, as shown in FIG. 31B. As a result, the pressing member 46 is positioned in the removed position V, whereby the space e, into which the part 2 of the label L that projects from the rear surface side to the front surface side can enter, is formed between the suction plate 41 and the pressing member 46.

Next, as shown in FIGS. 12 and 31C, the air cylinder device 47 is activated to move the pressing member 46 from the removed position V to the joining position S, and the label affixation control unit 92 activates the air blowing nozzle 34 to blow air toward the rear surface side (the adhesive layer B side) of the part 2 of the label L including the tag attachment site 1 to which the RFID tag T of the label L is attached. As a result, the suction plate 41 and pressing member 46 press the bend portion 7 of the first side face 3 and the bend portion 7 of the second side face 4 in a direction for causing the respective rear surfaces of the first side face 3 and second side face 4 to approach each other while the suction plate 41 aspirates and holds the label L. As a result, the part 2 of the label L is reliably folded into an angular shape by the force of the air blown by the air blowing nozzle 34. Thus, the folded portion M is formed, as shown in FIG. 31D.

Once the pressing member 46 has moved from the removed position V to the joining position S, detection by the fold detecting means 60b (optical sensor 61) is performed, and when the fold detecting means 60b (optical sensor 61) detect that the part 2 of the label L is not folded into an angular shape, an abnormality signal is transmitted. As a result, control such as halting the apparatus, causing a warning buzzer to sound, or illuminating a warning lamp, for example, is performed.

On the other hand, when the fold detecting means 60b (optical sensor 61) detect that the part 2 of the label L has been folded into an angular shape, the folded portion M is determined to be formed normally, and thereafter, similarly to the third embodiment (see FIG. 14), the air cylinder device 47 is activated to move the pressing member 46 from the joining position S to the removed position V and the air cylinder device 28 is activated to move the suction plate 41 from the suction position X to the affixing position Y, whereby the label L is affixed to the product W.

FIGS. 32 through 38 show a label affixing apparatus according to a ninth embodiment of the present invention.

A label affixing apparatus 900 according to the ninth embodiment differs from the above embodiments in that the folding/affixing means 20 are capable of causing the part 2 of the label L to protrude by folding the part 2 from the rear surface side to the front surface side into an angular shape reliably, without the apparatus comprising the folding assisting means 30 described above. As shown in FIGS. 61, 63 and 64, in the subject label L of the label affixing apparatus 900 according to the ninth embodiment, the part 2 of the label L including the tag attachment site 1 is formed in an intermediate portion of the label L.

As shown in FIG. 32A, the label affixing apparatus 900 according to the ninth embodiment comprises a suction plate 71 as the label holding means of folding/affixing means 20i, and the suction plate 71 is provided with a plurality of small holes 71a that suck up air in order to aspirate the front surface of the label L. More specifically, the suction plate 71 comprises a first side body 71b for aspirating a first side portion 3a of the label L, which is adjacent to the part 2 of the label L, a second side body 71c that is capable of approaching the first side body 71b and aspirates a second side portion 4a of the label L, which is adjacent to the part 2 of the label L, and an intermediate body 72 provided between the first side body 71b and second side body 71c and that aspirates the part 2 of the label L.

The first side body 71b is fixed to a base 75 via a support member 76. The second side body 71c is provided slidably on the base 75 via a support member 77, and is capable of sliding close to the first side body 71b. As shown in FIG. 32B, a pin 78 projects from a lower surface of the support member 77 of the second side body 71*c*, and a guide hole 79 for guiding the pin 78 is formed in the base 75.

The intermediate body 72 is connected to the first side body 71*b* and the second side body 71*c* so as to be capable of moving between two positions, namely a planar position H in which the suction surface of the first side body 71*b*, the suction surface of the intermediate body 72, and the suction surface of the second side body 71*c* are connected in planar form and the conveyed label L is aspirated, and a withdrawal position J in which the center thereof is folded back as the second side body 71*c* approaches the first side body 71*b* such that the part 2 of the label L is folded inward while being aspirated.

The intermediate body 72 comprises a first intermediate body 72*a* that aspirates the first side face 3 of the part 2 of the label L and is rotatably connected to the first side body 71*b* via a hinge 35*a*, a second intermediate body 72*b* that aspirates the second side face 4 of the part 2 of the label L and is rotatably connected to the second side body 71*c* via a hinge 35*b*, and a hinge mechanism 35 that connects the first intermediate body 72*a* and second intermediate body 72*b* rotatably.

As shown in FIG. 32A, the hinge mechanism 35 comprises a projecting plate 38 that projects sideward from the respective side portions of the first intermediate body 72*a* and second intermediate body 72*b*. The projecting plate 38 comprises tip end portions 39 that are bent in an orthogonal direction to the suction surface of the suction plate 71 and overlap each other. Each tip end portion 39 is provided with a penetrating hole (not shown), and a connecting pin 51 is inserted through the holes with a slight clearance. By means of the hinge mechanism 35, the first intermediate body 72*a* and second intermediate body 72*b* are folded inward from the planar position H, thereby reaching the withdrawal position J.

The folding/affixing means 20*i* further comprise a driving unit 37*a* for moving the intermediate body 72. The driving unit 37*a* comprises an air cylinder device 53, and the air cylinder device 53 comprises a double piston 54 attached to the support member 77 of the second side body 71*c* and a cylinder 55 fixed to the base 75.

Further, as shown in FIG. 32A, a coil spring 52*a* acts as biasing means for biasing the first intermediate body 72*a* and second intermediate body 72*b* in a withdrawal direction during movement thereof from the planar position H to the withdrawal position J. The spring is housed in the respective hinges 35*a*, 35*b* of the first intermediate body 72*a* and second intermediate body 72*b*.

The folding/affixing means 20*i* further comprise moving means 27*b* for moving the suction plate 71 between two positions, namely the suction position X for aspirating the label L peeled away by the peeling plate 11 and the affixing position Y for affixing the aspirated label L to the product W.

The moving means 27*b* comprise an air cylinder device 59 comprising a piston 57 to which the base 75 is attached and a cylinder 58 provided on the machine base (not shown) side. A support plate 65 is provided on the tip end of the piston 57. A plurality of coil springs 66 are provided between the support plate 65 and the base 75 for absorbing shock in the affixing position.

Note that the circuit configuration of the label affixing apparatus 900 according to the ninth embodiment is similar to the circuit configuration of the label affixing apparatus 100 according to the first embodiment (see FIG. 59) such that the folding/affixing means 20*i* are controlled by the label affixation control unit 92.

According to the label affixing apparatus of the ninth embodiment, the label L is affixed in the following manner.

Here, a case in which the operation flag is set from the operation unit 88 (FIG. 35) to ON (1) are described using FIGS. 32 through 35.

Figure 35:
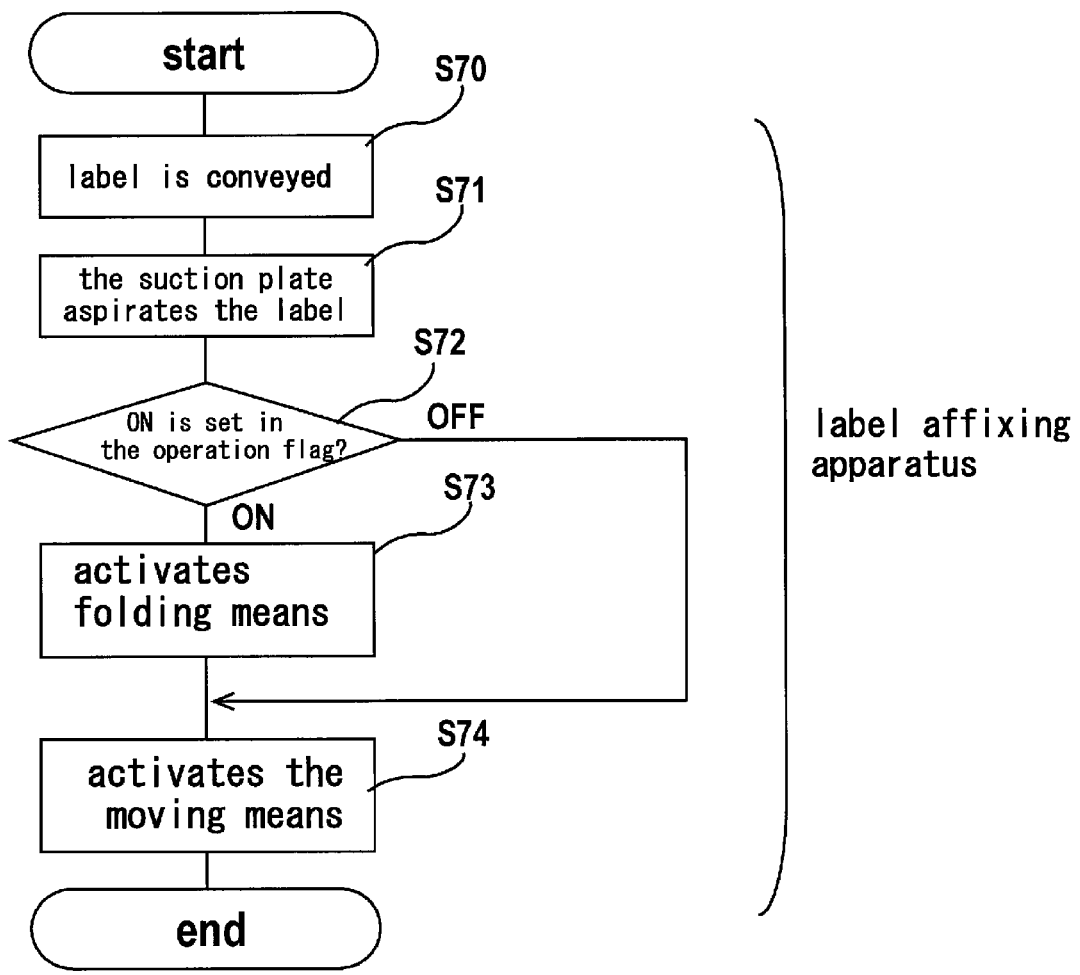
FIG. 35 is a flowchart showing an operation of the label affixing apparatus according to the ninth embodiment of the present invention.

With reference to the flowchart shown in FIG. 35, the label L is conveyed, as shown in FIG. 33A, by the label conveying means 10 (S70). The sensor 12 measures the timing at which the label affixation control unit 92 operates the folding/affixing means 20*i* on the basis of detection of the label L. Next, when the backing sheet D is folded back by the peeling plate 11 such that the label L is peeled away, the suction plate 71 aspirates the label L in the suction position X (S71).

Since ON (1) is set in the operation flag region of the EEPROM 82 (S72 ON), the label affixation control unit 92 activates the air cylinder device 53 (folding means) of the driving unit 37*a* during the operation to affix the label L (S73).

As a result, the second side body 71*c* approaches the first side body 71*b* and the center of the intermediate body 72 is folded back from the planar position H to reach the withdrawal position J, whereby the part 2 of the label L is folded inward while being aspirated.

More specifically, the intermediate body 72 withdraws while the first intermediate body 72*a* aspirates the first side face 3 of the part 2 of the label L and the second intermediate body 72*b* aspirates the second side face 4 of the part 2 of the label L. As a result, the part 2 of the label L is pulled toward the front surface side (the display layer U side) such that the part 2 of the label L is reliably folded into an angular shape.

In this case, the first intermediate body 72*a* and second intermediate body 72*b* are biased in the withdrawal direction by the coil springs 52*a*, and therefore withdrawal is performed smoothly and reliably. Furthermore, the first intermediate body 72*a* and the second intermediate body 72*b* are connected to the first side body 71*b* and second side body 71*c* via the hinges 35*a*, 35*b* and to each other via the hinge mechanism 35. Therefore, the second side body 71*c* and intermediate body 72 can be moved by the single driving unit 37*a*, enabling corresponding structural simplification and an improvement in operating efficiency.

Figure 32:
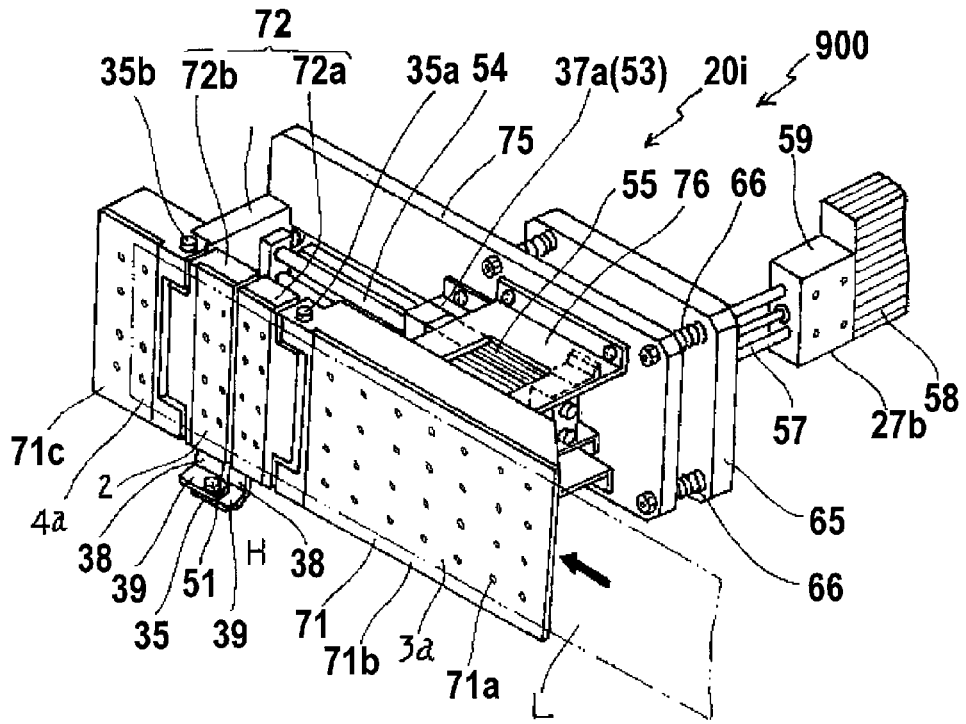
FIGS. 32A and 32B are perspective views showing the main parts of a label affixing apparatus according to a ninth embodiment of the present invention.
Figure 32:
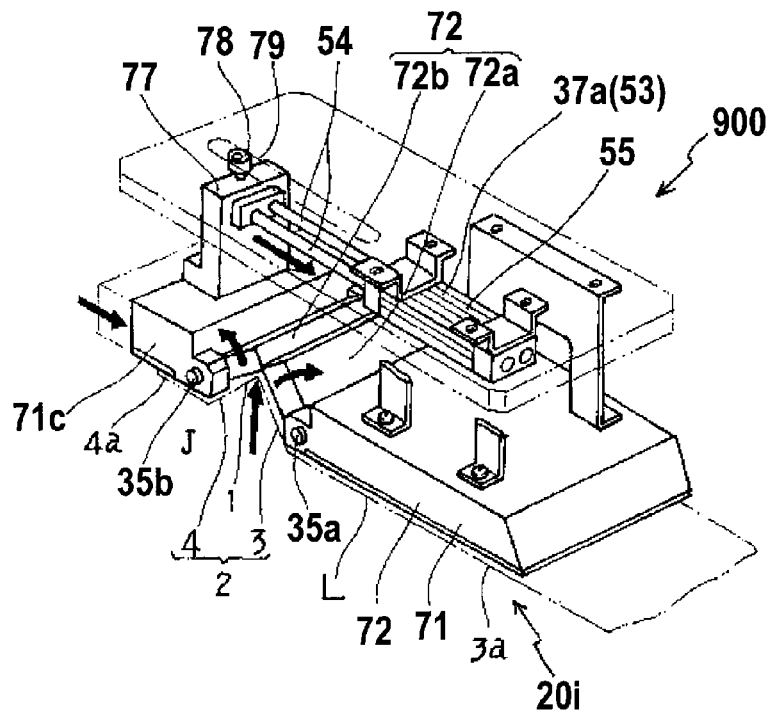
Figure 33:
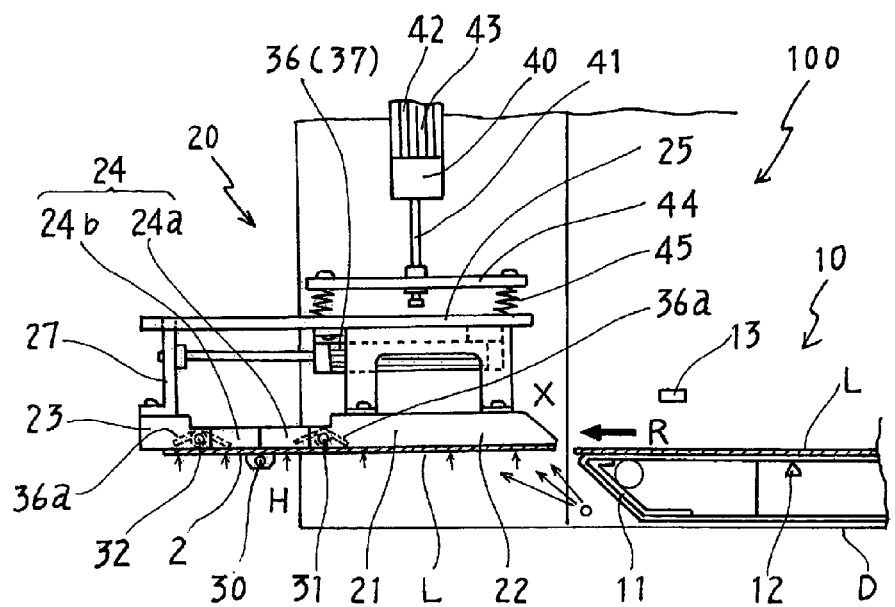
FIGS. 33A through 33C are plan views showing the label affixing apparatus according to the ninth embodiment of the present invention, and its action.
Figure 33:
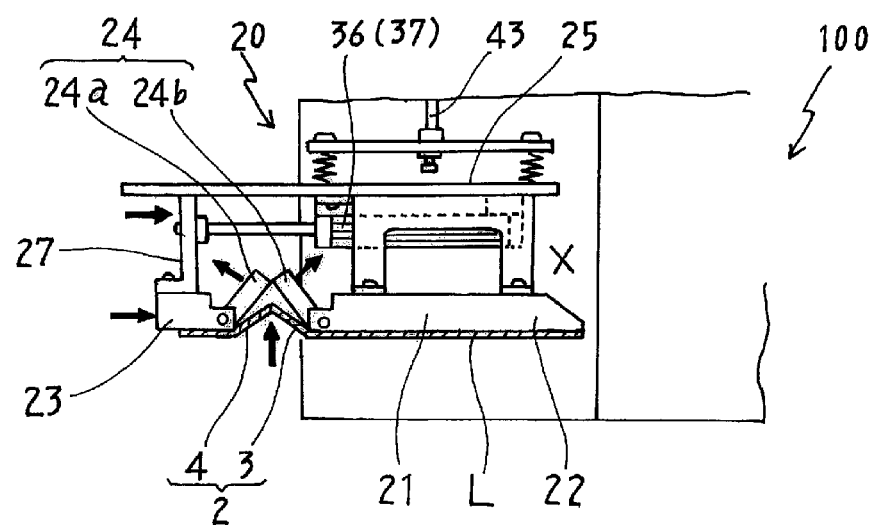
Figure 33:
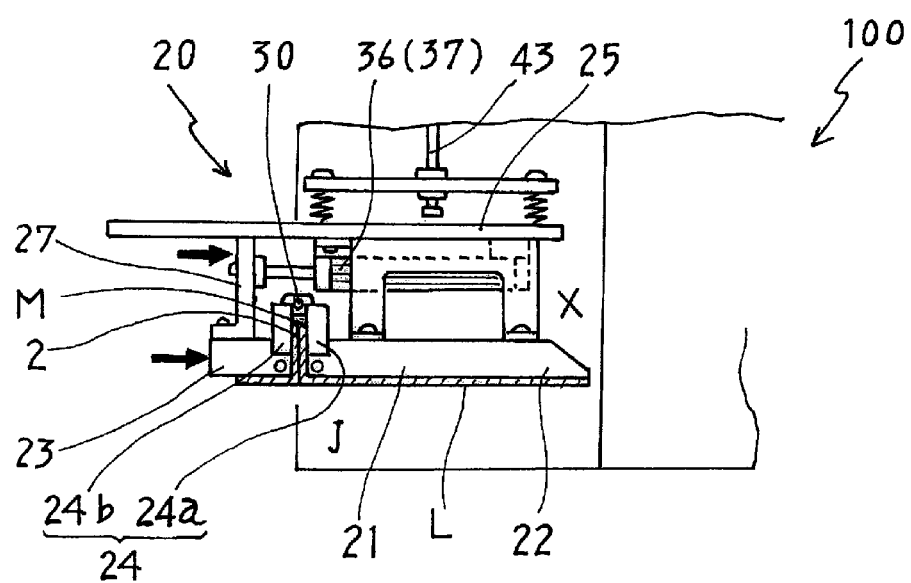

Next, when the intermediate body 72 moves from the planar position H to the withdrawal position J, as shown in FIGS. 32 and 33C, the respective suction surfaces of the first intermediate body 72*a* and second intermediate body 72*b* press the front surfaces (display surface U) of the first side face 3 and the second side face 4 forming the part 2 of the label L such that the rear surfaces of the first side face 3 and second side face 4 are joined. As a result, the folded portion M is formed simply by operating the air cylinder device 53 to cause the intermediate body 72 to withdraw, and therefore the formation time of the folded portion M can be greatly reduced, enabling reduction in the label affixation time and an improvement in affixation efficiency.

As shown in FIG. 38A, in comparison with a case in which the intermediate body 72 is not provided, folding can be performed in an extremely short time. More specifically, in a case where the intermediate body 72 is not provided, the second side body 71*c* is caused to separate from the first side body 71*b* (FIG. 38C) when the suction plate 71 aspirates the label L (FIG. 38B). As a result, the space e into which the part 2 of the label L that projects from the rear surface side to the front surface side can enter is formed between the first side body 71*b* and second side body 71*c*. Then the second side body 71*c* is moved to the first side body 71*b* side (FIG. 38D).

As a result, the bend portion 7 of the first side face 3 and the bend portion 7 of the second side face 4 are pressed in a direction for causing the respective rear surfaces of the first side face 3 and second side face 4 of the label L to approach each other, while the first side body 71b and second side body 71c respectively aspirate and hold the two conveyance direction R end portion sides of the label L, thereby forming the folded portion M (FIG. 38E). When the intermediate body 72 is not provided, the second side body 71c must be separated from the first side body 71b after the label is aspirated, leading to a corresponding increase in the movement time thereof. As a result, the folding/affixing time per cycle increases. In this embodiment, however, the second side body 71c does not have to be separated from the first side body 71b after the label is aspirated. Therefore, the folding time can be reduced correspondingly, enabling improvement in affixation efficiency.

Figure 34:
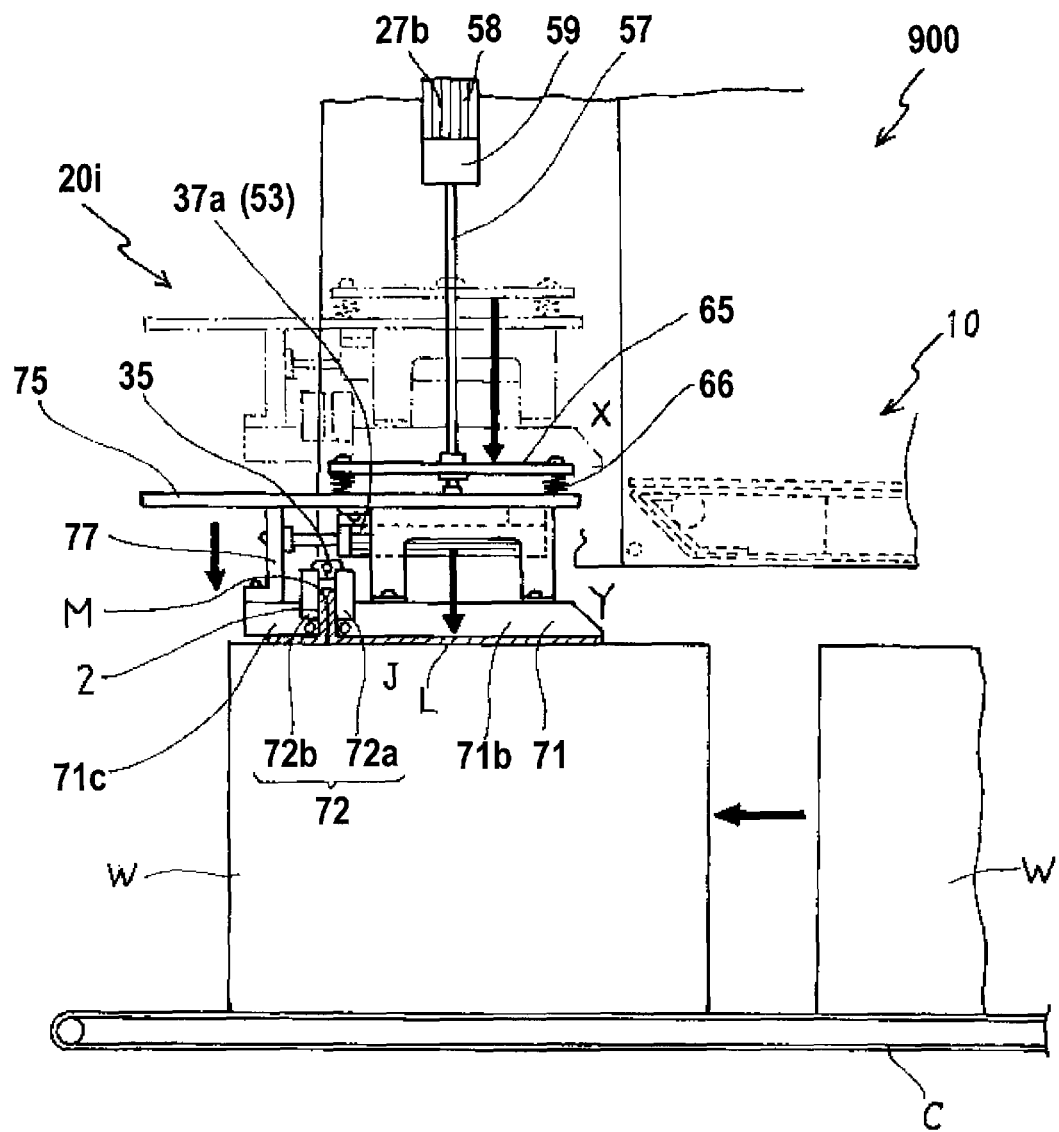
FIG. 34 is a plan view showing the label affixing apparatus according to the ninth embodiment of the present invention, and its action.

Next, as shown in FIG. 34, the label affixation control unit 92 activates the air cylinder device 59 of the moving means 27b to move the suction plate 71 from the suction position X to the affixing position Y (S74). As a result, the label L is affixed to the product W. In this case, the affixing surface 8 of the label L is formed on either side of the folded portion M forming the angularly projecting part 2 of the label L. Therefore, the affixing surface 8 is pressed against the product W by the first side body 71b and second side body 71c such that the label L is reliably affixed to the product W. Once the label is affixed, the suction plate 71 is returned to the suction position X. Further, the air cylinder device 53 of the driving unit 37a is operated to return the second side body 71c to the planar position H from the withdrawal position J.

Next, a case in which a normal label not attached with the RFID tag T is affixed, or in other words a case in which the operation flag is set to OFF (0), is described. As shown in FIG. 33A, the label L is conveyed by the label conveying means 10 (S70), and the sensor 12 measures the timing at which the label affixation control unit 92 operates the folding/affixing means 20i on the basis of detection of the label L. Next, when the backing sheet D is folded back by the peeling plate 11 such that the label L is peeled away, the suction plate 71 aspirates the label L in the suction position X (S71). Since OFF (0) is set in the operation flag region of the EEPROM 82 (S72 OFF), the label affixation control unit 92 activates the air cylinder device 59 of the moving means 27b without operating the air cylinder device 53, whereby the suction plate 71 is moved from the suction position X to the affixing position Y (S74). As a result, the aspirated normal label is affixed to the product W in planar form.

Figure 36:
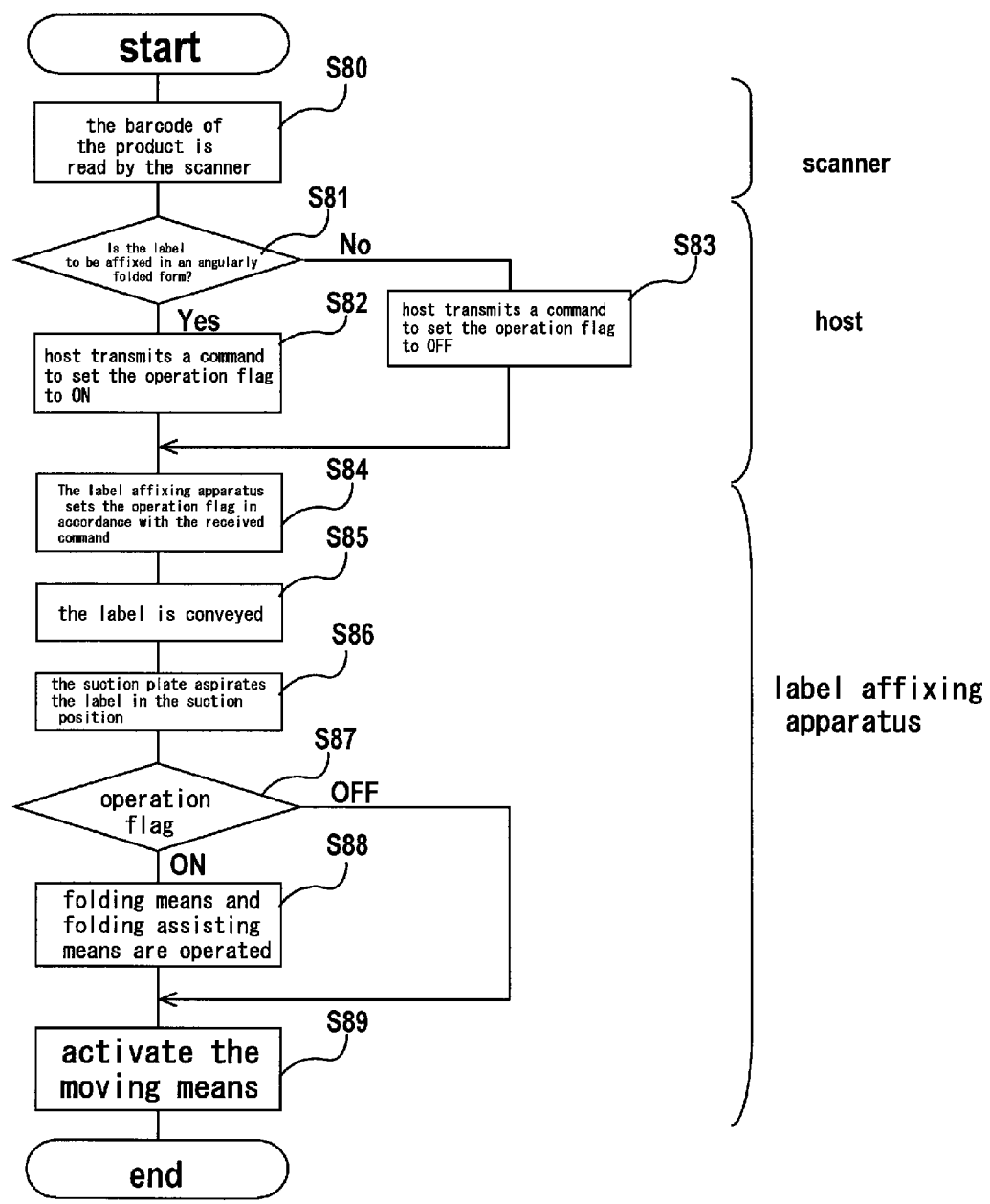
FIG. 36 is a flowchart showing another operation of the label affixing apparatus according to the ninth embodiment of the present invention.

Next, a case in which the operation flag is set in accordance with a command received by the external interface 85 is described using the flowchart shown in FIG. 36.

As shown in FIG. 36, first, the barcode of the product W is read by the scanner 94 (S81), whereupon the host 84 determines whether the content of the barcode read by the scanner 94 indicates that the label L is to be affixed in an angularly folded form (operation flag ON) or a planar form (operation flag OFF) (S81), and transmits a corresponding command (S82, S83). The label affixing apparatus 900 sets the operation flag in the operation flag region of the EEPROM 82 to ON (1) or OFF (0) in accordance with the received command (S84).

Then, when the label L is conveyed by the label conveying means 10 (S85) and the backing sheet D is folded back by the peeling plate 11 such that the label L is peeled away, the suction plate 71 aspirates the label L in the suction position X (S86). Next, when the operation flag in the operation flag region of the EEPROM 82 is set at ON (1) (S87 ON), the label affixation control unit 92 operates the air cylinder device 53 (folding means) (S88). The label affixation control unit 92 then activates the moving means 27b (S89) such that the label L is affixed to the product W in an angularly folded form.

When OFF (0) is set in the operation flag region of the EEPROM 82 (S87 OFF), on the other hand, the label affixation control unit 92 activates the air cylinder device 59 of the moving means 27b without activating the air cylinder device 53, whereby the suction plate 71 is moved from the suction position X to the affixing position Y (S89). As a result, the aspirated normal label is affixed to the product W in planar form.

Note that a construction may be employed in which an external machine is used as a scanner, the label affixing apparatus 900 receives barcode data read by the scanner via the external interface 85, and the label affixation control unit 92 operates the air cylinder device 53 in accordance with the content of the barcode read by the scanner.

Figure 37:
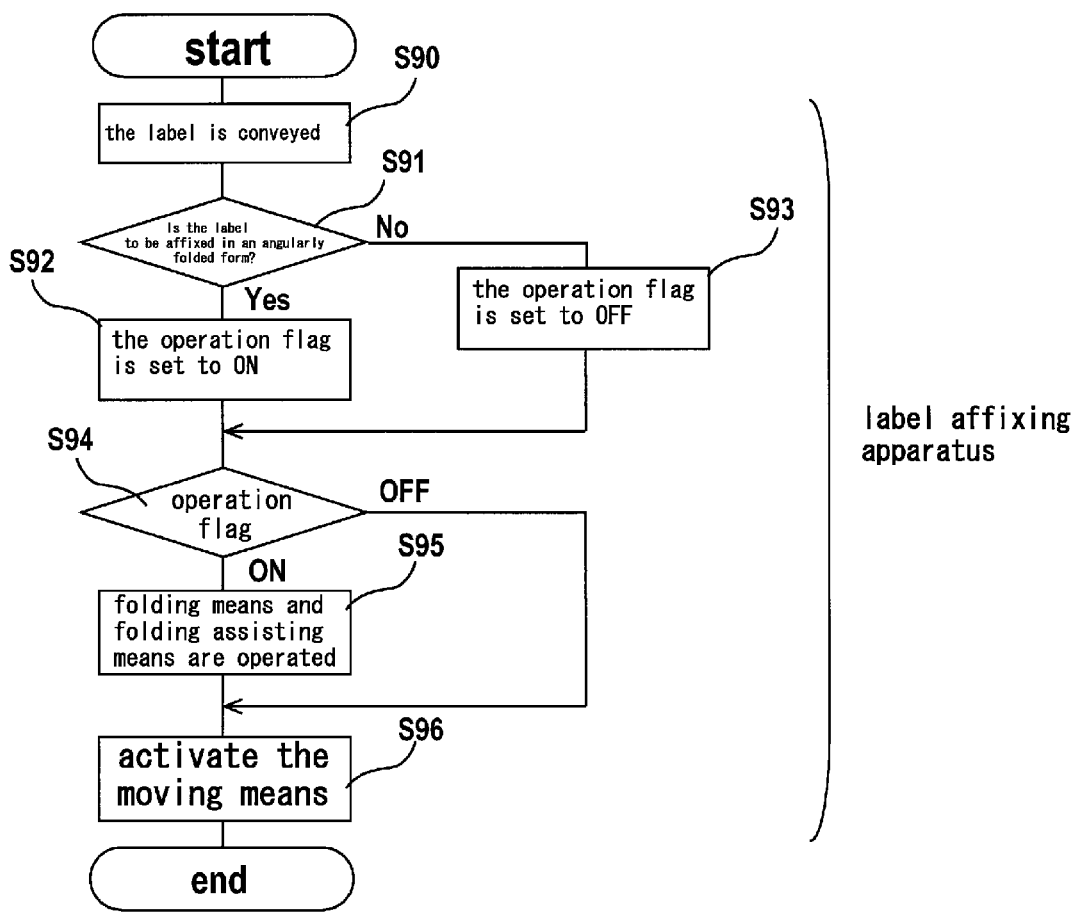
FIG. 37 is a flowchart showing a further operation of the label affixing apparatus according to the ninth embodiment of the present invention.

Next, a case in which setting of the operation flag is performed by having the reader/writer 13 detect either a normal label to which the RFID tag T is not attached or the label L to which the RFID tag T is attached is described using the flowchart shown in FIG. 37.

As shown in FIG. 37, the label is conveyed (S90), and the reader/writer 13 determines whether or not folding into an angular form is required (S91). When folding is required (S91 YES), the operation flag is set to ON (S92), and when folding is not required (S91 NO), the operation flag is set to OFF (S93). When the operation flag is at ON (1) (S94 ON), the air cylinder device 53 (folding means) is activated (S95). Next, the moving means 27b are activated (S96) such that the label L is affixed to the product W in an angularly folded form.

When the operation flag is at OFF (0) (S94 OFF), on the other hand, the moving means 27b are activated without operating the air cylinder device 53 (S96), and as a result, the label L is affixed to the product W in planar form.

According to the setting performed by the reader/writer 13, the operation of the air cylinder device 53 is switched ON and OFF automatically simply by loading the two types of labels in accordance with the application. As a result, the operating efficiency is favorable.

Furthermore, when the operation flag is set in accordance with the type of the label L to which the RFID tag T is attached, the form of the label L attached with the RFID tag T (whether the label L is to be affixed in planar form or after being folded angularly) can be modified according to the type of label to be affixed or the information stored on the IC chip in the RFID tag, and thus the range of usage applications can be widened.

Figure 39:
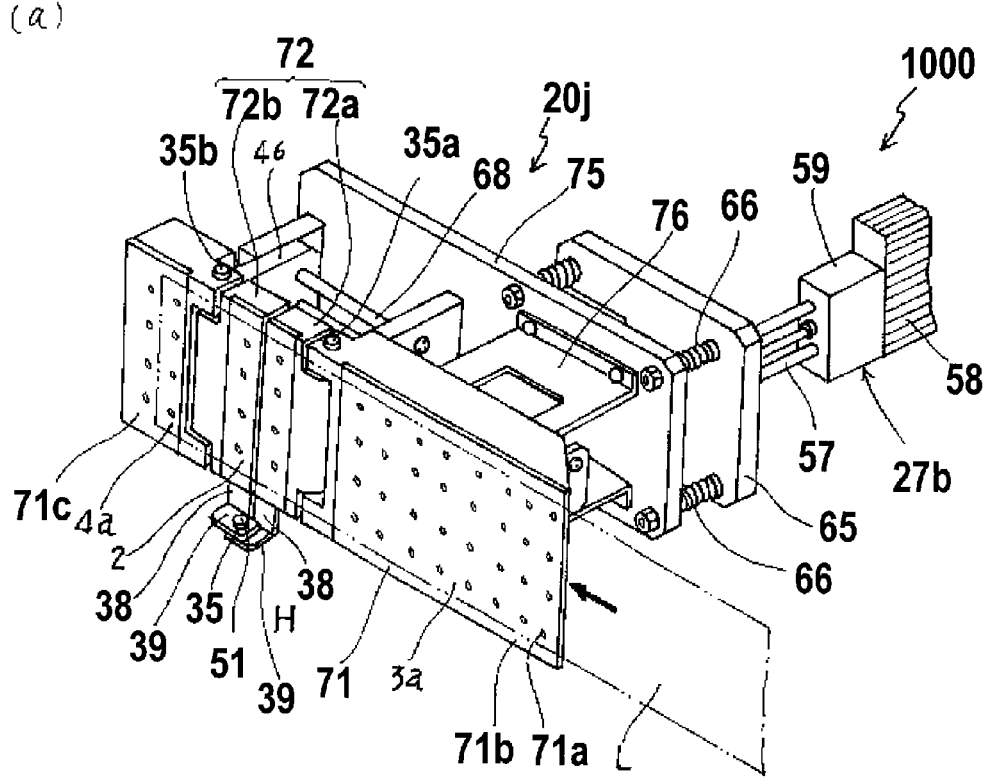
FIGS. 39A and 39B are perspective views showing the main parts of a label affixing apparatus according to a tenth embodiment of the present invention.
Figure 39:
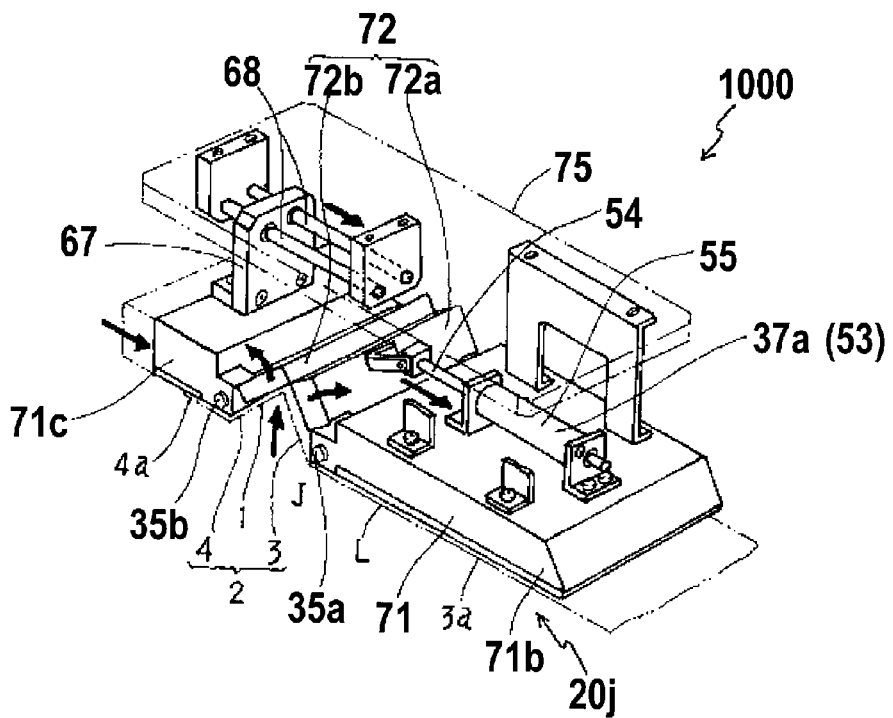
Figure 40:
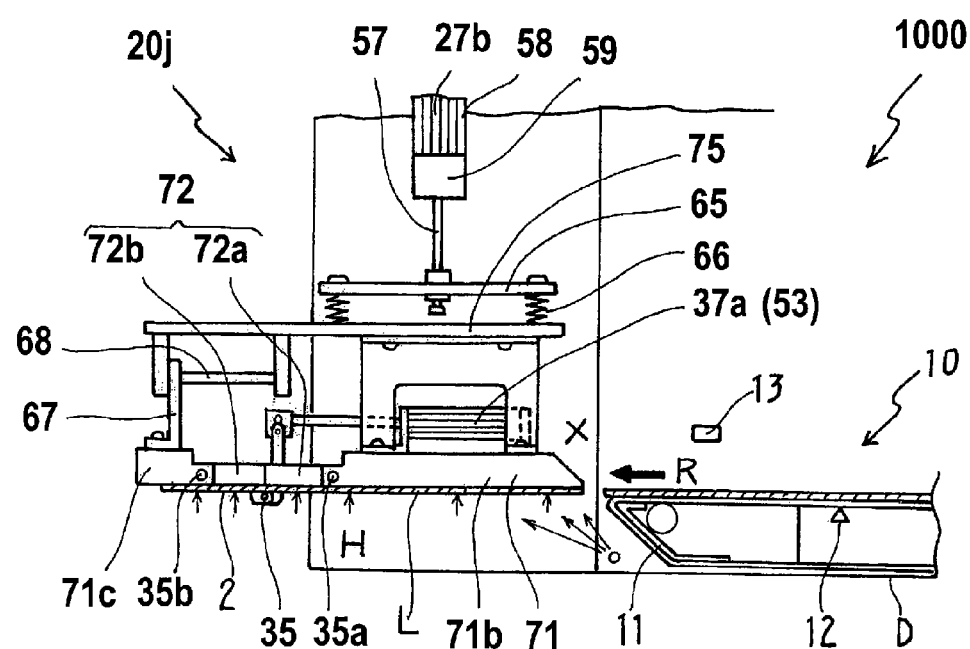
FIGS. 40A through 40C are plan views showing the label affixing apparatus according to the tenth embodiment of the present invention, and its action.
Figure 40:
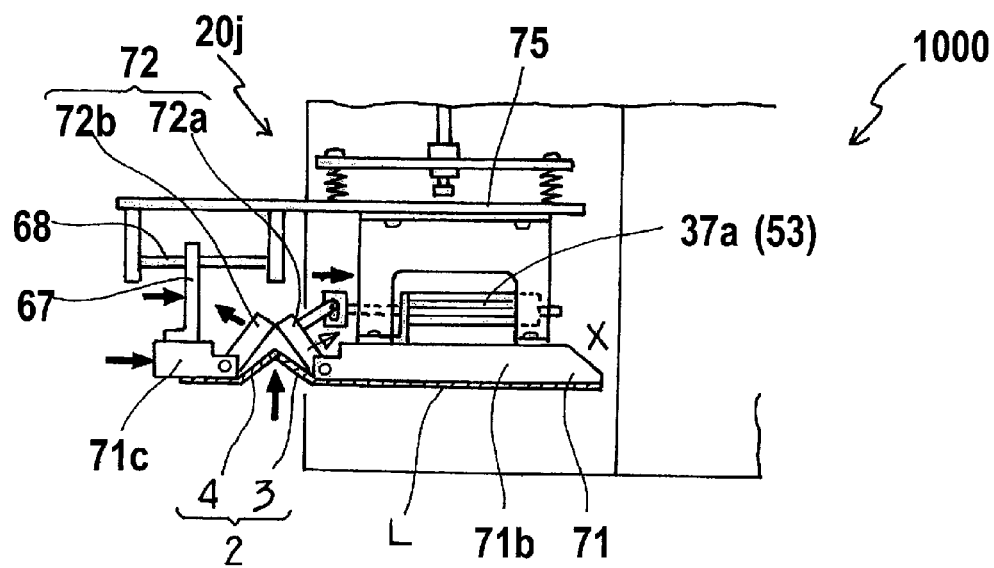
Figure 40:
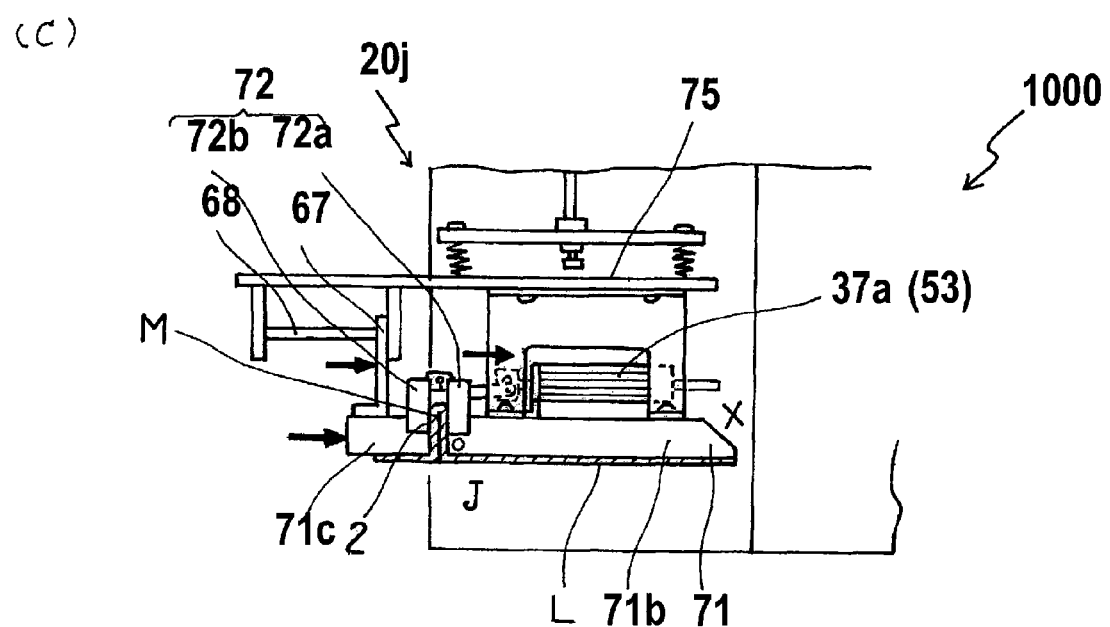
Figure 41:
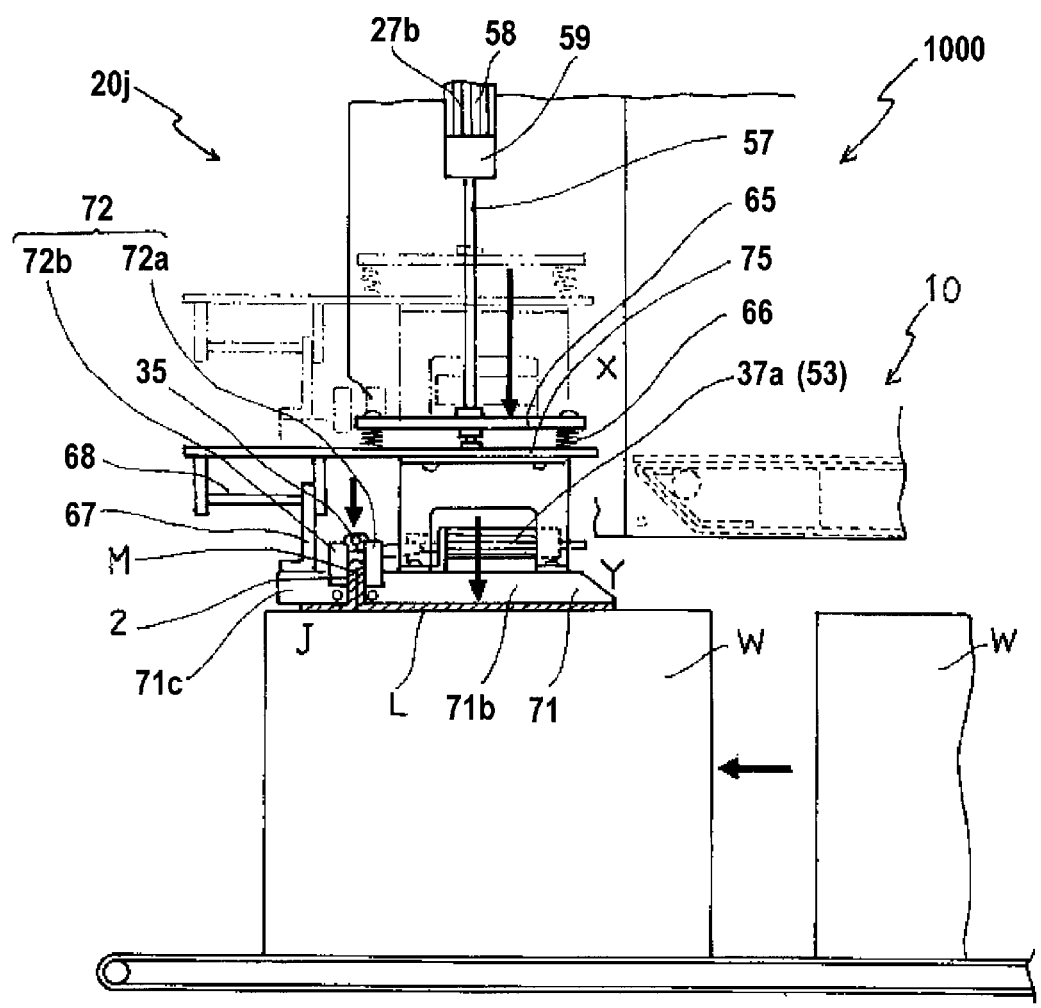
FIG. 41 is a plan view showing the label affixing apparatus according to the tenth embodiment of the present invention, and its action.

FIGS. 39 through 41 show a label affixing apparatus according to a tenth embodiment of the present invention.

A label affixing apparatus 1000 according to the tenth embodiment is constructed substantially identically to the ninth embodiment described above, but differs in the manner of supporting the second side body 71c of the folding/affixing means 20 and the attachment construction of the air cylinder device 53 serving as the driving unit 37a.

As shown in FIGS. 39A and 39B, the second side body 71c of folding/affixing means 20j is provided movably on the base 75 via a support member 67. Two guide rails 68 having longitudinal axes parallel to the movement direction of the second side body 71c are provided on the base 75, and the support member 67 is provided slidably on the guide rails 68.

In the air cylinder device 53 of the driving unit 37a, the piston 54 is attached to the rear surface side of the first intermediate body 72a, and the cylinder 55 is fixed to the rear surface of the first side body 71b.

Hence, according to the label affixing apparatus 1000 of this embodiment, similarly to the operation described above, the label L is conveyed by the label conveying means 10, as shown in FIG. 40A, whereupon the suction plate 71 aspirates the label L in the suction position X. Next, as shown in FIG. 40B, the air cylinder device 53 (folding means) of the driving unit 37a is activated such that the center of the intermediate body 72 is folded back from the planar position H to reach the withdrawal position J, and the second side body 71c approaches the first side body 71b such that the part 2 of the label L is folded inward while being aspirated.

More specifically, the intermediate body 72 withdraws while the first intermediate body 72a aspirates the first side face 3 of the part 2 of the label L and the second intermediate body 72b aspirates the second side face 4 of the part 2 of the label L. As a result, the part 2 of the label L is pulled toward the front surface side (the display layer U side) such that the part 2 of the label L is reliably folded into an angular shape. In this case, the first intermediate body 72a and the second intermediate body 72b are connected to the first side body 71b and second side body 71c via the hinges 35a, 35b and to each other via the hinge mechanism 35, and therefore the second side body 71c and intermediate body 72 can be moved by the single driving unit 37a, enabling corresponding structural simplification and an improvement in operating efficiency.

Next, when the first intermediate body 72a and the second intermediate body 72b move from the planar position H to the withdrawal position J, as shown in FIG. 40C, the respective suction surfaces of the first intermediate body 72a and second intermediate body 72b press the front surfaces (display surface U) of the first side face 3 and second side face 4 forming the part 2 of the label L such that the rear surfaces of the first side face 3 and second side face 4 are joined. As a result, the folded portion M is formed. Next, as shown in FIG. 41, the air cylinder device 59 of the moving means 27b is activated to move the suction plate 71 from the suction position X to the affixing position Y. As a result, the aspirated label L is affixed to the product W. Once the label is affixed, the suction plate 71 is returned to the suction position X. Further, the air cylinder device 53 of the driving unit 37a is operated to return the second side body 71c to the planar position H from the withdrawal position J.

Note that the label affixing apparatus 1000 according to the embodiment described above is capable of affixing a label such as that shown in FIG. 65, in which the tag attachment site 1 attached with the RFID tag T is formed on the end portion of the label L. In this case, the part 2 of the label L including the tag attachment site 1 attached with the RFID tag T of the label L, is halted in the position of the intermediate body 72. In so doing, a label L having the tag attachment site 1 formed on the end portion can be affixed.

FIGS. 42 through 47 show a label affixing apparatus according to an eleventh embodiment of the present invention. A label affixing apparatus 1100 according to the eleventh embodiment differs from the above embodiments in that the folding/affixing means 20 are capable of causing the part 2 of the label L to protrude by folding the part 2 from the rear surface side to the front surface side into an angular shape reliably without comprising the folding assisting means 30, similarly to the label affixing apparatuses 900, 1000 according to the ninth and tenth embodiments. As shown in FIGS. 61, 63 and 64, in the subject label L of the label affixing apparatus 1100 according to the eleventh embodiment, the part 2 of the label L including the tag attachment site 1 is formed in an intermediate portion of the label L.

The label affixing apparatus 1100 according to the eleventh embodiment comprises the label conveying means 10 and folding/affixing means 20k, and comprises a suction plate 101 as the folding/affixing means 20k. The suction plate 101 is provided with a plurality of small holes 101a that suck up air in order to aspirate the front surface of the label L.

The suction plate 101 comprises a pair of divided bodies 101b, 101c, which are divided along an orthogonal line to the conveyance direction R of the label L and serve to aspirate the label L. The first divided body 101b is supported on a base 103 via a support member 102.

Figure 42:
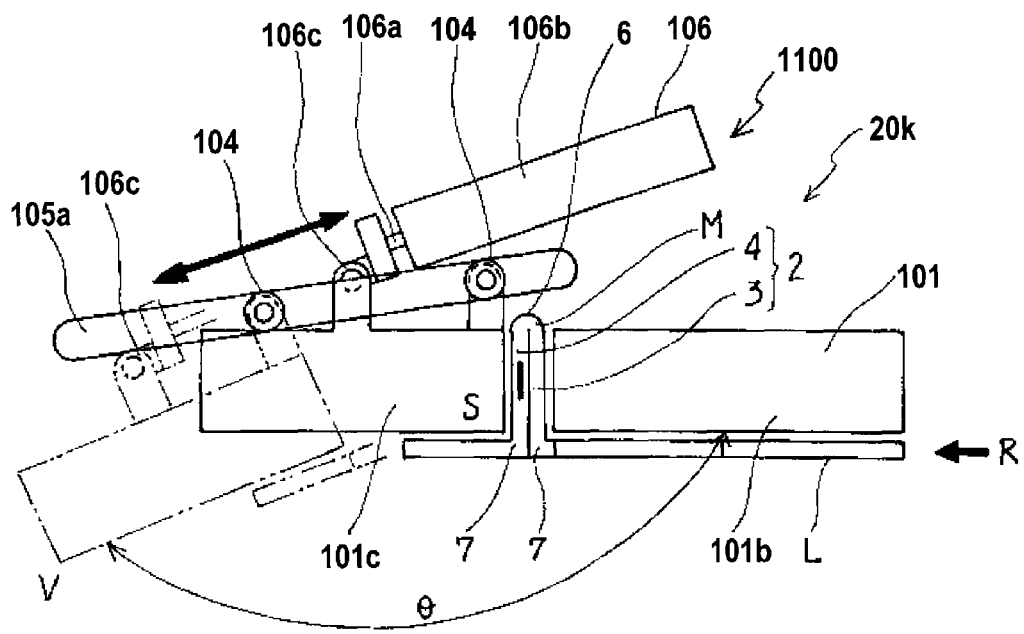
FIG. 42 is a perspective view showing the main parts of a label affixing apparatus according to an eleventh embodiment of the present invention.

As shown in FIG. 42, the second divided body 101c is supported so as to be capable of moving relative to the first divided body 101b between two positions, namely a joining position S in which respective suction surfaces of the divided bodies 101b, 101c meet in planar form, and a removed position V in which an angle θ formed by the respective suction surfaces of the divided bodies 101b, 101c is less than 180 degrees. During movement from the removed position V to the joining position S, the part 2 of the label L is folded by the opposing end surfaces of the divided bodies 101b, 101c. The opposing end surfaces of the divided bodies 101b, 101c then come into contact with respective front surfaces of the first side face 3 and second side face 4, which are formed about the apex portion 6 and respectively include the bend portion 7, and press these surfaces to form the folded portion M.

More specifically, the second divided body 101c comprises a pair of rollers 104 that project outward in an orthogonal direction to the conveyance direction R of the label L, and the rollers 104 are supported on rail bodies 105 that stand upright on a base 103. A guide hole 105a capable of guiding the roller 104 rollably is formed in each rail body 105. The guide hole 105a is formed at an incline relative to the suction surface of the first divided body 101b.

In the removed position V, the space e into which the part 2 of the label L that projects from the rear surface side to the front surface side can enter is formed between the first divided body 101b and second divided body 101c, and the first divided body 101b and second divided body 101c respectively aspirate and hold the two conveyance direction R end portion sides of the label L.

Further, the second divided body 101c is driven by an air cylinder device 106 (folding means) for positioning the second divided body 101c in the joining position S during retreat and positioning the second divided body 101c in the removed position V during advancement. The air cylinder device 106 comprises a piston 106a and a cylinder 106b. A tip end of the piston 106a is connected to the rear surface side of the second divided body 101c via a link mechanism 106c, and the cylinder 106b is fixed to the base 103 via a fixing member 106d. The cylinder 106b is attached to the base 103 at an incline such that the longitudinal axis of the piston 106a follows the incline of the guide hole 105a in the rail body 105.

The folding/affixing means 20k further comprise moving means 27c for moving the suction plate 101 between two positions, namely the suction position X for aspirating the label L peeled away by the peeling plate 11 and the affixing position Y for affixing the aspirated label L to the product W.

Figure 43:
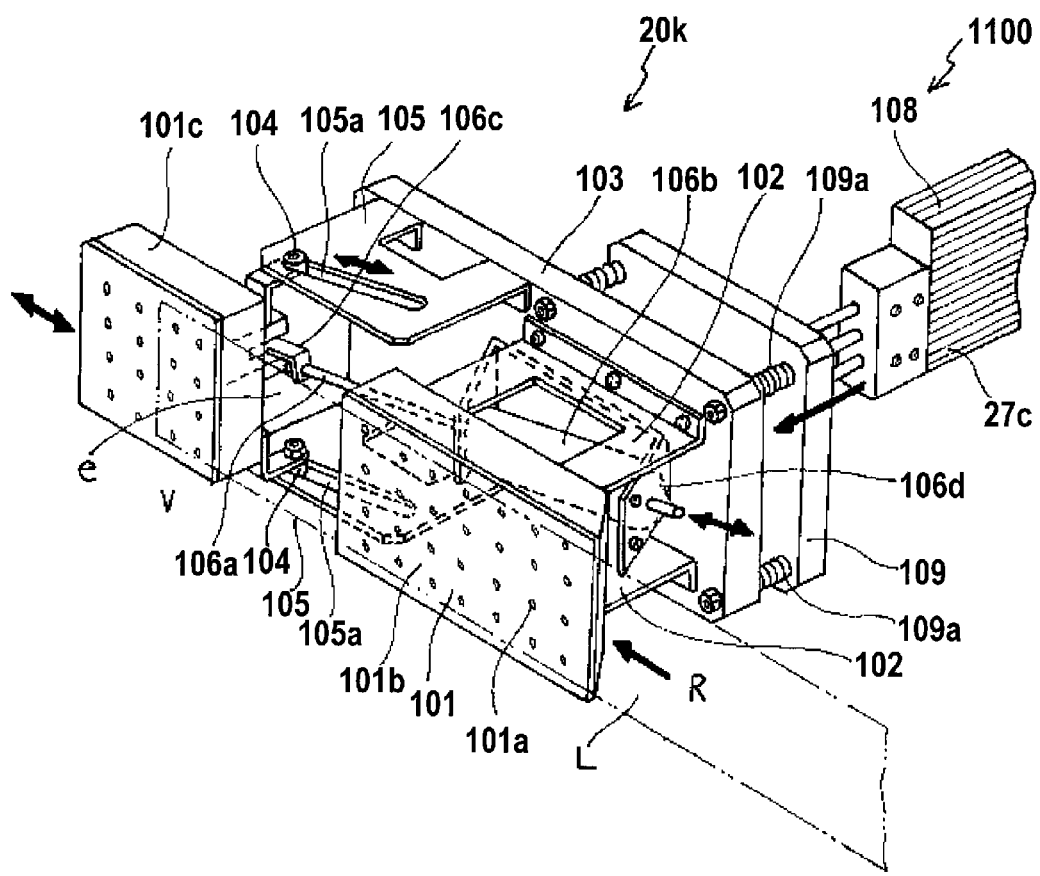
FIG. 43 is a perspective view showing the main parts of the label affixing apparatus according to the eleventh embodiment of the present invention.
Figure 44:
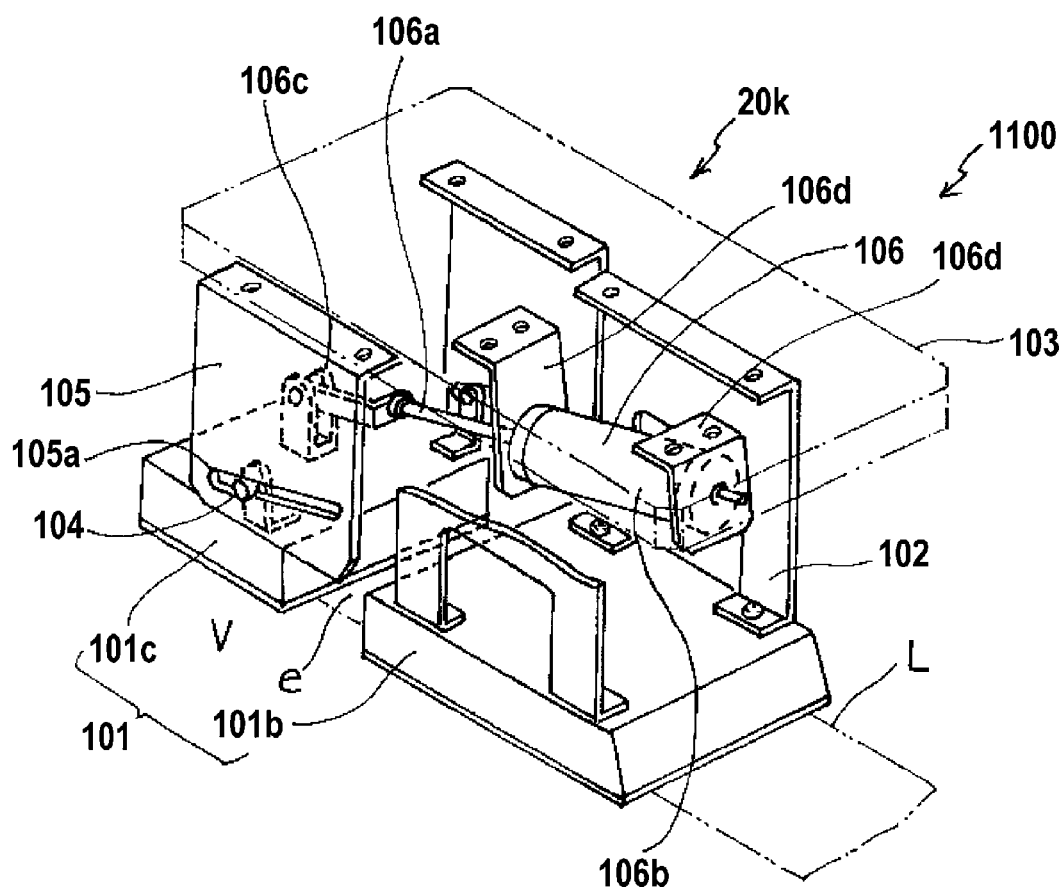
FIG. 44 is a perspective view showing the main parts of the label affixing apparatus according to the eleventh embodiment of the present invention.
Figure 45:
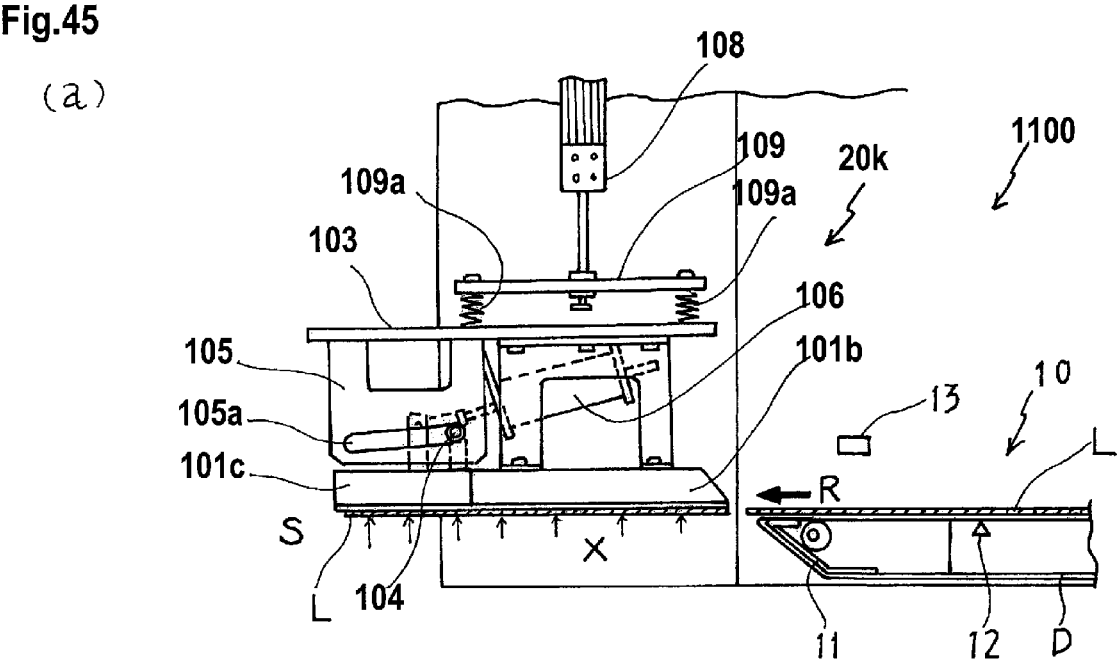
FIGS. 45A through 45D are plan views showing the label affixing apparatus according to the eleventh embodiment of the present invention, and its action.
Figure 45:
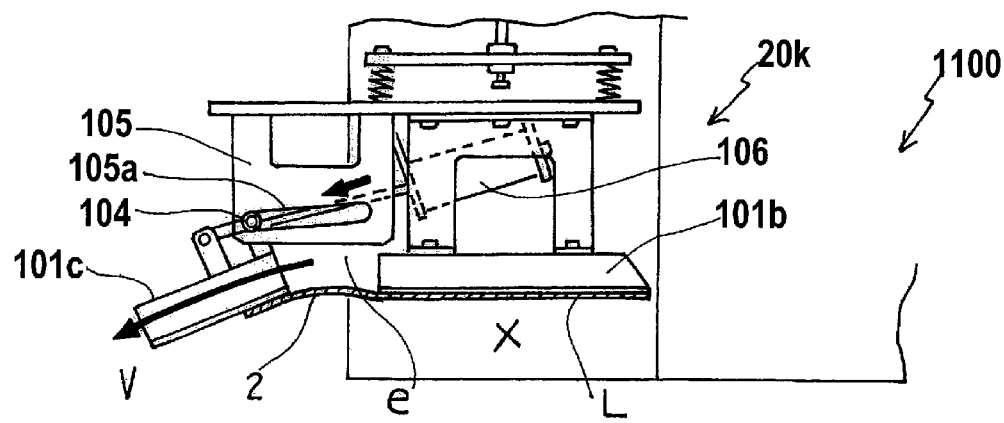
Figure 45:
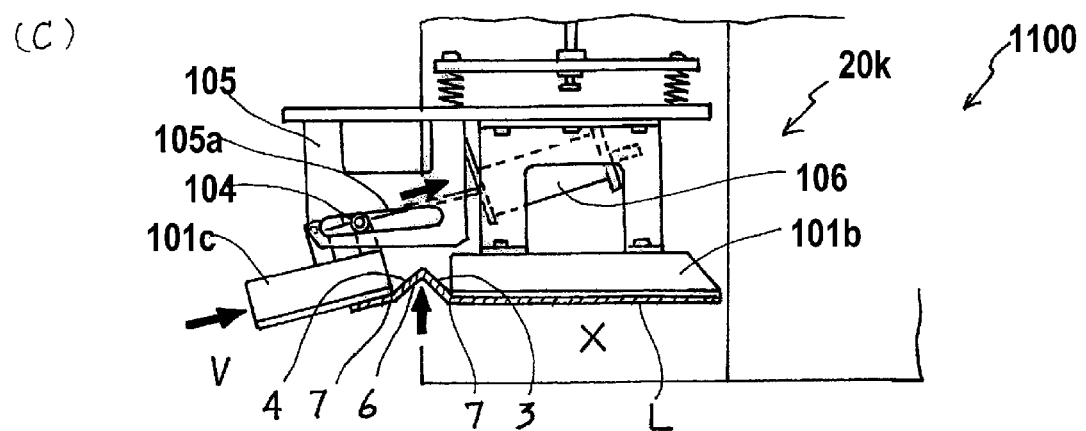
Figure 45:
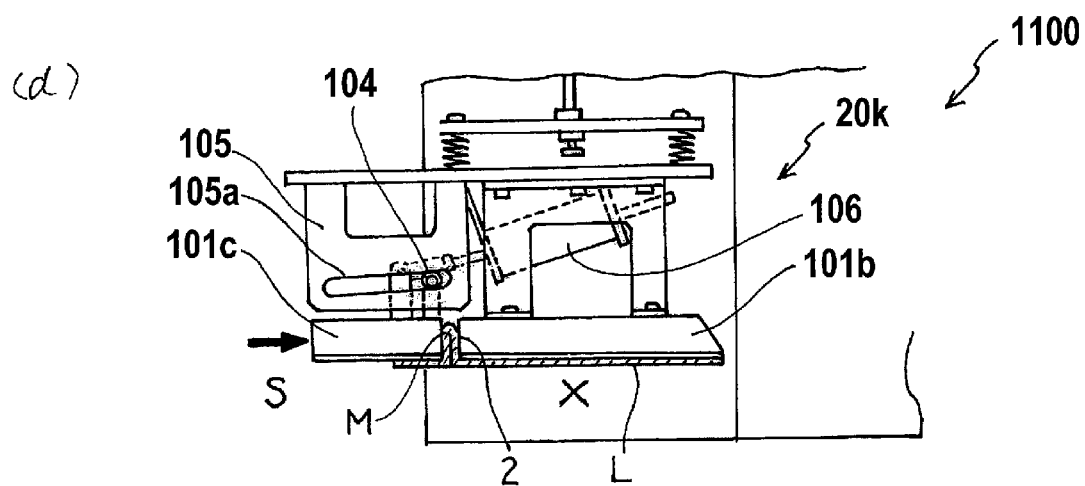

As shown in FIG. 43, the moving means 107 comprise an air cylinder device 108 comprises a piston to which the base 103 is attached and a cylinder provided on the machine base (not shown) side. A support plate 109 is provided on the tip end of the piston. A plurality of coil springs 109a is provided between the support plate and the base 103 for absorbing shock in the affixing position.

Note that the circuit configuration of the label affixing apparatus 1100 according to the eleventh embodiment is similar to the circuit configuration of the label affixing apparatus 100 according to the first embodiment (see FIG. 59) such that the folding/affixing means 20k are controlled by the label affixation control unit 92.

According to the label affixing apparatus 1100 of the eleventh embodiment, the label L is affixed in the following manner. Here, a case in which the operation flag is set from the operation unit 88 (FIG. 35) to ON (1) is described using FIG. 35 and FIGS. 42 through 46.

With reference to the flowchart shown in FIG. 35, the label L is conveyed as shown in FIG. 45A by the label conveying means 10 (S70), and the sensor 12 measures the timing at which the label affixation control unit 92 operates the folding/affixing means 20k on the basis of detection of the label L. Next, when the backing sheet D is folded back by the peeling plate 11 such that the label L is peeled away, the suction plate 101 aspirates the label L in the suction position X (S71).

Since ON (1) is set in the operation flag region of the EEPROM 82 (S72 ON), the label affixation control unit 92 operates the air cylinder device 106 (folding means) during the operation to affix the label L (S73).

More specifically, as shown in FIG. 45B, the label affixation control unit 92 activates the air cylinder device 106 to position the second divided body 101c in the removed position V. As a result, the space e into which the part 2 of the label L that projects from the rear surface side (the adhesive layer B side) to the front surface side (the display layer U side) can enter, is formed between the first divided body 101b and second divided body 101c.

Next, as shown in FIGS. 42 through 45C, the label affixation control unit 92 activates the air cylinder device 106 to move the second divided body 101c from the removed position V to the joining position S. As a result, the bend portion 7 of the first side face 3 and the bend portion 7 of the second side face 4 are pressed in a direction for causing the respective rear surfaces of the first side face 3 and second side face 4 to approach each other, while the first divided body 101b and second divided body 101c respectively aspirate and hold the two conveyance direction R end portion sides of the label L, thereby forming the folded portion M. In this case, the angle θ formed by the respective suction surfaces of the divided bodies 101b, 101c is less than 180 degrees while the second divided body 101c moves from the removed position V to the joining position S. In other words, the suction surface of the second divided body 101c is inclined relative to the suction surface of the first divided body 101b, and therefore the bend portions 7 of the first side face 3 and second side face 4 are pressed such that the apex portion 6 of the part 2 of the label L projects toward the space e side. Thus, the folded portion M is reliably formed.

Figure 47:
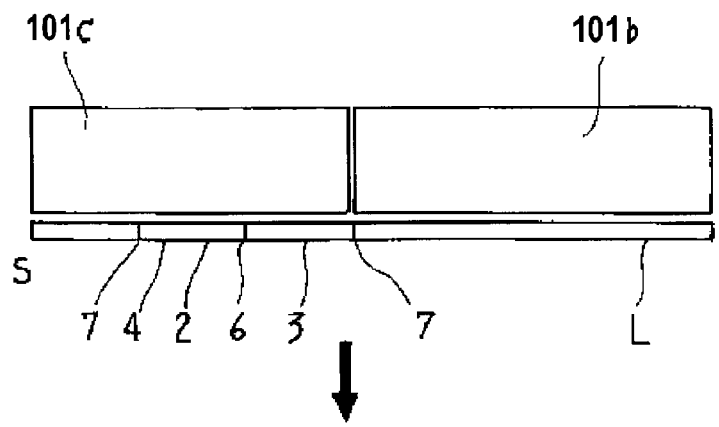
FIGS. 47A through 47C are views showing an action of another label affixing apparatus in order to illustrate the advantages of the label affixing apparatus according to the eleventh embodiment of the present invention.
Figure 47:
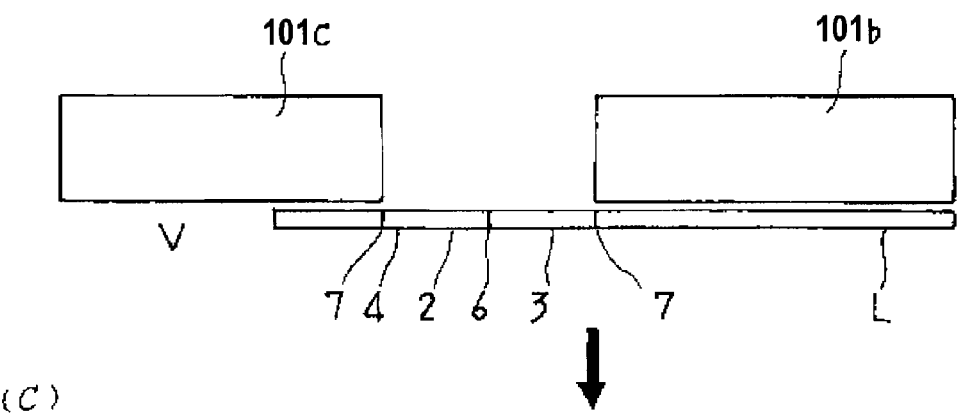
Figure 47:
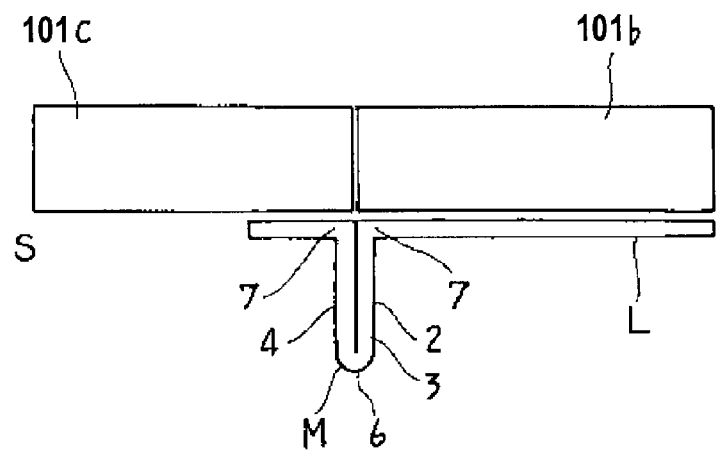

As shown in FIG. 47, when the suction surface of the second divided body 101c, having reached the joining position S from the removed position V, and the suction surface of the first divided body 101b form a planar surface (angle Θ=180 degrees), it is impossible to determine whether the apex portion 6 will project to the space e side or to the outside of the suction surface. In other words, the apex portion 6 serves as a so-called change point, and as shown in FIG. 47C, the apex portion 6 may project to the outside of the suction surface. Therefore, folding assisting means 30 (not shown) comprising an air blowing nozzle for pushing the part 2 of the label L toward the space e side, for example, must be provided. In this embodiment, however, the part 2 of the label L bends reliably to the space e side, and therefore the folding assisting means 30 are not required. Hence, corresponding structural simplification can be achieved, and the part 2 of the label L can be caused to project from the rear surface side to the front surface side in an angularly folded form reliably.

As shown in FIGS. 42 through 45D, when the second divided body 101c moves from the removed position V to the joining position S, the opposing end surfaces of the first divided body 101b and second divided body 101c respectively come into contact with the front surfaces (display layer U) of the first side face 3 and second side face 4 forming the part 2 of the label L and press these front surfaces such that the rear surfaces of the first side face 3 and second side face 4 are joined. As a result, the folded portion M is formed.

Figure 46:
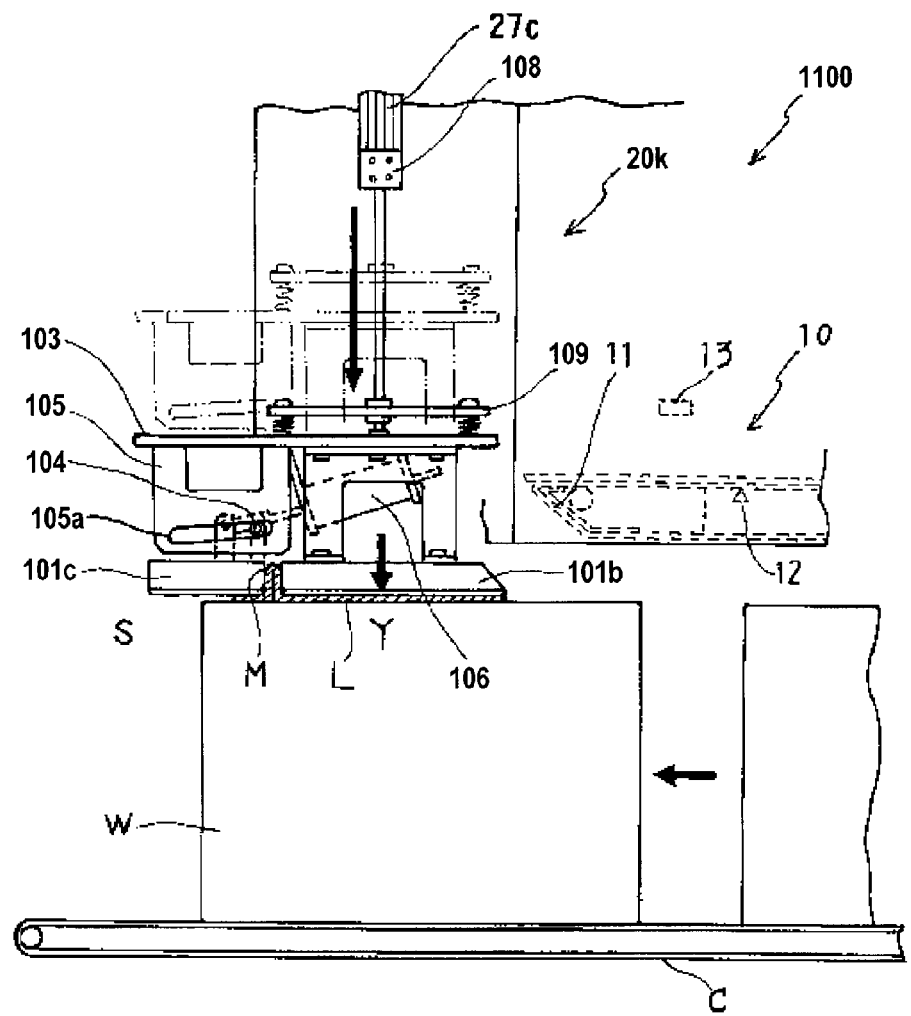
FIG. 46 is a plan view showing the label affixing apparatus according to the eleventh embodiment of the present invention, and its action.

Next, as shown in FIG. 46, the label affixation control unit 92 activates the air cylinder device 108 of the moving means 27c to move the suction plate 101 from the suction position X to the affixing position Y (S74). As a result, the aspirated label L is affixed to the product W. In this case, the affixing surface 8 of the label L is formed on either side of the folded portion M forming the angularly projecting part 2 of the label L. Therefore, the affixing surface 8 is pressed against the product W by the first divided body 101b and second divided body 101c such that the label L is reliably affixed to the product W. Once the label is affixed, the suction plate 101 is returned to the suction position X.

Next, a case in which a normal label not attached with the RFID tag T is affixed, or in other words a case in which the operation flag is set to OFF (0), is described. As shown in FIG. 45A, the label L is conveyed by the label conveying means 10 (S70), and the sensor 12 measures the timing at which the label affixation control unit 92 operates the folding/affixing means 20k on the basis of detection of the label L. Next, when the backing sheet D is folded back by the peeling plate 11 such that the label L is peeled away, the suction plate 101 aspirates the label L in the suction position X (S71).

Since OFF (0) is set in the operation flag region of the EEPROM 82 (S72 OFF), the label affixation control unit 92 activates the air cylinder device 108 of the moving means 27c without operating the air cylinder device 106 (folding means), whereby the suction plate 101 is moved from the suction position X to the affixing position Y (S74). As a result, the normal aspirated label is affixed to the product W in planar form.

Next, a case in which the operation flag is set in accordance with a command received by the external interface 85, similarly to the ninth embodiment, will be described using the flowchart shown in FIG. 36.

As shown in FIG. 36, first, the barcode of the product W is read by the scanner 94 (S81), whereupon the host 84 determines whether the content of the barcode read by the scanner 94 indicates that the label L is to be affixed in an angularly folded form (operation flag ON) or a planar form (operation flag OFF) (S81), and transmits a corresponding command (S82, S83). The label affixing apparatus 1100 sets the operation flag in the operation flag region of the EEPROM 82 to ON (1) or OFF (0) in accordance with the received command (S84).

Then, when the label L is conveyed by the label conveying means 10 (S85) and the backing sheet D is folded back by the peeling plate 11 such that the label L is peeled away, the suction plate 101 aspirates the label L in the suction position X (S86). Next, when the operation flag in the operation flag region of the EEPROM 82 is set at ON (1) (S87 ON), the label affixation control unit 92 operates the air cylinder device 106 (folding means) (S88). The label affixation control unit 92 then activates the moving means 27c (S89) such that the label L is affixed to the product W in an angularly folded form.

When OFF (0) is set in the operation flag region of the EEPROM 82 (S87 OFF), on the other hand, the label affixation control unit 92 activates the air cylinder device 108 of the moving means 27c without operating the air cylinder device 106 (folding means), whereby the suction plate 101 is moved from the suction position X to the affixing position Y (S89). As a result, the aspirated normal label is affixed to the product W in planar form.

Note that a construction may be employed in which an external machine is used as a scanner, the label affixing apparatus 1100 receives barcode data read by the scanner via the external interface 85, and the label affixation control unit 92 operates the air cylinder device 106 (folding means) in accordance with the content of the read barcode.

Next, a case in which setting of the operation flag is performed by having the reader/writer 13 detect either a normal label to which the RFID tag T is not attached or the label L to which the RFID tag T is attached, similarly to the ninth embodiment, will be described using the flowchart shown in FIG. 37.

As shown in FIG. 37, the label is conveyed (S90), and the reader/writer 13 determines whether or not folding into an angular form is required (S91). When folding is required (S91 YES), the operation flag is set to ON (S92), and when folding is not required (S91 NO), the operation flag is set to OFF (S93). When the operation flag is at ON (1) (S94 ON), the air cylinder device 106 (folding means) is operated (S95). Next, the moving means 27c are activated (S96) such that the label L is affixed to the product W in an angularly folded form.

When the operation flag is at OFF (0) (S94 OFF), on the other hand, the moving means 27c are activated without operating the air cylinder device 106 (folding means) (S96). As a result, the label L is affixed to the product W in planar form.

According to the setting performed by the reader/writer 13, the operation flag is set by having the reader/writer 13 determine whether the label is a normal label or a label attached with the RFID tag T. Therefore, setting from the operation unit 88 is eliminated, and the operation of the air cylinder device 106 (folding means) is switched ON and OFF automatically simply by loading the two types of labels in accordance with the application. As a result, the operating efficiency is favorable. Furthermore, when the operation flag is set in accordance with the type of the label L to which the RFID tag T is attached, the form of the label L attached with the RFID tag T (whether the label L is to be affixed in planar form or after being folded angularly) can be modified according to the type of label to be affixed or the information stored on the IC chip in the RFID tag, and thus the range of usage applications can be widened.

Note that in the eleventh embodiment, folding assisting means 30 (not shown) comprising an air blowing nozzle for pushing the part 2 of the label L to the space e side, for example, are not provided, but may be provided to ensure that folding is performed even more reliably.

FIGS. 48 through 53 show a label affixing apparatus according to a twelfth embodiment of the present invention. A label affixing apparatus 1200 according to the twelfth embodiment differs from the above embodiments in the construction of the folding/affixing means 20, and is capable of responding to variation in the size of the label L with ease. As shown in FIGS. 61, 66 and 67, in the subject label L of a label affixing apparatus according to the twelfth embodiment, the part 2 of the label L including the tag attachment site 1 is formed in an intermediate portion of the label L.

As shown in FIG. 48A, the label affixing apparatus 1200 according to the twelfth embodiment comprises a suction plate 111 as folding/affixing means 20m, and the suction plate 111 serves to suction the front surface side of the label L in such a manner that the part 2 of the label L including the tag attachment site 1, to which the RFID tag T of the label L peeled away by the peeling plate 11 is attached, can be caused to project from the rear surface side to the front surface side. The suction plate 111 is provided with a plurality of small holes 111a that aspirate air in order to aspirate the front surface of the label L.

The suction plate 111 comprises a first side body 112 for aspirating the first side portion 3a of the label L, which is adjacent to the part 2 of the label L, and a second side body 113 for aspirating the second side portion 4a of the label L, which is adjacent to the part 2 of the label L. The second side body 113 is capable of moving relative to the first side body 112 between two positions, namely the removed position V and the joining position S. When the second side body 113 moves from the removed position V to the joining position S, the folded portion M of the label L is formed by the two opposing end surfaces of the first side body 112 and second side body 113.

More specifically, the first side body 112 is set at a length Ga that corresponds to a length Fa of the first side portion 3a of the label L, and is fixed to a base 115 via a support member 116. The second side body 113 is set at a length Gb that can correspond to differences among a plurality of lengths Fb of the second side portion 4a of the label L, and is provided movably on the base 115 via a support member 117 so as to be capable of sliding between two positions, namely the removed position V and the joining position S. In other words, the length Ga of the first side body 112 and the length Gb of the second side body 113 have a relationship of Ga≦Gb. As shown in FIG. 48B, a roller 118 protrudes from a side portion of the second side body 113, and a guide hole 119 for guiding the roller 118 to roll is formed in the support member 117.

Hence, the second side body 113 is supported so as to be capable of moving between two positions, namely the joining position S in which a rear end portion of the second side body 113 in the conveyance direction R of the label L meets a front end portion of the first side body 112 in the conveyance direction R of the label L, and a removed position V in which the second side body 113 is removed from the first side body 112. In the removed position V, the space e into which the part 2 of the label L that projects from the rear surface side to the front surface side can enter, is formed between the first side body 112 and second side body 113. The first side body 112 and the second side body 113 respectively aspirate and hold the two conveyance direction R end portion sides of the label L.

Further, a plurality of types of the second side body 113 having difference lengths Gb are prepared as the second side body 113, and support members 117 are prepared in accordance with the second side bodies 113. The second side body 113 and support member 117 are exchangeably attached to the base 115 by a screw 115a.

The folding/affixing means 20m further comprise a driving unit 37b for moving the second side body 113. The driving unit 37b comprises an air cylinder device 121 that positions the second side body 113 in the joining position S during advancement and positions the second side body 113 in the removed position V during retreat. The air cylinder device 121 comprises a piston 123 attached to an attachment member 122 on the rear surface of the second side body 113, and a cylinder 124 fixed to the base 115.

The folding/affixing means 20m further comprise moving means 27d for moving the suction plate 111 between two positions, namely the suction position X for aspirating the label L peeled away by the peeling plate 11 and the affixing position Y for affixing the aspirated label L to the product W.

The moving means 27d comprise an air cylinder device 133 comprising a piston 131 to which the base 115 is attached and a cylinder 132 provided on the machine base (not shown) side. A support plate 134 is provided on the tip end of the piston 131. A plurality of coil springs 135 is provided between the support plate 134 and the base 115 for absorbing shock in the affixing position.

The folding/affixing means 20*m* further comprise folding assisting means 30*d*. The folding assisting means 30*d* comprise an air blowing nozzle 136 that blows air onto the part 2 of the label L from the rear surface side (the adhesive layer B side) such that the part 2 of the label L is folded in an angular fashion toward the front surface side by the force of the air.

Note that the circuit configuration of the label affixing apparatus according to the twelfth embodiment is similar to the circuit configuration of the label affixing apparatus 100 according to the first embodiment (see FIG. 59) such that the folding/affixing means 20*m* are controlled by the label affixation control unit 92.

According to the label affixing apparatus 1200 of this embodiment, the label L is affixed in the following manner. Here, a case in which the operation flag is set from the operation unit 88 (FIG. 5) to ON (1) will be described using FIG. 5 and FIGS. 48 through 53.

With reference to the flowchart shown in FIG. 5, the label L is conveyed as shown in FIG. 49A by the label conveying means 10 (S10). The sensor 12 measures the timing at which the label affixation control unit 92 operates the folding/affixing means 20*m* on the basis of detection of the label L. Next, when the backing sheet D is folded back by the peeling plate 11 such that the label L is peeled away, the suction plate 111 aspirates the label L in the suction position X (S11).

Since ON (1) is set in the operation flag region of the EEPROM 82 (S12 ON), the label affixation control unit 92 operates the air cylinder device 121 (folding means) and the folding assisting means 30*d* during the operation to affix the label L (S13) to position the second side body 113 in the removed position V, as shown in FIG. 49B. As a result, the space e into which the part 2 of the label L that projects from the rear surface side (the adhesive layer B side) to the front surface side (the display layer U side) can enter, is formed between the first side body 112 and second side body 113.

Figure 48:
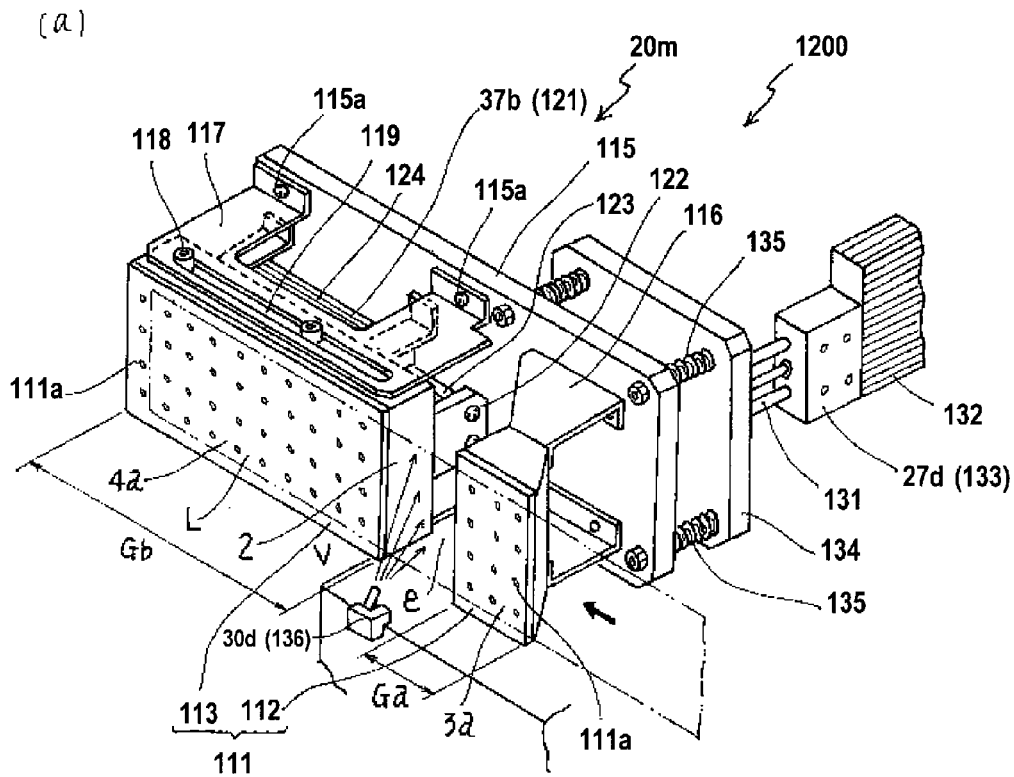
FIGS. 48A and 48B are perspective views showing the main parts of a label affixing apparatus according to a twelfth embodiment of the present invention.
Figure 48:
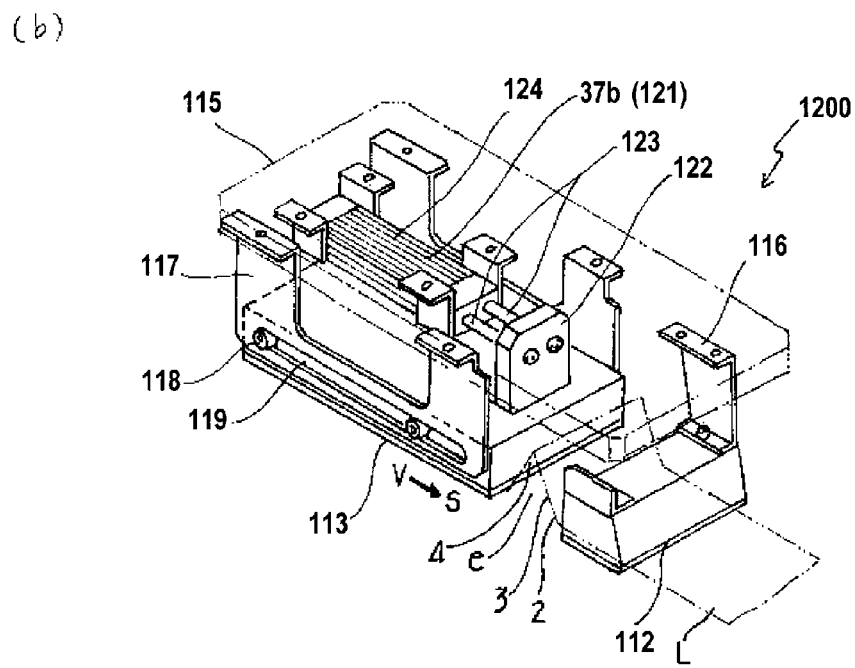
Figure 49:
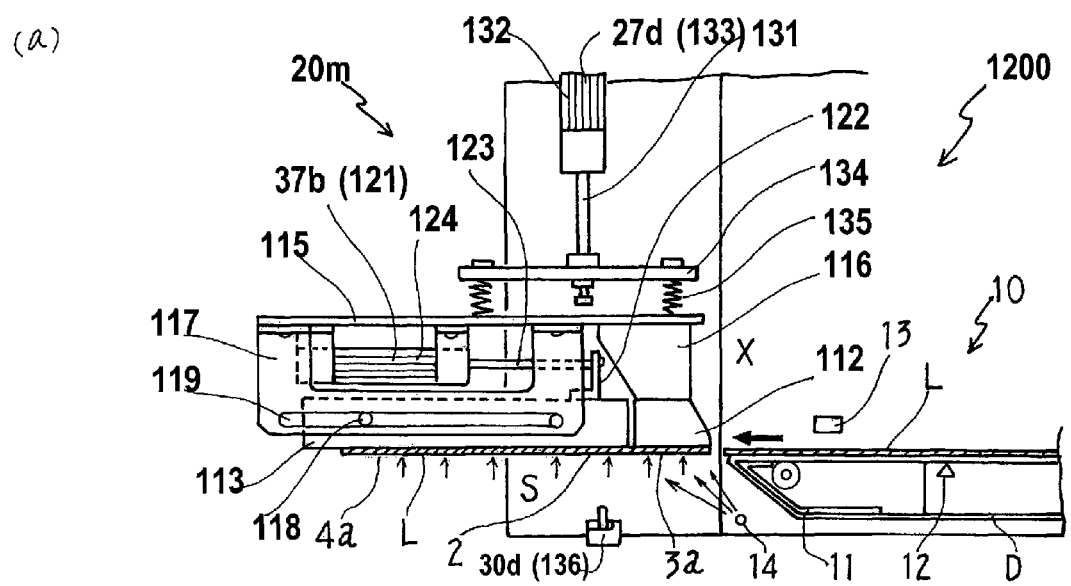
FIGS. 49A through 49D are plan views showing the label affixing apparatus according to the twelfth embodiment of the present invention, and its action.
Figure 49:
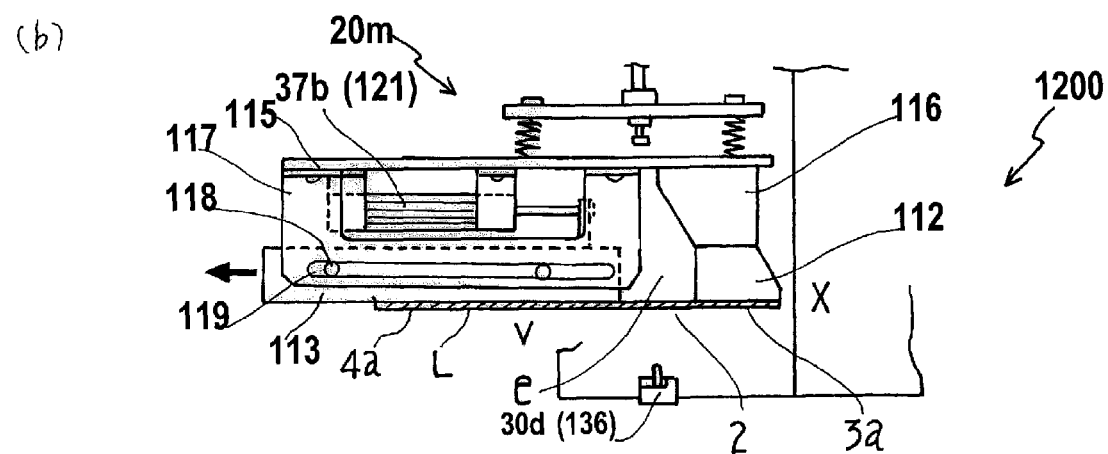
Figure 49:
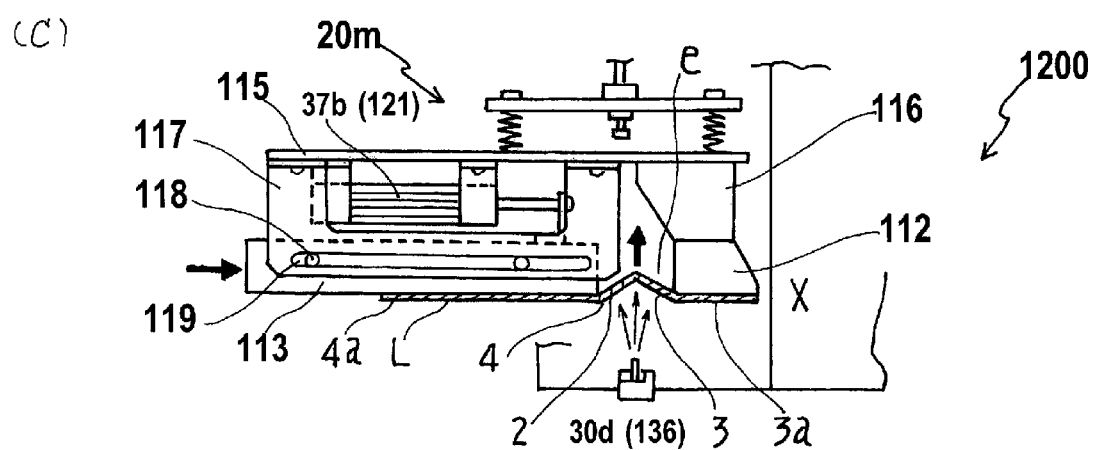
Figure 49:
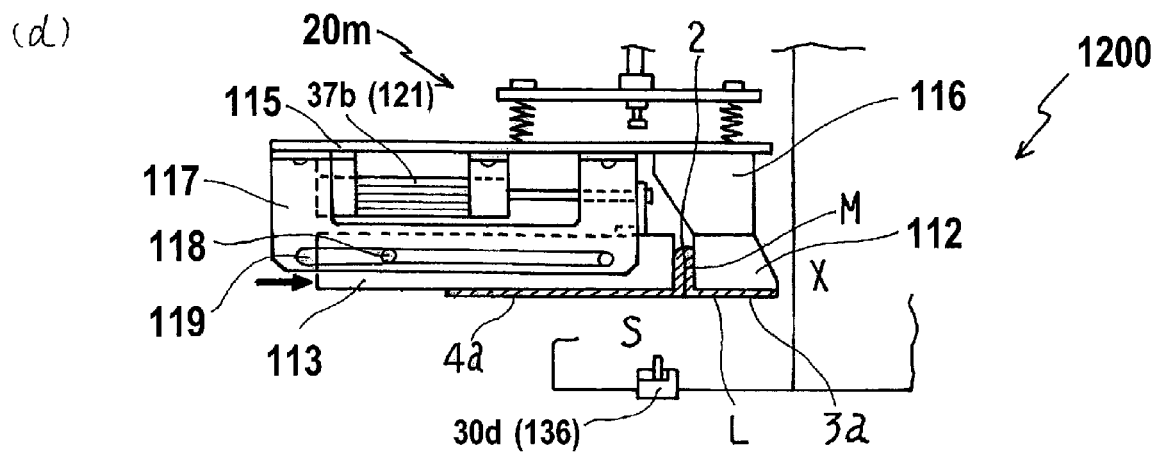

Next, as shown in FIGS. 48 and 49C, the label affixation control unit 92 activates the air cylinder device 121 to move the second side body 113 from the removed position V to the joining position S. Also, the label affixation control unit 92 activates the air blowing nozzle 136 to blow air toward the rear surface side (the adhesive layer B side) of the part 2 of the label L including the tag attachment site 1 to which the RFID tag T of the label L is attached. As a result, the bend portion 7 of the first side face 3 and the bend portion 7 of the second side face 4 are pressed in a direction for causing the respective rear surfaces of the first side face 3 and second side face 4 to approach each other while the first side body 112 and second side body 113 respectively aspirate and hold the two conveyance direction R end portion sides of the label L, thereby ensuring that the part 2 of the label L is reliably folded into an angular shape. As shown in FIG. 49D, when the second side body 113 moves from the removed position V to the joining position S, the opposing end surfaces of the first side body 112 and second side body 113 respectively come into contact with the front surfaces (display layer U) of the first side face 3 and second side face 4 forming the part 2 of the label L and press these front surfaces such that the rear surfaces of the first side face 3 and second side face 4 are joined. As a result, the folded portion M is formed.

Figure 50:
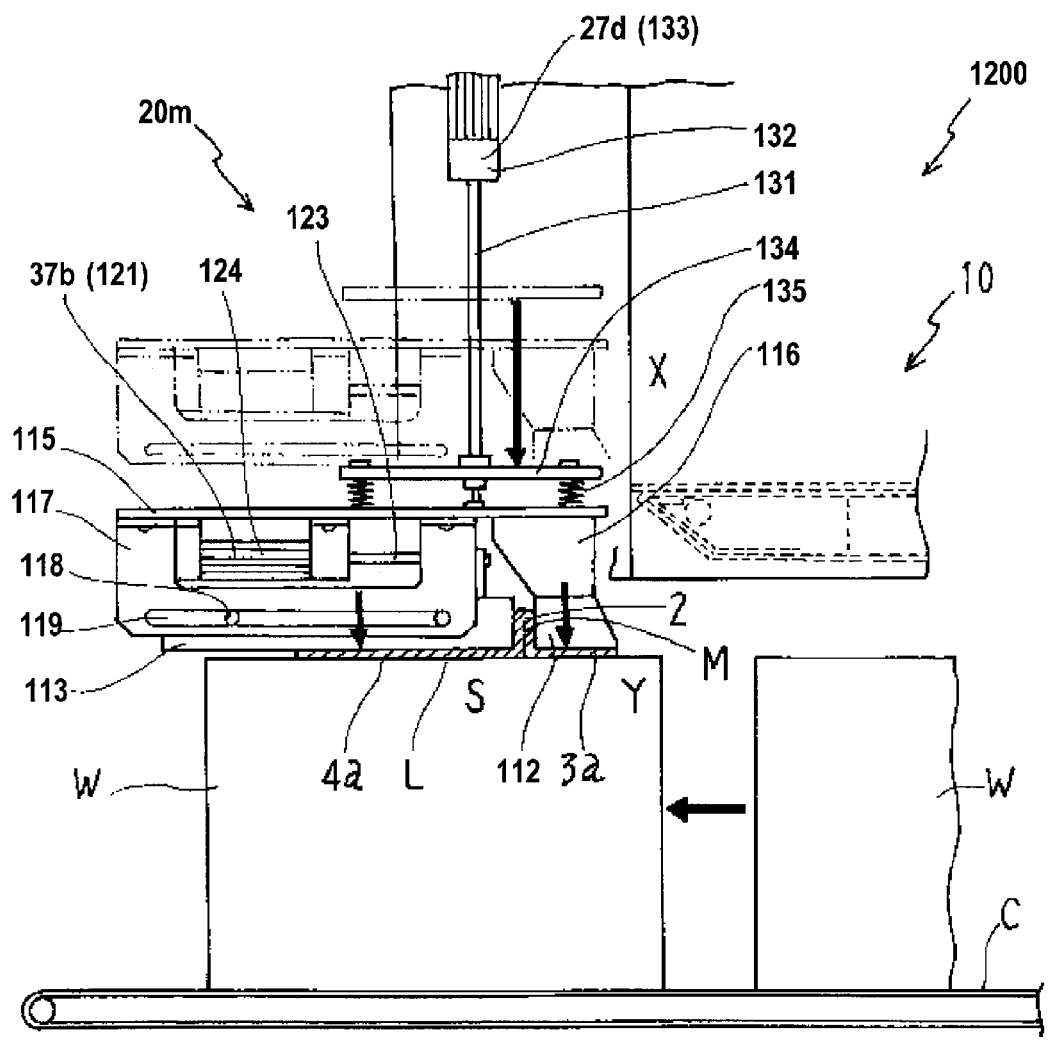
FIG. 50 is a plan view showing the label affixing apparatus according to the twelfth embodiment of the present invention, and its action.

Next, as shown in FIG. 50, the label affixation control unit 92 activates the air cylinder device 133 of the moving means 27*d* to move the suction plate 111 from the suction position X to the affixing position Y (S14). As a result, the suction plate 111 is pressed against the product W by the first side body 112 and second side body 113, and the label L is reliably affixed to the product W. Once the label is affixed, the suction plate 111 is returned to the suction position X.

Next, a case in which a normal label not attached with the RFID tag T is affixed, or in other words a case in which the operation flag is set at OFF (0), is described. As shown in FIG. 49A, the label L is conveyed by the label conveying means 10 (S10). When the backing sheet D is folded back by the peeling plate 11 such that the label L is peeled away, the suction plate 111 aspirates the label L in the suction position X (S11).

Since OFF (0) is set in the operation flag region of the EEPROM 82 (S12 OFF), the label affixation control unit 92 activates the air cylinder device 133 of the moving means 27*d* without operating the air cylinder device 121 (folding means) and folding assisting means 30*d*, whereby the suction plate 111 is moved from the suction position X to the affixing position Y (S14). As a result, the label is affixed in planar form to the product W.

Next, a case in which the operation flag is set in accordance with a command received by the external interface 85, similarly to the first embodiment, is described using the flowchart shown in FIG. 6.

First, the processing of the steps S20 through S24 is performed in a similar manner to the first embodiment.

Then, when the label L is conveyed by the label conveying means 10 (S25) and the backing sheet D is folded back by the peeling plate 11 such that the label L is peeled away, the suction plate 111 aspirates the label L in the suction position X (S26).

Next, when the operation flag in the operation flag region of the EEPROM 82 is set at ON (1) (S27 ON), the label affixation control unit 92 operates the air cylinder device 121 (folding means) and folding assisting means 30*d* (S28).

The label affixation control unit 92 then activates the moving means 27*d* (S29) such that the label L is affixed to the product W in an angularly folded form.

When OFF (0) is set in the operation flag region of the EEPROM 82 (S27 OFF), on the other hand, the label affixation control unit 92 activates the air cylinder device 133 of the moving means 27*d* without activating the air cylinder device 121 (folding means) and folding assisting means 30*d*, whereby the suction plate 111 is moved from the suction position X to the affixing position Y (S29). As a result, the aspirated normal label is affixed to the product W in planar form.

According to setting that corresponds to the command received by the external interface 85, the form in which the label L attached with the RFID tag T is affixed (planar form or angularly folded form) can be modified easily according to the type or content of the product W.

Note that a construction in which an external machine is used as a scanner, the label affixing apparatus 1200 receives barcode data read by the scanner via the external interface 85, and the label affixation control unit 92 operates the air cylinder device 121 (folding means) and folding assisting means 30*d* in accordance with the content of the read barcode, may be employed.

Next, a case in which setting of the operation flag is performed by having the reader/writer 13 detect either a normal label to which the RFID tag T is not attached or the label L to which the RFID tag T is attached, similarly to the first embodiment, is described using the flowchart shown in FIG. 7.

First, the processing of the steps S30 through S33 is performed in a similar manner to the first embodiment.

Then, when the operation flag is at ON (1) (S34 ON), the air cylinder device 121 (folding means) and folding assisting means 30*d* are operated (S35).

Next, the moving means 27*d* are activated (S36) such that the label L is affixed to the product W in an angularly folded form.

When the operation flag is at OFF (0) (S34 OFF), on the other hand, the moving means 27*d* are activated without operating the air cylinder device 121 (folding means) and folding assisting means 30*d* (S36). As a result, the label L is affixed to the product W in planar form.

According to the setting performed by the reader/writer 13, the operations of the air cylinder device 121 (folding means) and the folding assisting means 30*d* are switched ON and OFF automatically simply by loading the two types of labels in accordance with the application. As a result, the operating efficiency is favorable.

Figure 51:
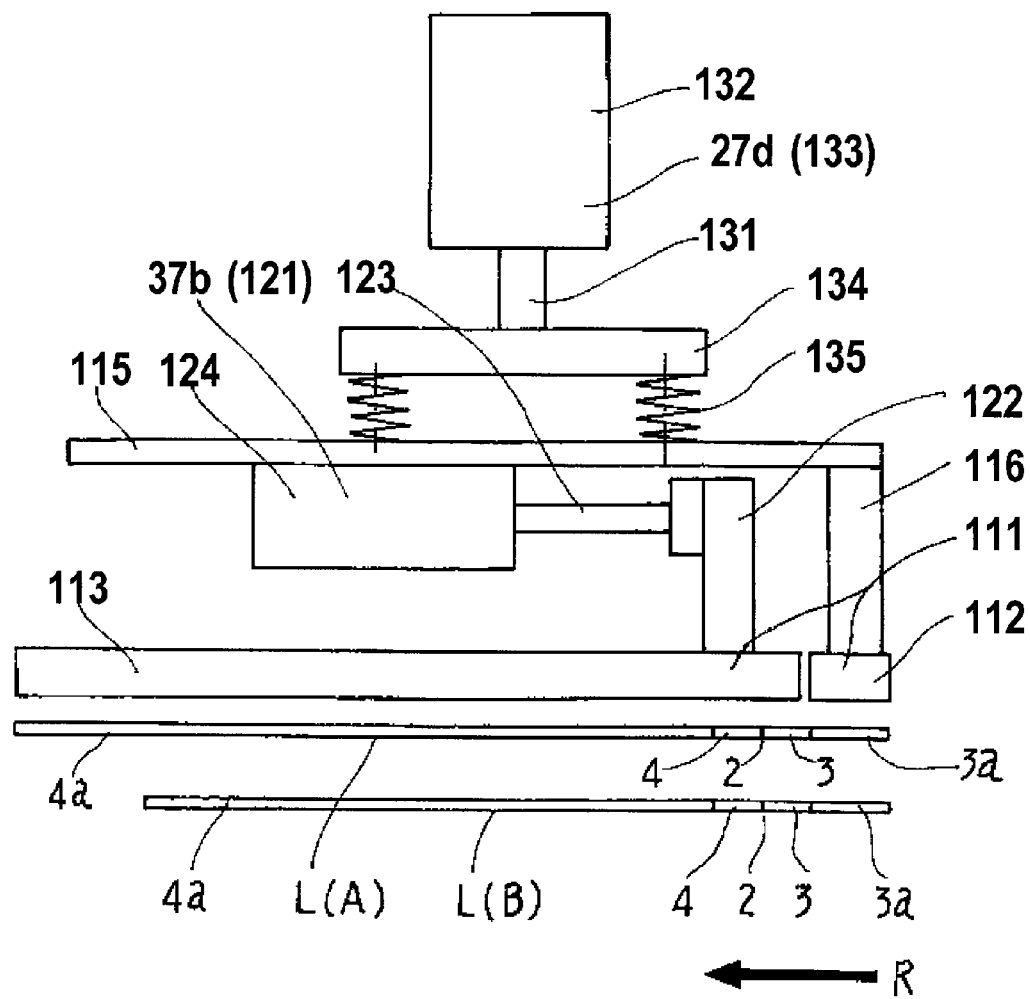
FIG. 51 is a view showing an action when the label affixing apparatus according to the twelfth embodiment of the present invention is applied to a label having a different length.
Figure 52:
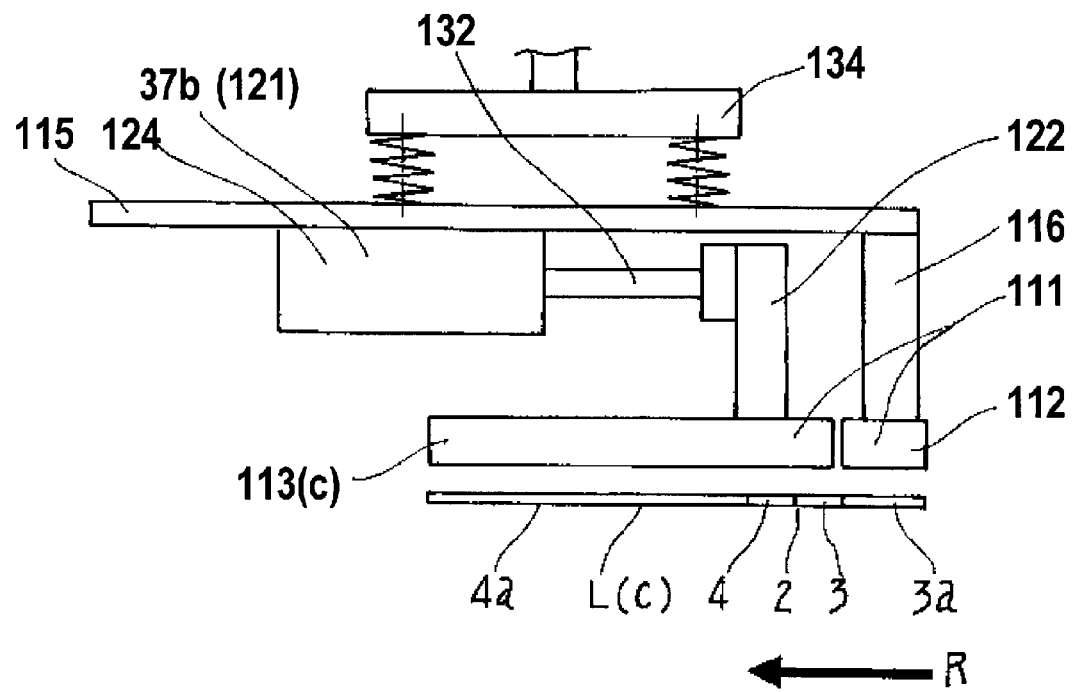
FIG. 52 is a view showing an action when the label affixing apparatus according to the twelfth embodiment of the present invention is applied to another label having a different length.
Figure 53:
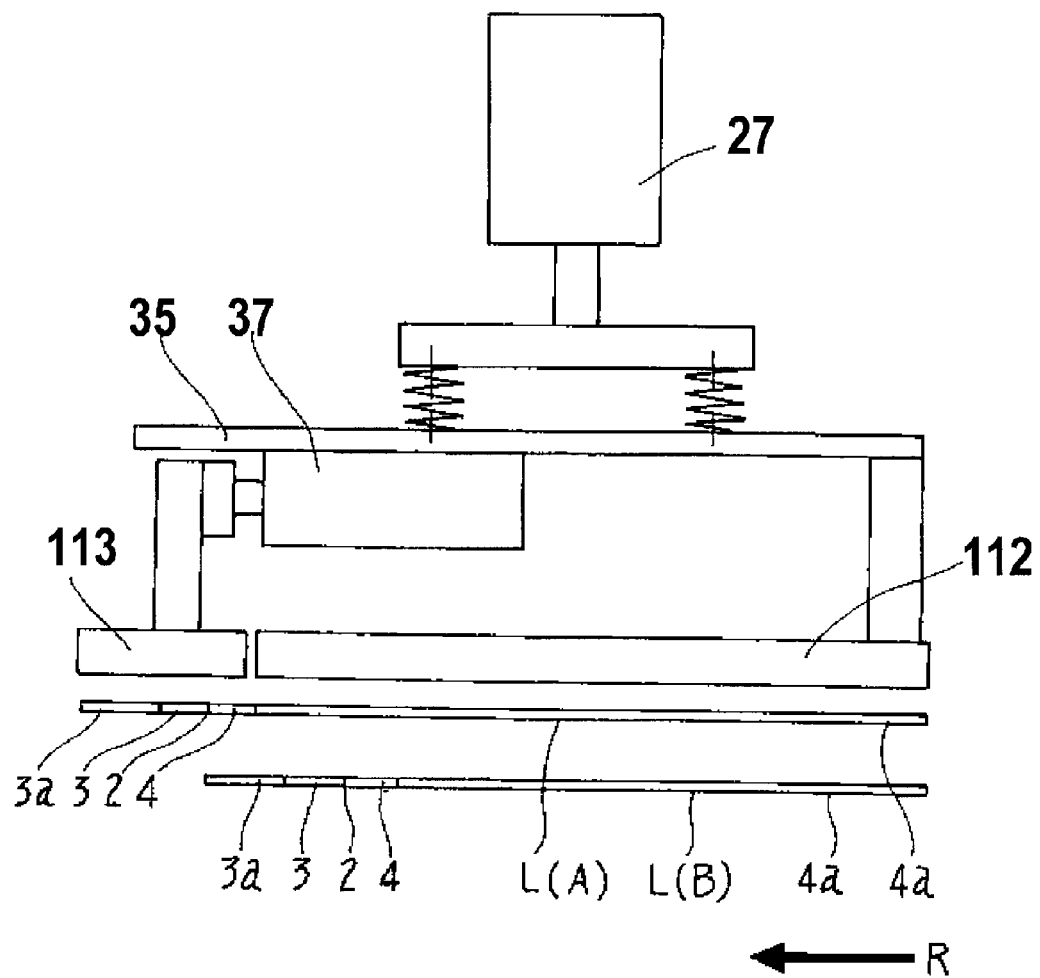
FIG. 53 is a view showing another label affixing apparatus serving as a comparison, and an action thereof, in order to illustrate the advantages of the label affixing apparatus according to the twelfth embodiment of the present invention.

Next, a case of affixing different types of labels in which the length Fa of the first side portion 3*a* is the same, but the length Fb of the second side face 4*a* varies is described using FIGS. 51 through 53.

First, when a label L (B) having a slightly shorter length than a preceding label L (A) is affixed, as shown in FIG. 51, the second side body 113 is used as is, without being replaced. In this case, the conveyance direction rear end of the label L (B) and the first side portion 3*a*, which is shorter than the length Fa of the second side portion 4*a* and has an unvarying length Fb, are positioned at the conveyance direction rear end portion of the first side body 112. Therefore, the positional relationship between the folding part 2 of the label L (B) and the suction plate 111 remains unchanged. As a result, the label L (B) can be aspirated, folded, and affixed in a similar manner to that described above. At this time, the second side body 113 is longer than the second side portion 4*a* of the label L (B). Therefore, the small holes for sucking up air are exposed. However, the exposure is slight, and does not therefore impair the suction operation.

If the label L (B) having a slightly shorter length than the preceding label L (A) is applied as is when the label L is conveyed with the first side portion 3*a* in a leading conveyance position, and the second side portion 4*a* in a following conveyance position and the first side body 112 and second side body 113 of the suction plate are constructed in accordance therewith, as shown in FIG. 53, the conveyance direction rear end of the label L is positioned at the conveyance direction rear end portion of the first side body 112. Therefore, the folding part 2 of the label L is not positioned at the correct formation site of the folding space e. In this case, all of the settings of the suction plate 111, the moving means 27, and so on must be altered, which is troublesome and leads to an increase in structural and operational complexity. In this embodiment, however, variation in the size of the label L can be responded to easily.

Further, when a label L (C) having a much smaller length than the length of the preceding label L (A) is affixed (for example, when the second side portion 4*a* is approximately half as short), as shown in FIG. 52, a second side body 113 (C) and a support member (not shown) that have been prepared in advance are introduced in accordance with the short label L (C). During the replacement operation, the screw 115*a* of the prior support member 117 is loosened and removed, whereupon the new support member (not shown) is attached to the base 115 by the screw 115*a*. In this case, only the second side body 113 (C) and the support member need be introduced, as shown in FIG. 53. Therefore, the operation is performed extremely simply in comparison with a case in which all of the settings of the suction plates 112, 113, the moving means 27, and so on must be altered. The label L (C) is then aspirated, folded, and affixed in a similar manner to that described above.

When a label L (not shown) having a greater length than the preceding label L (A) is affixed, a second side body 113 (not shown) and a support member (not shown) that have been prepared in advance are introduced in accordance with the label L.

FIGS. 54 through 58 show a label affixing apparatus according to a thirteenth embodiment of the present invention.

A label affixing apparatus 1300 according to the thirteenth embodiment has a substantially identical construction to the label affixing apparatus 1200 according to the twelfth embodiment described above, but differs therefrom in that an intermediate body is added to the construction of the folding/affixing means 20.

The label affixing apparatus 1300 according to the thirteenth embodiment comprises the suction plate 111 as folding/affixing means 20*n*, and the suction plate 111 is provided with a plurality of small holes 111*a* that suck up air in order to aspirate the front surface of the label L. More specifically, the suction plate 111 is construction by the first side body 112 for aspirating the first side portion 3*a* of the label L, which is adjacent to the part 2 of the label L, the second side body 113 that is provided to be capable of approaching the first side body 112 and aspirates the second side portion 4*a* of the label L, which is adjacent to the part 2 of the label L, and an intermediate body 114 that is provided between the first side body 112 and second side body 113 and aspirates the part 2 of the label L.

The first side body 112 and second side body 113 are similar to those described above, while the intermediate body 114 is provided on the base 115 so as to be capable of moving between two positions, namely a planar position H in which the suction surface of the first side body 112, the suction surface of the intermediate body 114, and the suction surface of the second side body 113 are connected in planar form and the label L is aspirated, and a withdrawal position J in which the intermediate body 114 is withdrawn from the planar position H.

Figure 54:
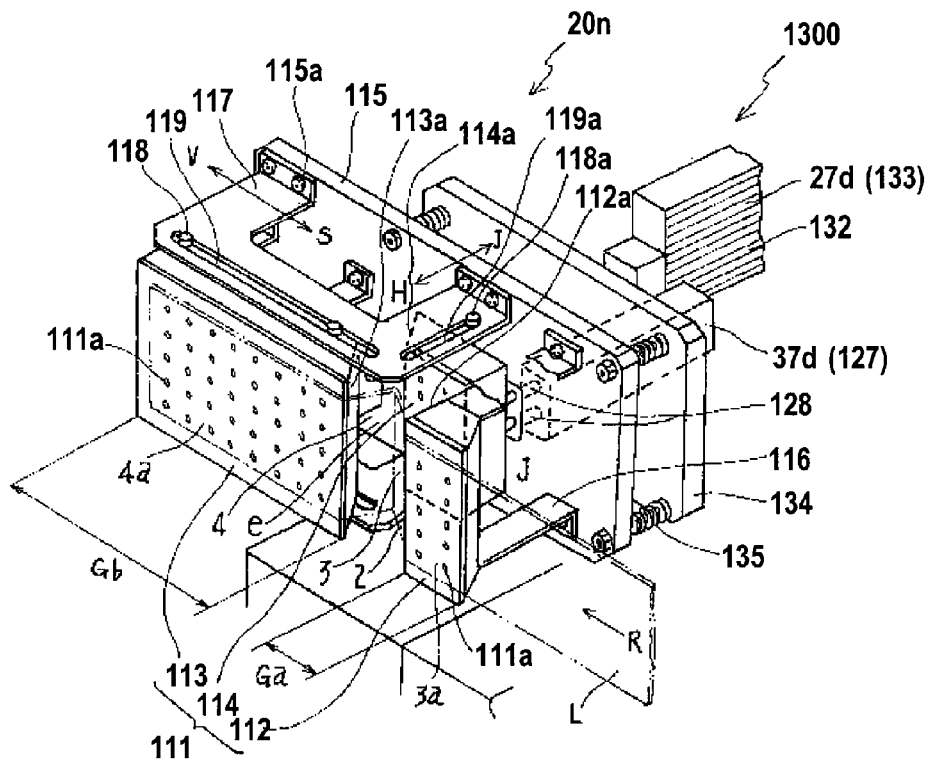
FIGS. 54A and 54B are perspective views showing the main parts of a label affixing apparatus according to a thirteenth embodiment of the present invention.
Figure 54:
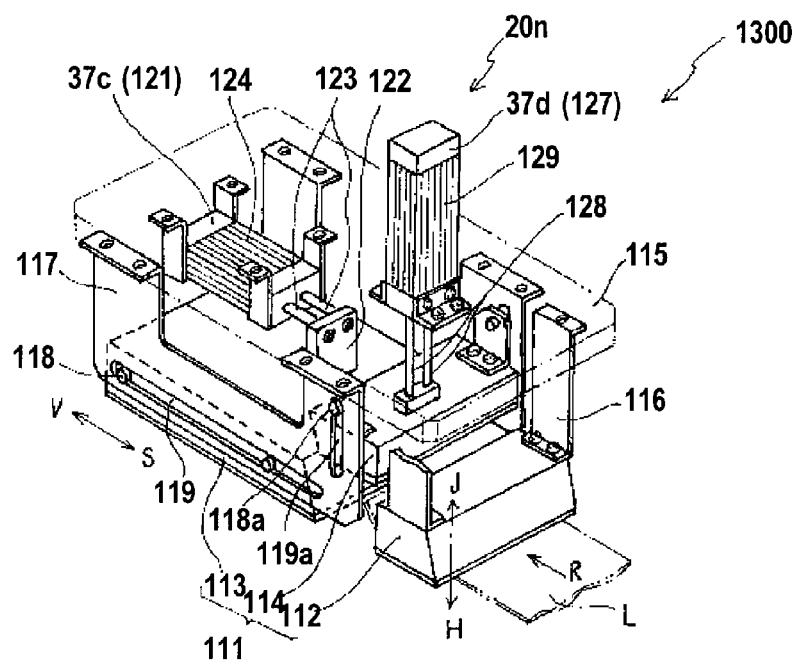
Figure 55:
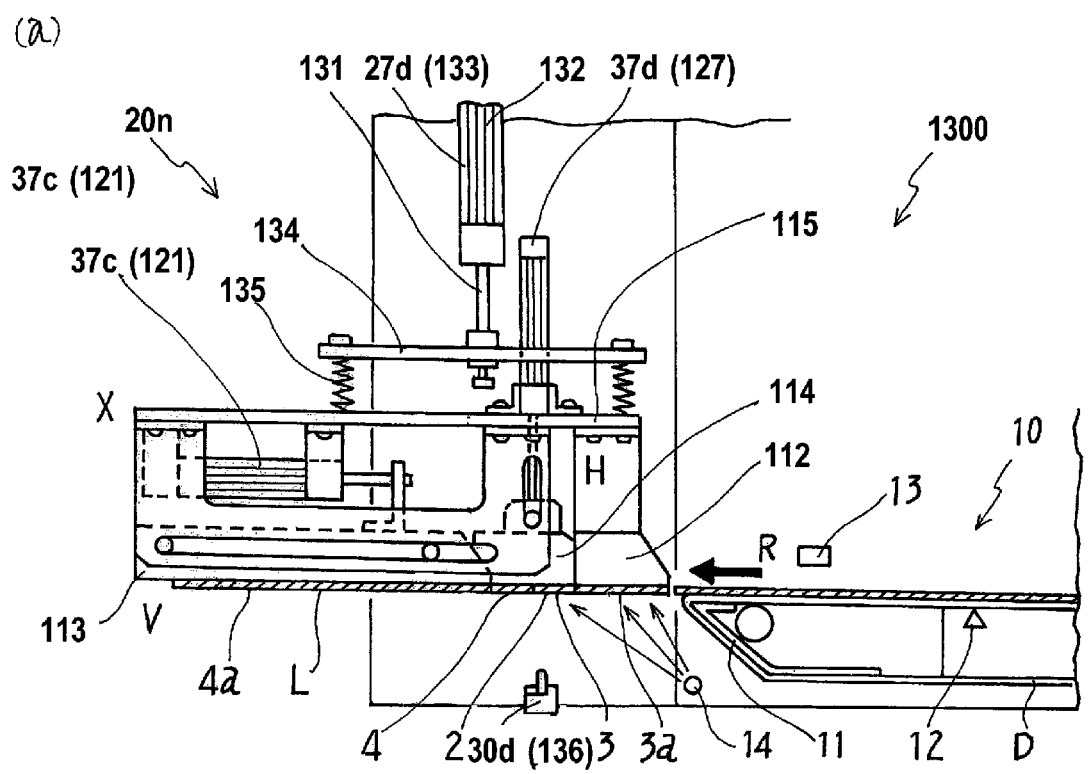
FIGS. 55A through 55C are plan views showing the label affixing apparatus according to the thirteenth embodiment of the present invention, and its action.
Figure 55:
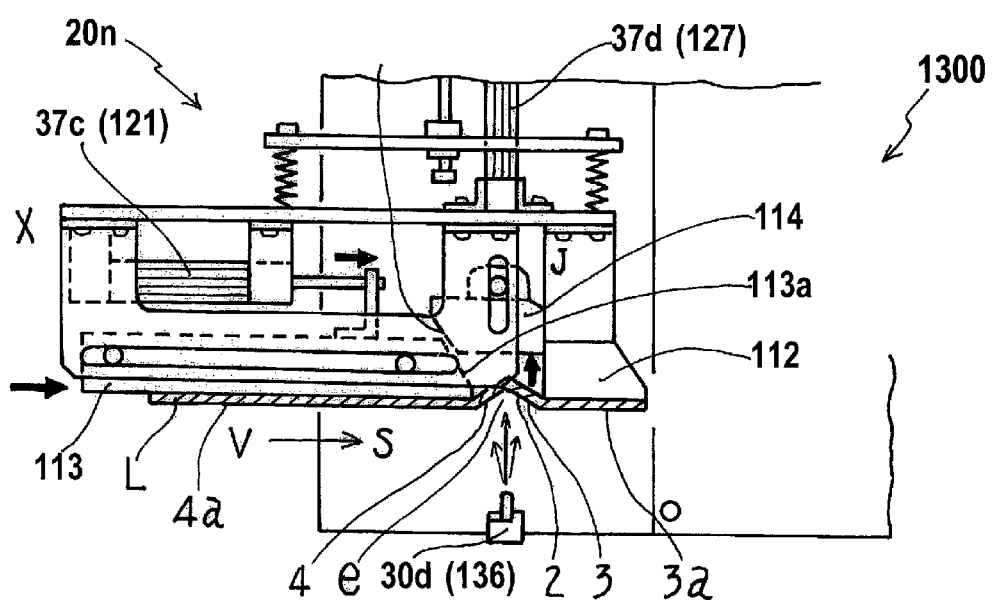
Figure 55:
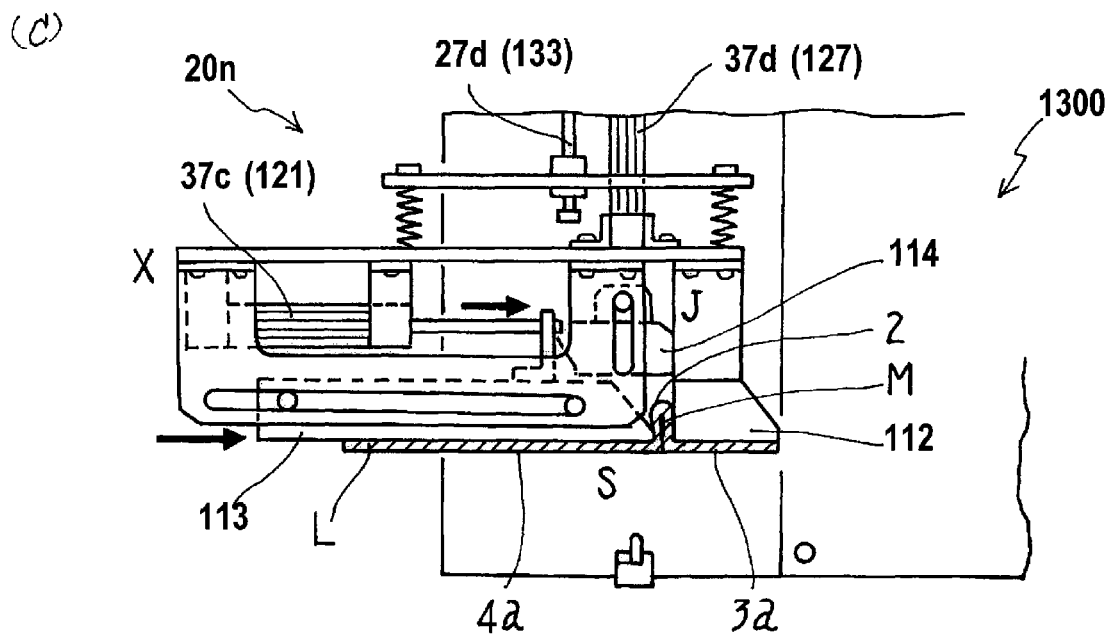

More specifically, as shown in FIG. 54, the intermediate body 114 is provided on the base 115 so as to be capable of moving between two positions, namely the planar position H and the withdrawal position J, via the aforementioned support member 117. A roller 118*a* protrudes from a side portion thereof, and a guide hole 119*a* for guiding the roller 118*a* rollably is formed in the support member 117.

The folding/affixing means 20*m* further comprise an intermediate body driving unit 37*d* for moving the intermediate body 114. The intermediate body driving unit 37*d* comprises an air cylinder device 127, and the air cylinder device 127 comprises a double piston 128 attached to the support member 117 of the second side body 113 and a cylinder 39 fixed to the base 115.

A drive control unit that causes the intermediate body driving unit 37*d* to move the intermediate body 114 from the planar position H to the withdrawal position J and causes a second side body driving unit 37*c* to move the second side body 113 from the removed position V to the joining position S synchronously is also provided.

Further, adjacent end surfaces 114*a*, 113*a* of the intermediate body 114 in the planar position H and the second side body 113 in the removed position V are formed at an incline relative to the suction surfaces so that the intermediate body 114 and second side body 113 can move synchronously, and they are joined to each other.

The circuit configuration of the label affixing apparatus 1300 according to the thirteenth embodiment is similar to the circuit configuration of the label affixing apparatus 100 according to the first embodiment (see FIG. 59) such that the folding/affixing means 20m are controlled by the label affixation control unit 92.

According to the label L affixing apparatus 1300 of this embodiment, the label L is affixed in the following manner. Here, a case in which the operation flag is set to ON (1) is described using FIG. 5 and FIGS. 54 through 56.

With reference to the flowchart shown in FIG. 5, the label L is conveyed as shown in FIG. 55A by the label conveying means 10, and when the backing sheet D is folded back by the peeling plate 11 such that the label L is peeled away, the suction plate 111 aspirates the label L in the suction position X (S11).

Since ON (1) is set in the operation flag region of the EEPROM 82 (S12 ON), the label affixation control unit 92 operates the air cylinder devices 121, 127 (folding means) and the folding assisting means 30d during the operation to affix the label L (S13). As a result, the intermediate body 114 begins to withdraw from the planar position H toward the withdrawal position J, while the second side body 113 moves toward the joining position S from the removed position V so as to gradually approach the first side body 112, as shown in FIG. 55B. The label affixation control unit 92 also activates the air blowing nozzle 136 to blow air toward the rear surface side (the adhesive layer B side) of the part 2 of the label L including the tag attachment site 1 to which the RFID tag T of the label L is attached. In this case, the adjacent end surfaces 114a, 113a of the intermediate body 114 in the planar position H and the second side body 113 in the removed position V are formed at an incline relative to the suction surfaces of the intermediate body 114 and second side body 113 so that the intermediate body 114 and second side body 113 can move synchronously, and therefore interference between the intermediate body 114 and second side body 113 can be prevented. Thus, the intermediate body 114 and the second side body 113 can be activated synchronously with reliability.

Figure 38:
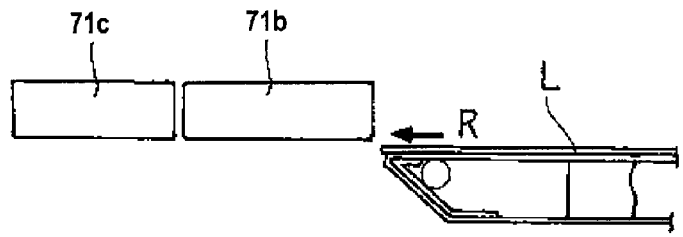
FIGS. 38A through 38E are views showing another label affixing apparatus serving as a comparison, and its action, in order to illustrate the advantages of the label affixing apparatus according to the ninth embodiment of the present invention.
Figure 38:
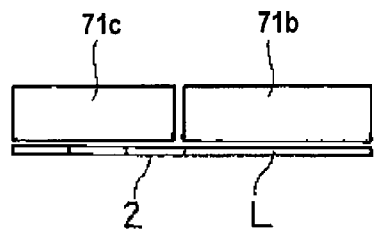
Figure 38:
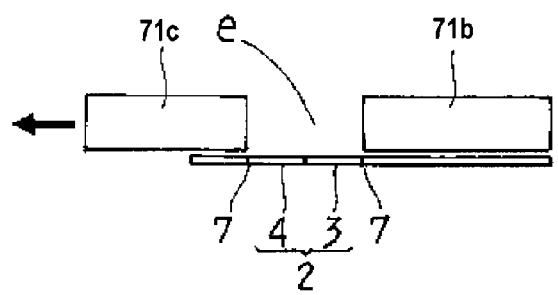
Figure 38:
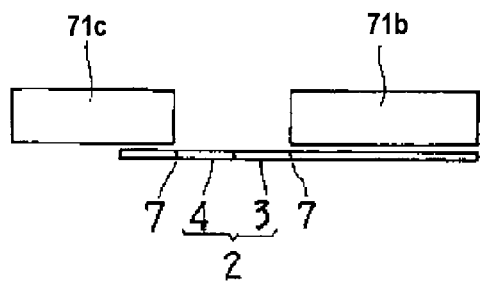
Figure 38:
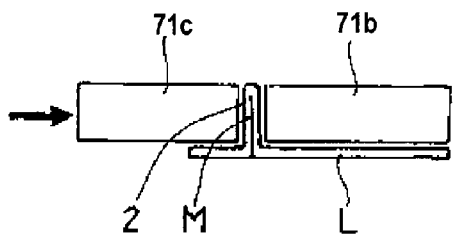

Next, as shown in FIGS. 55B and 55C, the part 2 of the label L is pulled by the intermediate body 114 and the space e is formed between the second side body 113 and first side body 112. When the second side body 113 moves to the joining position S, the bend portion of the first side face 3 and the bend portion of the second side face 4 are pressed in a direction for causing the respective rear surfaces of the first side face 3 and second side face 4 to approach each other while the first side body 112 and second side body 113 respectively aspirate and hold the two conveyance direction end portion sides of the label L, thereby forming the folded portion M. As a result, the part 2 of the label L is reliably folded into an angular shape. Furthermore, the folded portion M is formed simply by operating the air cylinder devices 121, 127. Therefore, the formation time of the folded portion M can be reduced greatly, enabling a reduction in the label affixation time and an improvement in affixation efficiency, as shown in FIG. 38.

Figure 56:
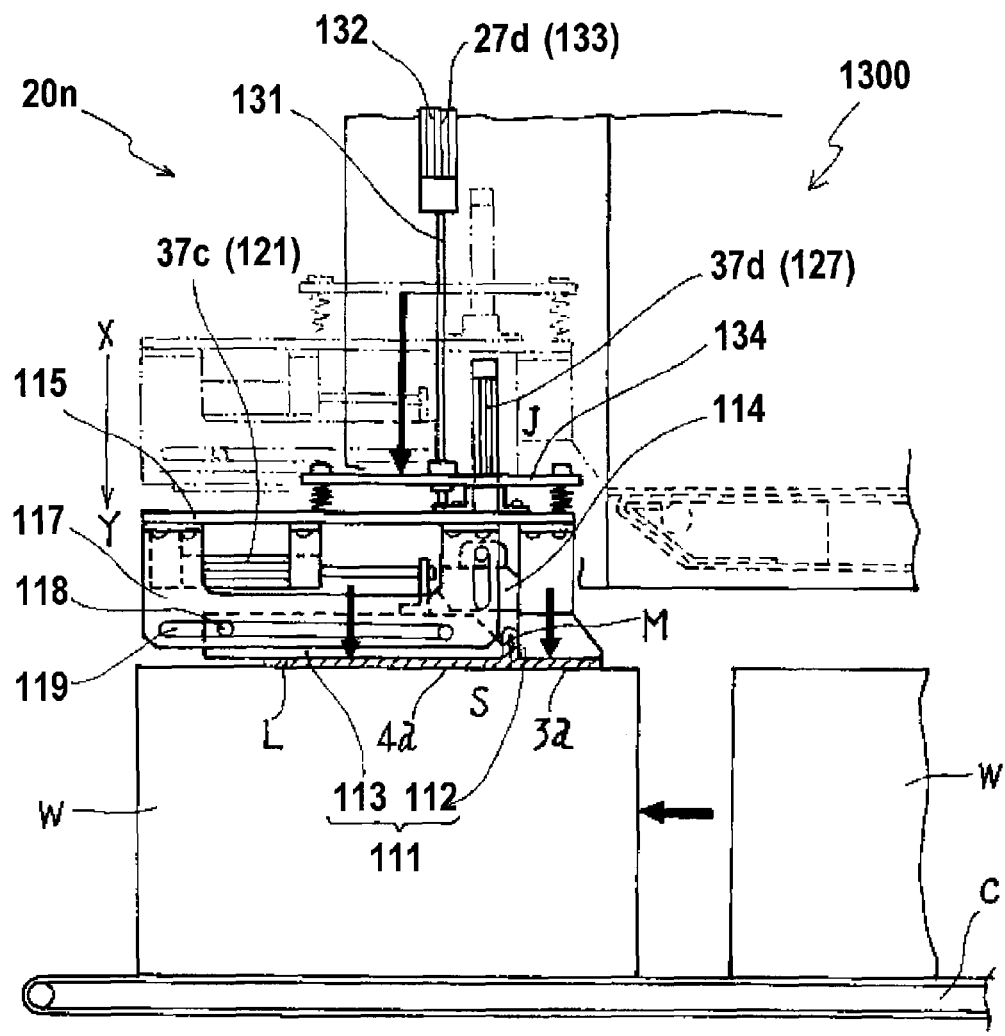
FIG. 56 is a plan view showing the label affixing apparatus according to the thirteenth embodiment of the present invention, and its action.

Next, as shown in FIG. 56, the air cylinder device 133 of the moving means 27d is activated to move the suction plate 111 from the suction position X to the affixing position Y (S14). As a result, the suction plate 111 is pressed against the product W by the first side body 112 and the second side body 113, whereby the label L is reliably affixed to the product W. Once the label has been affixed, the suction plate 111 is returned to the suction position X.

The air cylinder device 121 of the second side body driving unit 37c is then operated to return the second side body 113 to the removed position V from the joining position S, and the air cylinder device 127 of the intermediate body driving unit 37d is operated to return the intermediate body 114 to the planar position H from the withdrawal position J.

When the operation flag is set at OFF (0) (S12 OFF), the label affixation control unit 92 activates the air cylinder device 133 of the moving means 27d without operating the air cylinder devices 121, 127 and the folding assisting means 30d, whereby the suction plate 111 is moved from the suction position X to the affixing position Y (S14). As a result, the aspirated normal label is affixed to the product W in planar form.

Figure 57:
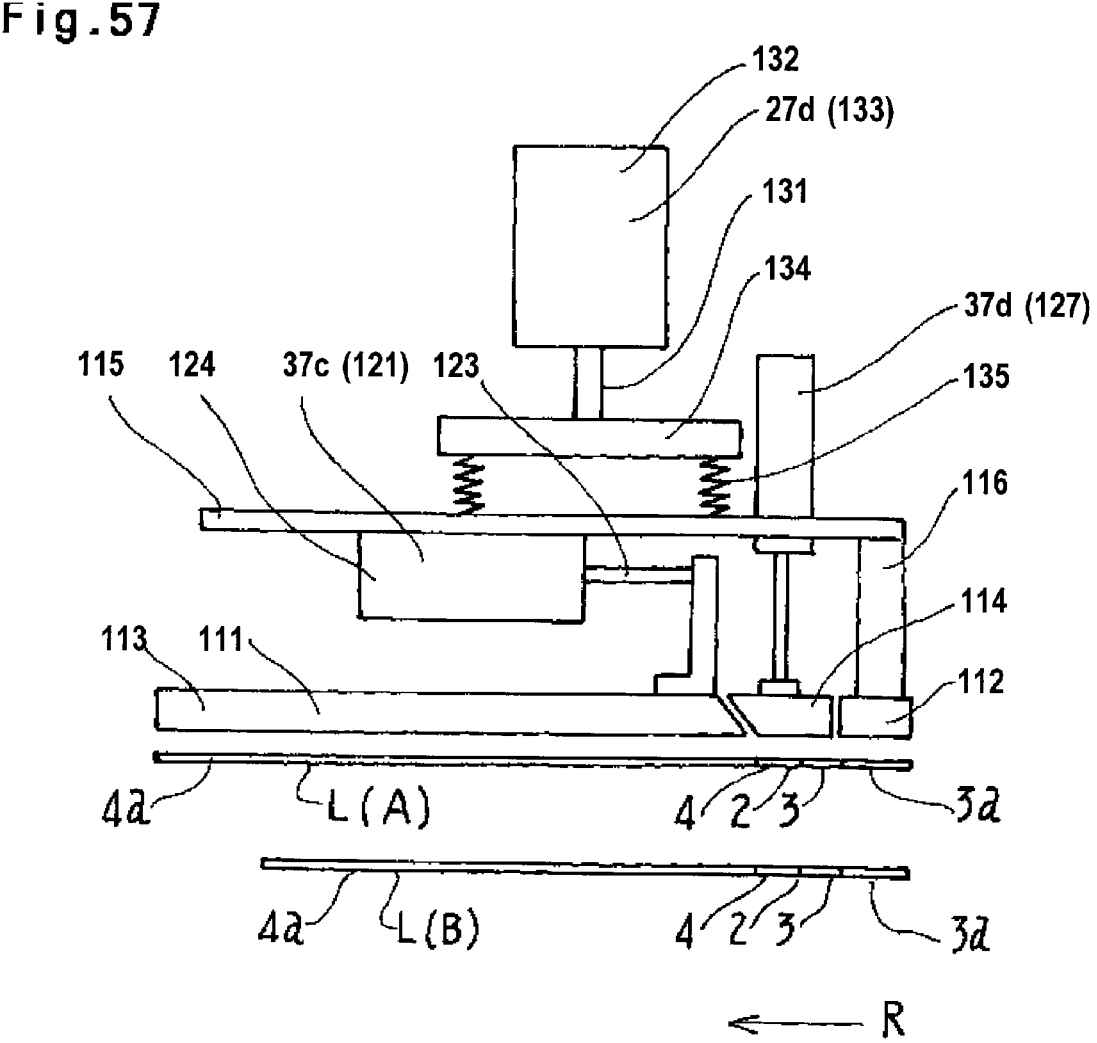
FIG. 57 is a view showing an action when the label affixing apparatus according to the thirteenth embodiment of the present invention is applied to another label having a different length.
Figure 58:
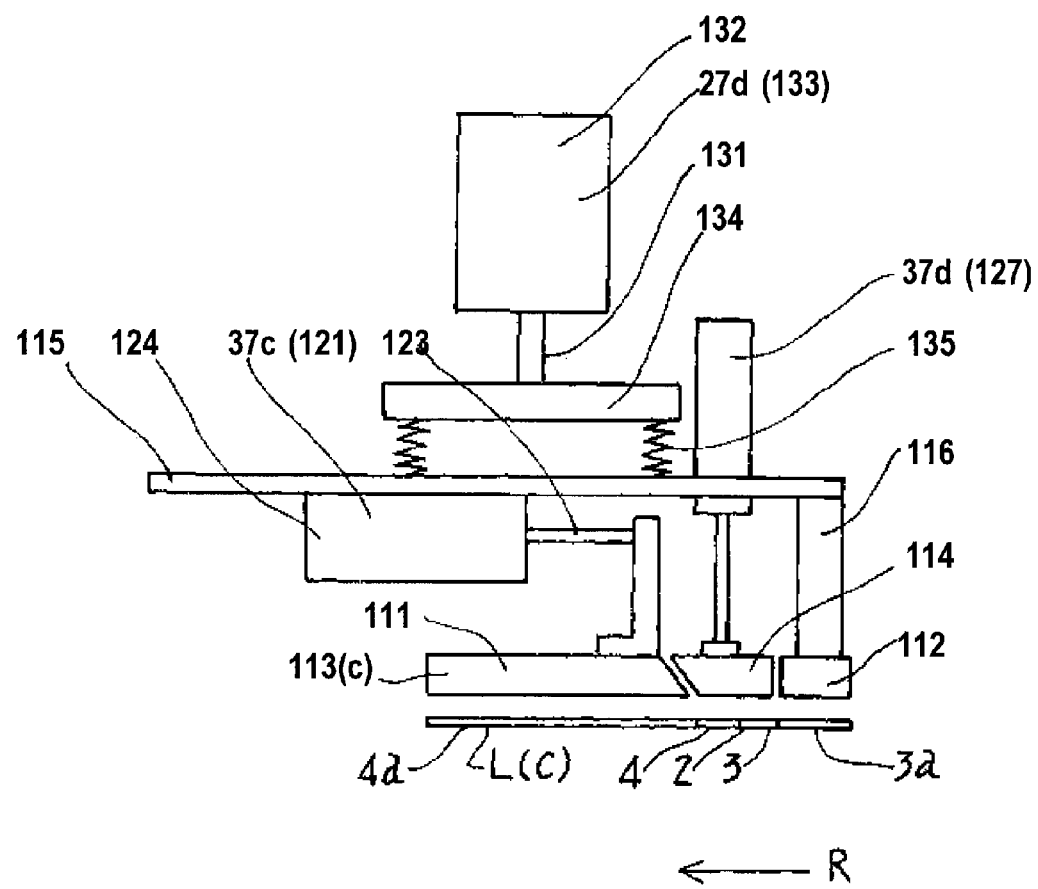
FIG. 58 is a view showing an action when the label affixing apparatus according to the thirteenth embodiment of the present invention is applied to another label having a different length.

Next, a case of affixing different types of labels in which the length Fa of the first side portion 3a is the same but the length Fb of the second side face 4a varies is described using FIGS. 57 and 58.

First, when the label L (B) having a slightly shorter length than the preceding label L (A) is affixed, as shown in FIG. 57, the second side body 113 is used as is, without being replaced. In this case, the conveyance direction rear end of the label L (B) and the first side portion 3a, which is shorter than the length Fa of the second side portion 4a and has an unvarying length Fb, are positioned at the conveyance direction rear end portion of the first side body 112. Therefore, the positional relationship between the part 2 of the label L (B) and the suction plate 111 remains unchanged. As a result, the label L (B) can be aspirated, folded, and affixed in a similar manner to that described above. At this time, the second side body 113 is longer than the second side portion 4a of the label L (B), and therefore the small holes for sucking up air are exposed. However, the exposure is slight, and does not therefore impair the suction operation. Hence, variation in the size of the label L can be responded to easily in a similar manner to that described above.

Further, when the label L (C) having a much smaller length than the length of the preceding label L (A) is affixed (for example, when the second side portion 4a is approximately half as short), as shown in FIG. 58, the second side body 113 (C) and a support member (not shown) that have been prepared in advance are introduced in accordance with the short label L (C). Thus, the label L (C) can be aspirated, folded, and affixed in a similar manner to that described above.

Further, when a label L (not shown) having a greater length than the preceding label L (A) is affixed, a second side body 113 (not shown) and a support member (not shown) that have been prepared in advance are introduced in accordance with the label L.

Note that in the description of the first through thirteenth embodiments, the respective rear surfaces of the first side face 3 and second side face 4 forming the part 2 of the label L are joined, but the present invention is not limited thereto, and the label L may be affixed to the product with the part 2 of the label L projecting in an angularly folded shape and the first side face 3 and second side face 4 not joined. This can be achieved easily by reducing the movement amount from the removed position V to the joining position S in the folding/affixing means 20. As a result, the bent part 2 of the label L is maintained in an angularly folded, projecting form. Therefore, when a portable reader/writer is held to the IC chip Ta of the label L affixed to the product W to perform a data reading operation, the communication angle widens in comparison with a case where the label L is affixed to the product W in planar form, enabling an improvement in the efficiency of the reading operation performed on the label L.

Further, when perforations or the like are formed so that the part 2 of the label L can be folded into an angular shape, there is no particular need to provide the folding assisting means 30. However, the folding assisting means 30 are preferably provided to ensure that the part 2 of the label L is folded reliably from the rear surface side to the front side.

Furthermore, in the embodiments described above, the suction plate is moved from the suction position X to the affixing position Y by the air cylinder device serving as the moving means 27, whereby the label L is pressed against and affixed to the product W. However, the present invention is not limited thereto, and may also be applied to an (air jet tyreo) label affixing apparatus in which air is expelled through small holes in the suction plate such that the label L is blown against and affixed to the product W. This construction can be realized easily by having the air cylinder device fold the part 2 of the label L into an angular shape and then having the label affixation control unit expel air through the small holes in the suction plate.

Furthermore, the label affixing apparatus according to the embodiments described above may also be implemented as an ink jet type, a thermal type, or a similar type of label affixing apparatus that comprises printing means having a head for printing variable information such as information relating to the product W or a barcode on the front surface side (the display layer U side) of the label L.

The invention claimed is:

1. A label affixing apparatus for affixing a label, to which an RFID tag including an IC chip and a communication antenna is attached, to a product, the apparatus comprising:
    a folding/affixing apparatus having a label conveying apparatus for conveying the label, a label holding device for holding a front surface side of the label, and a folding device for causing a part of the label including a tag attachment site to which the RFID tag of the label is attached to project by folding the part of the label from a rear surface side of the label to the front surface side of the label into an angular shape,
    the folding/affixing apparatus further comprise at least one of:
    a traction suppressing device for suppressing traction acting on the label when the label is affixed to the product;
    a reader/writer, including an antenna which is disposed in a position facing the part of the label when the part of the label is folded, for writing or reading information to and from the IC chip of the RFID tag via the antenna;
    a fold detector for detecting whether or not the part of the label has been folded into an angular shape;
    a moving device for moving apparatus between a suction position in which the label holding device aspirates the label and an affixing position in which the aspirated label is affixed to the product; and
    a folding assisting device for assisting folding of the part of the label from the rear surface side to the front surface side into an angular shape; wherein the label holding device comprises a pair of divided and detached bodies operable for aspirating the label,
    the folding device is operable to move one of the divided bodies between a removed position and a joining position.

2. The label affixing apparatus according to claim 1, wherein
    the folding device is operable to form a folded portion by folding the part of the label between opposing end surfaces of the divided bodies and for then causing the opposing end surfaces of the divided bodies to come into contact with respective front surfaces of a first side face and a second side face of the label, which sides are formed about an apex portion and respectively comprise a bend portion, such that the respective front surfaces of the label are pressed thereby.

3. The label affixing apparatus according to claim 2, wherein the traction suppressing apparatus is operable to control the folding device by moving the divided body from the joining position to the removed position side such that the divided body does not contact the folded portion of the label.

4. The label affixing apparatus according to claim 2, wherein at least the antenna of the reader/writer is disposed between the divided bodies when the divided body is in said removed position.

5. The label affixing apparatus according to claim 2, wherein the fold detecting device comprises a light-projecting and light-receiving optical sensor positioned and operable to detect a presence or absence of a folded portion of the label facing a gap between the end surfaces of the pair of divided bodies.

6. The label affixing apparatus according to claim 1, further comprising a pressing member operable for folding the part of the label and for pressing a bend portion side of a second side face formed about an apex portion,
    the folding device makes the pressing member capable of moving between a removed position and a joining position, and
    the pressing member and the label holding device are operable to fold the part of the label to form a folded portion by pressing a bend portion of a first side face of the label and the bend portion of the second side face of the label in a direction for causing respective rear surfaces of the first side face and the second side face to approach each other.

7. The label affixing apparatus according to claim 6, wherein the traction suppressing device is operable to control the folding means by moving the pressing member from its joining position to its removed position side, such that the pressing member does not contact the folded portion of said label.

8. The label affixing apparatus according to claim 6, wherein at least the antenna of the reader/writer is disposed between the pressing member and the label holding device when the pressing member is in its removed position.

9. The label affixing apparatus according to claim 6, wherein the fold detecting device comprises a light-projecting and light-receiving optical sensor that detects the presence or absence of the folded portion of the label facing a gap between the pressing member and the label holding device.

10. The label affixing apparatus according to claim 1, wherein the traction suppressing device is operable for blowing air onto the label from said label holding device.

11. The label affixing apparatus according to claim 1, wherein the label holding device comprises a suction plate, and
    at least the antenna of the reader/writer is provided on a support member side of the suction plate.

12. The label affixing apparatus according to claim 1, wherein the fold detecting device comprises abnormality signal transmitting means for transmitting an abnormality signal when the fold detecting device detect that the part of the label is not folded into an angular shape.

13. The label affixing apparatus according to claim 1, wherein the folding assisting device comprise an air blowing nozzle operable for blowing air onto the part of the label from the rear surface side such that the part of the label is folded toward the front surface side by a blowing force of air.

14. The label affixing apparatus according to claim 1, wherein the folding assisting device comprises a suction nozzle for aspirating the part of the label from the front surface side such that the part of the label is folded toward the front surface side.

15. The label affixing apparatus according to claim 1, wherein the holding device comprises a pair of divided bodies for aspirating the label, the folding device being operable to make one of the divided bodies capable of moving relative to the other of the divided bodies between a joining position in which respective suction surfaces of the divided bodies meet in planar form and a removed position in which the divided bodies are removed from each other, such that an angle formed between the respective suction surfaces of the divided bodies is less than 180 degrees, and the folding device being operable to form a folded portion of the label during movement from the removed position to the joining position by folding the part of the label between opposing end surfaces of the divided bodies and then for causing the opposing end surfaces of the divided bodies to contact respective front surfaces of a first side face and a second side face of the label, which side faces are formed about an apex portion and respectively comprise a bend portion, such that the respective front surfaces are pressed thereby.

16. A label affixing apparatus for affixing a label, to which an RFID tag including an IC chip and a communication antenna is attached, to a product, the apparatus comprising:

a folding/affixing apparatus having a label conveying apparatus for conveying the label, a label holding device for holding a front surface side of the label, and a folding device for causing a part of the label including a tag attachment site to which the RFID tag of the label is attached to project by folding the part of the label from a rear surface side of the label to the front surface side of the label into an angular shape, the folding/affixing apparatus further comprise at least one of:

a traction suppressing device for suppressing traction acting on the label when the label is affixed to the product;

a reader/writer including an antenna which is disposed in a position facing the part of the label when the part of the label is folded, for writing or reading information to and from the IC chip of the RFID tag via the antenna;

a fold detector for detecting whether or not the part of the label has been folded into an angular shape;

a moving device for moving apparatus between a suction position in which the label holding device aspirates the label and an affixing position in which the aspirated label is affixed to the product; and a folding assisting device for assisting folding of the part of the label from the rear surface side to the front surface side into an angular shape; wherein the label holding device comprises a pair of divided and detached bodies operable for aspirating the label, the folding device is operable to move one of the divided bodies between a removed position and a joining position, wherein the label holding device comprises a suction plate for aspirating the label, the suction plate comprises:

a first side body for aspirating a first side portion of the label adjacent to the part of the label;

a second side body that is capable of approaching the first side body and aspirates a second side portion of the label adjacent to the part of the label; and an intermediate body that between the first side body and the second side body and aspirates the part of the label, and the folding device is operable to fold the part of the label by moving the intermediate body between a planar position in which a suction surface of the first side body, a suction surface of the intermediate body, and a suction surface of the second side body are connected in planar form and the label is aspirated, and a withdrawal position in which a center of the intermediate body is folded back as the second side body approaches the first side body such that the part of the label is folded inward while being aspirated, thereby forming a folded portion having a first side face and a second side face, and the side faces are formed about an apex portion and respectively comprise a bend portion.

17. The label affixing apparatus according to claim 16, wherein the said intermediate body comprises:

a first intermediate body part that aspirates the first side face of the part of the label and is rotatably connected to the first side body via a hinge;

a second intermediate body part that aspirates the second side face of the part of the label and is rotatably connected to the second side body via a hinge; and a hinge mechanism that rotatably connects the first intermediate body and the second intermediate body.

18. The label affixing apparatus according to claim 16, wherein the intermediate body comprises:

a first intermediate body part that aspirates the first side face of the part of the label and is rotatably connected to the first side body via a hinge;

a second intermediate body part that aspirates the second side face of the part of the label and is rotatably connected to the second side body via a hinge;

a hinge mechanism that rotatably connects the first intermediate body and the second intermediate body; and a biasing device operable for biasing the first intermediate body part and the second intermediate body part in a withdrawal direction during movement thereof from the planar position to the withdrawal position.

19. A label affixing apparatus for affixing a label, to which an RFID tag including an IC chip and a communication antenna is attached, to a product, the apparatus comprising:

a folding/affixing apparatus having a label conveying apparatus for conveying the label, a label holding device for holding a front surface side of the label, and a folding device for causing a part of the label including a tag attachment site to which the RFID tag of the label is attached to project by folding the part of the label from a rear surface side of the label to the front surface side of the label into an angular shape, the folding/affixing apparatus further comprise at least one of:

a traction suppressing device for suppressing traction acting on the label when the label is affixed to the product;

a reader/writer, including an antenna which is disposed in a position facing the part of the label when the part of the label is folded, for writing or reading information to and from the IC chip of the RFID tag via the antenna;

a fold detector for detecting whether or not the part of the label has been folded into an angular shape;

a moving device for moving apparatus between a suction position in which the label holding device aspirates the label and an affixing position in which the aspirated label is affixed to the product; and a folding assisting device for assisting folding of the part of the label from the rear surface side to the front surface side into an angular shape; wherein the label holding device comprises a pair of divided and detached bodies operable for aspirating the label, the folding device is operable to move one of the divided bodies between a removed position and a joining position, wherein the label conveyed by the label conveying device has an intermediate portion to be provided with the part of the label including the tag attachment site to which the RFID tag is attached, a first side portion adjacent to said part of said label, and a second side portion adjacent to the part of the label, a relationship between a length Fa of the first side portion and a length Fb of the second side portion being Fa≦Fb, wherein a label having a second side portion of a varying length is used, and the label is conveyed with the second side portion in a leading conveyance direction position, said folding device being operable to form a folded portion comprised of a first side face and a second side face, the side faces are formed about an apex portion and respectively comprise a bend portion, the folding device being operable to cause the part of the label conveyed by the label conveying device to project by folding the part from the rear surface side to the front surface side of the part into an angular shape, the label holding device comprises a suction plate comprised of a first side body for aspirating a first side portion of the label adjacent to the part of the label and a second side body for aspirating a second side portion of the label adjacent to the part of the label, said folding device defining a base, to which the first side body and the second side body of the suction plate are fixed, and the second side body being operable to move relative to the first side body between a removed position and a joining position, and opposing end surfaces of the first side body and the second side body are moved from the removed position to the joining position for forming the folded portion.

20. The label affixing apparatus according to claim 19, further comprising a plurality of types of the second side bodies having different lengths are prepared as the second side body, and the plurality of types of second side bodies can be replaced on the base.

21. A label affixing apparatus for affixing a label, to which an RFID tag including an IC chip and a communication antenna is attached, to a product, the apparatus comprising:

a folding/affixing apparatus having a label conveying apparatus for conveying the label, a label holding device for holding a front surface side of the label, and a folding device for causing a part of the label including a tag attachment site to which the RFID tag of the label is attached to project by folding the part of the label from a rear surface side of the label to the front surface side of the label into an angular shape, the folding/affixing apparatus further comprise at least one of:

a traction suppressing device for suppressing traction acting on the label when the label is affixed to the product;

a reader/writer, including an antenna which is disposed in a position facing the part of the label when the part of the label is folded, for writing or reading information to and from the IC chip of the RFID tag via the antenna;

a fold detector for detecting whether or not the part of the label has been folded into an angular shape;

a moving device for moving apparatus between a suction position in which the label holding device aspirates the label and an affixing position in which the aspirated label is affixed to the product; and a folding assisting device for assisting folding of the part of the label from the rear surface side to the front surface side into an angular shape; wherein the label holding device comprises a pair of divided and detached bodies operable for aspirating the label, the folding device is operable to move one of the divided bodies between a removed position and a joining position, wherein the folding device form a folded portion of the label having a first side face and a second side face, the faces are formed about an apex portion and respectively comprise a bend portion, the folding device cause the part of the label including said tag attachment site to which said RFID tag of said label is attached to project by folding said part from said rear surface side to the front surface side into an angular shape, said label holding device comprises a suction plate for holding the front surface side of said label using a first side body for aspirating a first side portion of the label adjacent to the part of the label, a second side body for aspirating a second side portion of the label adjacent to the part of the label, and an intermediate body that is provided between the first side body and the second side body and aspirates the part of said label, said folding device comprises:

an intermediate body driving unit operable for moving the intermediate body between a planar position in which a suction surface of the first side body, a suction surface of the intermediate body, and a suction surface of the second side body are connected in planar form and the label is aspirated, and a withdrawal position in which the intermediate body is withdrawn from the planar position; and a second side body driving unit operable for moving the second side body between a removed position in which the intermediate body is in the planar position and the second side body is removed from the first side body, and a joining position in which the intermediate body is in the withdrawal position and the second side body approaches the first side body, and said folded portion is formed opposing end surfaces of the first side body and the second side body when the second side body driving unit moves the second side body from the removed position to the joining position.

22. The label affixing apparatus according to claim 21, wherein the folding device comprise a drive control unit for causing the intermediate body driving unit to move the intermediate body from the planar position to the withdrawal position and for causing the second side body driving unit to move the second side body from the removed position to the joining position synchronously.

23. The label affixing apparatus according to claim 21, wherein the folding device comprises a drive control unit for causing the intermediate body driving unit to move the intermediate body from the planar position to the withdrawal position and for causing the second side body driving unit to move the second side body from the removed position to the joining position synchronously, and adjacent end surfaces of the intermediate body in the planar position and the second side body in the removed position are formed at an incline relative to suction surfaces of the intermediate body and the second side body so that the intermediate body and the second side body can move synchronously.

24. The label affixing apparatus according to claim 21, wherein the label conveyed by the label conveying device has a first side portion adjacent to the part of the label and a second side portion adjacent to the part of the label, a relationship between a length Fa of the first side portion and a length Fb of the second side portion being Fa≦Fb,
further comprising:
a label having a second side portion of a varying length and configured to serve as a main display portion on which a main display can be performed,
and the label is conveyed by the conveying device with the second side portion of the label in a leading conveyance direction position,
wherein the first side body is set at a length corresponding to said length Fa of said first side portion, and fixed to a base, and
the second side body is set at a length that can correspond to differences among a plurality of lengths Fb of the second side portion, and provided on the base.

25. A label affixing apparatus for affixing a label, to which an RFID tag including an IC chip and a communication antenna is attached, to a product, the apparatus comprising:
a folding/affixing apparatus having a label conveying apparatus for conveying the label, a label holding device for holding a front surface side of the label, and a folding device for causing a part of the label including a tag attachment site to which the RFID tag of the label is attached to project by folding the part of the label from a rear surface side of the label to the front surface side of the label into an angular shape,
the folding/affixing apparatus further comprise at least one of
a traction suppressing device for suppressing traction acting on the label when the label is affixed to the product;
a reader/writer, including an antenna which is disposed in a position facing the part of the label when the part of the label is folded, for writing or reading information to and from the IC chip of the RFID tag via the antenna;
a fold detector for detecting whether or not the part of the label has been folded into an angular shape;
a moving device for moving apparatus between a suction position in which the label holding device aspirates the label and an affixing position in which the aspirated label is affixed to the product; and
a folding assisting device for assisting folding of the part of the label from the rear surface side to the front surface side into an angular shape; wherein the label holding device comprises a pair of divided and detached bodies operable for aspirating the label,
the folding device is operable to move one of the divided bodies between a removed position and a joining position,
wherein the label affixing apparatus comprises:
a folding control device operable for driving the folding device or the folding assisting device to control whether or not the part of the label is folded from the rear surface side to the front surface side into an angular shape;
a setting device operable for setting whether or not the part of the label is folded from the rear surface side to the front surface side into an angular shape;
storing means for storing a set value set by the setting device; and
a determining device for determining the set value stored in the storing device, and
when the determining device determines the set value such that the part of the label is to be folded from the rear surface side to the front surface side into an angular shape, the folding control device drive said folding means or the folding assisting device such that the part of the label is folded from the rear surface side to the front surface side into an angular shape.

26. The label affixing apparatus according to claim 25, wherein the label affixing apparatus comprises an operation unit for setting information relating to an operation of the label affixing apparatus, and the setting device is set from the operation unit.

27. The label affixing apparatus according to claim 25, wherein the label affixing apparatus comprises an external interface for performing wired or wireless communication with an external machine, and the setting device is set in accordance with reception data received by the external interface from the external machine.

28. The label affixing apparatus according to claim 25, wherein the reader/writer performs communication with the IC chip, and the setting device of the label affixing apparatus are set in accordance with the presence or absence of a response.

* * * * *